US012688264B2

(12) United States Patent
Huang et al.

(10) Patent No.: US 12,688,264 B2
(45) Date of Patent: Jul. 21, 2026

(54) WATERMARKING DIGITAL MEDIA FOR CONTENT VERIFICATION WITH DIFFERENTIAL DETECTION

(71) Applicant: Trufo Inc., New York, NY (US)

(72) Inventors: Yan Huang, New York, NY (US); Xinyi Han, New York, NY (US); Jiaxin Guan, New York, NY (US)

(73) Assignee: Trufo Inc., New York, NY (US)

( * ) Notice: Subject to any disclaimer, the term of this patent is extended or adjusted under 35 U.S.C. 154(b) by 0 days.

(21) Appl. No.: 18/966,712

(22) Filed: Dec. 3, 2024

(65) Prior Publication Data

US 2025/0094546 A1      Mar. 20, 2025

Related U.S. Application Data

(63) Continuation of application No. 18/779,858, filed on Jul. 22, 2024, now Pat. No. 12,158,929.

(60) Provisional application No. 63/555,889, filed on Feb. 20, 2024, provisional application No. 63/600,029, filed on Nov. 16, 2023, provisional application No. 63/586,407, filed on Sep. 28, 2023, provisional application No. 63/514,800, filed on Jul. 21, 2023.

(51) Int. Cl.
| | |
|---|---|
| *G06F 21/16* | (2013.01) |
| *H04L 9/06* | (2006.01) |
| *H04L 9/32* | (2006.01) |

(52) U.S. Cl.
CPC ............ *G06F 21/16* (2013.01); *H04L 9/0643* (2013.01); *H04L 9/3247* (2013.01)

(58) Field of Classification Search
CPC ...... G06F 21/16; H04L 9/0643; H04L 9/3247
USPC ......................................................... 713/176
See application file for complete search history.

(56) References Cited

U.S. PATENT DOCUMENTS

| | | | | |
|---|---|---|---|---|
| 7,941,667 B2 * | 5/2011 | Miyazaki | ................ | G06F 21/64 |
| | | | | 713/176 |
| 2010/0111296 A1 * | 5/2010 | Brown | .................. | H04L 9/3066 |
| | | | | 380/28 |
| 2013/0326224 A1 * | 12/2013 | Yavuz | .................. | H04L 9/3247 |
| | | | | 713/176 |
| 2014/0082366 A1 * | 3/2014 | Engler | .................. | H04L 9/3242 |
| | | | | 713/181 |
| 2015/0350171 A1 * | 12/2015 | Brumley | ............. | H04L 63/0876 |
| | | | | 713/176 |
| 2018/0205743 A1 * | 7/2018 | McIver | .................... | H04L 9/30 |

* cited by examiner

*Primary Examiner* — Teshome Hailu

(57) ABSTRACT

The present disclosure provides a method of watermarking digital media for subsequent decoding. The method includes receiving a secure content package comprising digital audio-visual content, source entity information, content annotations, and digital signatures. The package is validated using public-key cryptography. A content identifier is generated and embedded as a watermark into the digital audiovisual content. The watermark is configured to be machine readable and visually inconspicuous. A content database entry is recorded in a remote database, retrievable using the content identifier and comprising the content annotations and source information. The watermarked digital audiovisual content is stored and transmitted to the media source. The method may further include generating and storing content hashes for future authentication comparisons.

30 Claims, 17 Drawing Sheets

Security Setting:

Security Object:

Extension of fuzzy hash with an additional property!

Content Setting:

WATERMARKING DIGITAL MEDIA FOR CONTENT VERIFICATION WITH DIFFERENTIAL DETECTION

CROSS-REFERENCE TO RELATED APPLICATIONS

This application is a continuation of application Ser. No. 18/779,858, filed Jul. 22, 2024, which claims the benefit of U.S. Provisional Application No. 63/514,800, filed Jul. 21, 2023, U.S. Provisional Application No. 63/586,407, filed Sep. 28, 2023, U.S. Provisional Application No. 63/600,029, filed Nov. 16, 2023, and U.S. Provisional Application No. 63/555,889, filed Feb. 20, 2024, all of which are hereby incorporated by reference in their entirety.

FIELD OF INVENTION

The present disclosure relates to systems and methods for watermarking and authenticating digital audiovisual content. More particularly, the disclosure describes techniques for embedding secure, verifiable watermarks into digital media that enable robust content authentication through distributed database lookups and cryptographic verification.

BACKGROUND

The watermarking of digital media content is widely used as a tool for digital identification and authentication. A digital watermark consists of machine-readable information placed into digital media content, oftentimes in such a way that is imperceptible to the user. Embodiments of watermarks, which have existed for decades, generally consist of two components: an encoder and a decoder. The encoder applies the watermark to "original" content. The decoder detects and/or interprets the watermark from "observed" content.

Watermarks have been developed for various digital media formats, including: image, video, audio, text, document, software, physical product label.

Watermarks have been developed with a variety of techniques drawn from cryptography, steganography, signal processing, and machine learning. There is a large collection of academic research, covering concepts including: DCT (discrete cosine transform), DFT (discrete Fourier transform), DWT (discrete wavelet transform), SVD (singular value decomposition), correlation, feature saliency, quantized parity, GAN (generative adversarial network), diffusion models, secret keys, and more. There is also a large collection of patents, which focus on the more practical aspects of watermark implementation, covering concepts including: log-polar transform, spread spectrum, geometric alignment, two-step alignment, perceptive hash, and more.

Watermarks have been developed in a number of practical settings. Historically, piracy prevention has been the most popular domain. A watermark that is visible can be applied to stock images to encourage users to purchase a premium non-watermarked version. A watermark that is secret and fragile (for instance, by transmitting an encrypted message in the least significant bit of a predetermined subset of pixels) can be applied to TV streams to prevent users from playing outside content with the hardware. A watermark that contains a code unique to the user can be applied to movies to not just detect pirated movies but also identify the offending user. In the past decade, watermarks have also been used for (1) physical product identification (essentially invisible bar-codes) and (2) metadata embedding in broadcast media (standardized).

This new domain is an incredibly important one. Content creation is becoming increasingly (1) synthetic and (2) decentralized. Over the past two decades, this transformation has been driven by (a) the Internet, (b) smartphones, (c) social media and now, it is being accelerated by (d) generative AI. As a consequence, there is an increasing need for digital content provenance solutions that are both robust and scalable, lest we completely lose confidence in our ability to distinguish the generated from the genuine.

A successful watermark should satisfy three criteria. (1) Robustness: it should resist both common edits and adversarial attacks. (2) Perception: it should not affect the content consumption user experience. (3) Readability: it should be efficiently decodable by the appropriate software. Most watermarks do fairly well in (2) and (3); however, they fare poorly on (1). This is largely by design: in the older domains, common user edits, such as cropping and rotation and color filters, are not so prevalent, and as a private scheme in a closed system, attacks are hard to conduct. There are a handful of newer watermarks that perform well on these, though the ones employed in our working embodiment perform a few orders of magnitude better than alternatives.

More importantly, there are a few critical weaknesses of watermarks when considered as potential solutions in the new domain. From a security perspective, there are two important attacks to consider.

(1) Removal: take some watermarked content (e.g. AI-generated deepfake that is labelled) and remove the watermark; now, the content is unmarked (e.g. deepfake is no longer recognized as a deepfake).

(2) Forgery: take some illegitimate content (e.g. raw AI-generated deepfake) and add a watermark that passes as legitimate; now, the content looks legitimate (e.g. deepfake passes as genuine).

In response to political pushes to watermark synthetic content, many large companies have released watermark tools to label model-generated images. However, as pointed out by both themselves and independent experts, these are vulnerable to both removal and forgery! This is not good: in a world where synthetic content is watermarked, failure against removal means misinformation (e.g. journalism) and failure against forgery means loss of credibility (e.g. legal evidence).

There are a number of other existing approaches that address to some extent removal and forgery, but each have a critical weakness:

(1) There are metadata standards (IPTC, EXIF, XML). There are cryptography standards (RSA, Ed25519 for public-key; SHA, SHA-3 for hashing). Combine them into a cryptographic metadata standard, and content can be verified. This is resistant to forgery. This is not resistant to removal, whether benign or adversarial.

(2) There are watermarks that rely on a stored forensic copy of the original content. The forensic copy can be known (e.g. web crawling for pirated content), searched (e.g. via a perceptual hash database), or retrieved (e.g. via an embedded content identifier). This is resistant to forgery. This is resistant to benign removal, and the first two are also resistant to adversarial removal. However, this is not scalable: digital content is being produced at an alarming rate, and storing a copy of everything is not economical.

(3) There are watermarks that contain a cryptographic signature of the content for verification. This is resistant to forgery. This is partly resistant to removal: the watermark may still exist, but any edits to the content (including the watermark itself) will break verification.

Furthermore, digital watermarking has become an increasingly important technology for authenticating and protecting digital media content. As the creation and distribution of digital images, videos, and audio files have proliferated, so too has the need for robust methods to verify the origin and integrity of this content. Traditional digital signatures and metadata can be easily stripped or altered, leaving content vulnerable to unauthorized modification or misattribution.

Watermarking aims to embed identifying information directly into the content itself in a way that is ideally imperceptible to human viewers or listeners, but detectable by specialized software. This allows the watermark to persist even if the file format is changed or the content is edited, compressed, or partially cropped. However, creating watermarks that are simultaneously robust, imperceptible, and able to carry sufficient data has proven challenging.

Existing watermarking techniques often struggle to balance these competing priorities. Visible watermarks like logos can be easily removed. Invisible watermarks embedded in least significant bits or frequency domains may not survive common processing operations. More robust watermarks risk degrading the quality of the content. Additionally, many watermarking systems rely on storing copies of the original unwatermarked content for comparison, which becomes impractical at large scales.

As artificial intelligence and deep learning technologies advance, the challenge of authenticating digital media is becoming even more pressing. AI-generated and manipulated content is increasingly difficult to distinguish from authentic captures. There is a growing need for watermarking and verification systems that can reliably identify the source and integrity of content, while being scalable to handle the massive volumes of digital media being created and shared online every day.

Improved methods are desired for robustly watermarking digital audiovisual content in a way that preserves quality, survives common transformations, and enables efficient verification without requiring storage of original files. Additionally, there is a need for comprehensive platforms that can manage the full lifecycle of content creation, distribution, and authentication in today's complex digital media ecosystem.

SUMMARY OF INVENTION

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Disclosed herein is a watermark-based platform that addresses both forgery and removal, without sacrificing the many other aspects of an effective identification and authentication system. Some parts of the improvement come from:

(1) Forgery: content hashes are computed after the watermark is applied and stored in a secure server; these hashes can then be compared to validate any observed content against the original content.

(2) Removal: the watermarks serve as stamps of validation for traditional (nonsynthetic) content; this means that there is less incentive for adversarial removal attacks.

(3) Robustness: watermark embodiments are robust against common user edits, including small-angle rotation, cropping and resizing, pixel alterations, and more.

(4) Robustness and Authentication: disclosed herein is the notion of "fuzzy" authentication, which involves the use of a "differential" hash that acts as a hybrid between a cryptographic hash and a perceptual hash; this enables authentication even when the content has been manipulated, by describing to the user what has and has not been changed.

(5) Perception: watermark embodiments use state-of-the-art techniques to minimize user perceptibility.

(6) Readability: platform embodiments follow specific design guidelines to ensure readability even when a large number of watermarks and content formats must be supported.

(7) Data Payload: platform embodiments support a number of powerful user annotations, including content licenses, do-not-train labels, origination claims, and more.

(8) Source Management: platform embodiments distinguish between different source types, which may vary from general users to public figures to large institutions to software applications to physical camera devices; users may also link verified profiles; this enables trust to be traced back to the source.

(9) User Privacy: a forensic copy of the original content does not need to be stored; only a few configurable hashes do, and these hashes take up very little space.

According to an aspect of the present disclosure, a method of watermarking digital media for subsequent decoding is provided. The method includes receiving data representing a secure content package for a media source, wherein said package comprises an item of digital audiovisual content, information identifying a registered source entity, one or more content annotations, and one or more digital signatures. The method includes validating said secure content package via public-key cryptography, wherein the validation process authenticates both the identity of said source entity and the fidelity of said content data using said computed digital signatures. The method includes generating a content identifier. The method includes embedding a watermark onto said item of digital audiovisual content, wherein the watermark is configured to be both machine readable and visually inconspicuous to the human eye, and wherein the watermark encodes a steganographic data payload comprising said generated content identifier. The method includes recording a content database entry in a remote database, so that said entry can be later retrieved from said database using said content identifier, wherein said entry comprises the content annotations and source information from the received package. The method includes storing said watermarked item of digital audiovisual content and transmitting the watermarked item to the media source.

According to other aspects of the present disclosure, the method may include one or more of the following features. The method may include applying one or more hash functions to the watermarked item of digital audiovisual content to generate one or more content hashes, wherein said hash functions produce outputs of variable length that can be compared, and storing the generated content hashes in the content database entry, enabling future comparison against corresponding hashes computed on content to be authenticated. One of said content hashes may be a cryptographic hash generated using the SHA-3 256 hash function, enabling exact matching between the original watermarked item and a separate item of digital audiovisual content. One of said content hashes may be a differential hash generated by partitioning the content into a plurality of regions, computing seeded locally-sensitive hashes for each region, intertwining the results using a sparse matrix, and quantizing the intertwined results into a hash format, wherein the differential hash enables identification and localization of significant differences between the original watermarked item and a similar item of digital audiovisual content. The registered source may comprise at least one of: a physical camera, a physical computer, a physical device, a software application, a generative AI model, a digital library, a cloud-based service, or a user account. The registered source may securely store a local private key corresponding to a recorded public key, and at least one of said computed digital signatures may be created using said local private key on a message comprising other components of said secure content package. The content annotations may comprise machine-generated fields including at least one of: timestamp, geolocation, device metadata, media data format, or media edit description, and user-inputted fields including at least one of: description, copyright license, origination claim, URL link, or AI training permission. The content database entry may further comprise secure server records including a timestamp and information about settings and results of the watermarking process. The remote database may be a public or private blockchain ledger, ensuring that recorded content data entries cannot be lost or altered, and block addresses of blocks containing the content data entries may be encoded within the content identifier. The content identifier may be embedded in the watermark using a combination of a local watermark applied in a spatial transform domain of the digital audiovisual content and a global watermark applied in a frequency transform domain across the entire digital audiovisual content, wherein the combination of watermarks increases overall durability without significantly compromising invisibility.

According to another aspect of the present disclosure, a system for watermarking digital media is provided. The system includes a network processor configured to receive a secure content package comprising digital audiovisual content, source entity information, content annotations, and digital signatures. The system includes a validation module configured to authenticate the secure content package using public-key cryptography. The system includes a content identifier generator. The system includes a watermark embedding processor configured to embed a watermark into the digital audiovisual content, wherein the watermark encodes a data payload comprising the generated content identifier. The system includes a database interface configured to record a content entry in a remote database, said entry being retrievable using the content identifier and comprising the content annotations and source information. The system includes a storage module configured to store the watermarked digital audiovisual content. The system includes a transmission module configured to transmit the watermarked content to the media source.

According to other aspects of the present disclosure, the system may include one or more of the following features. The system may include a hash processor configured to apply one or more hash functions to the watermarked digital audiovisual content to generate one or more content hashes, and store the generated content hashes in the content entry, enabling future comparison against corresponding hashes computed on content to be authenticated. The hash processor may be configured to generate a cryptographic hash using the SHA-3 256 hash function, enabling exact matching between the original watermarked content and a separate item of digital audiovisual content. The hash processor may be configured to generate a differential hash by partitioning the content into a plurality of regions, computing seeded locally-sensitive hashes for each region, intertwining the results using a sparse matrix, and quantizing the intertwined results into a hash format, wherein the differential hash enables identification and localization of significant differences between the original watermarked content and a similar item of digital audiovisual content. The watermark embedding processor may be configured to apply a combination of a local watermark applied in a spatial transform domain of the digital audiovisual content and a global watermark applied in a frequency transform domain across the entire digital audiovisual content, wherein the combination of watermarks increases overall durability without significantly compromising invisibility. The content annotations may comprise machine-generated fields including at least one of: timestamp, geolocation, device metadata, media data format, or media edit description, and user-inputted fields including at least one of: description, copyright license, origination claim, URL link, or AI training permission. The database interface may be configured to record secure server records in the content entry, said records including a timestamp and information about settings and results of the watermarking process. The remote database may be a public or private blockchain ledger, ensuring that recorded content entries cannot be lost or altered, and the content identifier generator may be configured to encode block addresses of blocks containing the content entries within the generated content identifier. The system may include a source management module configured to securely store a local private key corresponding to a recorded public key for the registered source entity, and create at least one of said digital signatures using said local private key on a message comprising other components of said secure content package. The source management module may be further configured to associate the registered source entity with an account management system, validate account identity using one of said digital signatures, wherein the digital signature is an OAuth JSON Web Token from an external secure account login, and validate content fidelity using another of said digital signatures, wherein the digital signature is a Transport Layer Security certificate on the secure content package network transmission.

According to another aspect of the present disclosure, a non-transitory computer-readable medium storing instructions that, when executed by a processor, cause the processor to perform a method of watermarking digital media is provided. The method includes receiving a secure content package comprising digital audiovisual content, source entity information, content annotations, and digital signatures. The method includes validating the secure content package using public-key cryptography. The method includes generating a unique content identifier. The method includes embedding a watermark into the digital audiovisual content, the watermark encoding the unique content identifier. The method includes recording a database entry in a remote database, the entry being retrievable using the unique content identifier and comprising the content annotations and source entity information. The method includes storing the watermarked digital audiovisual content. The method includes transmitting the watermarked content to a media source.

According to other aspects of the present disclosure, the method performed by the processor may include one or more of the following features. The method may include applying one or more hash functions to the watermarked digital audiovisual content to generate one or more content hashes, and storing the generated content hashes in the database entry, enabling future comparison against corresponding hashes computed on content to be authenticated. One of said content hashes may be a cryptographic hash generated using the SHA-3 256 hash function, enabling exact matching between the original watermarked content and a separate item of digital audiovisual content. One of said content hashes may be a differential hash generated by partitioning the content into a plurality of regions, computing seeded locally-sensitive hashes for each region, intertwining the results using a sparse matrix, and quantizing the intertwined results into a hash format, wherein the differential hash enables identification and localization of significant differences between the original watermarked content and a similar item of digital audiovisual content. Embedding the watermark may comprise applying a combination of a local watermark applied in a spatial transform domain of the digital audiovisual content and a global watermark applied in a frequency transform domain across the entire digital audiovisual content, wherein the combination of watermarks increases overall durability without significantly compromising invisibility. The content annotations may comprise machine-generated fields including at least one of: timestamp, geolocation, device metadata, media data format, or media edit description, and user-inputted fields including at least one of: description, copyright license, origination claim, URL link, or AI training permission. The method may include recording secure server records in the database entry, said records including a timestamp and information about settings and results of the watermarking process. The remote database may be a public or private blockchain ledger, ensuring that recorded content entries cannot be lost or altered, and the unique content identifier may encode block addresses of blocks containing the database entry within the blockchain ledger. The method may include securely storing a local private key corresponding to a recorded public key for the registered source entity, and creating at least one of said digital signatures using said local private key on a message comprising other components of said secure content package. The method may include associating the registered source entity with an account management system, validating account identity using one of said digital signatures, wherein the digital signature is an OAuth JSON Web Token from an external secure account login, and validating content fidelity using another of said digital signatures, wherein the digital signature is a Transport Layer Security certificate on the secure content package network transmission.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

DETAILED DESCRIPTION

The following description sets forth exemplary aspects of the present disclosure. It should be recognized, however, that such description is not intended as a limitation on the scope of the present disclosure. Rather, the description also encompasses combinations and modifications to those exemplary aspects described herein.

The present disclosure provides a system and method for the secure watermarking and subsequent authentication of digital audiovisual content. The system comprises a content source apparatus, a secure watermarking apparatus, and a secure database system. The content source apparatus generates a secure content package, which includes digital audiovisual content, information identifying a registered source entity, and one or more digital signatures. The secure watermarking apparatus receives this secure content package, validates it using public-key cryptography, and embeds a watermark onto the digital audiovisual content. This watermark carries a content identifier, which is also recorded in a remote database entry along with content annotations and source information. The secure database system stores these entries and allows for their later retrieval using the content identifier. This comprehensive system enables the secure watermarking of digital audiovisual content and facilitates its subsequent authentication, providing a robust solution for content verification in a wide range of applications.

Figure 1:
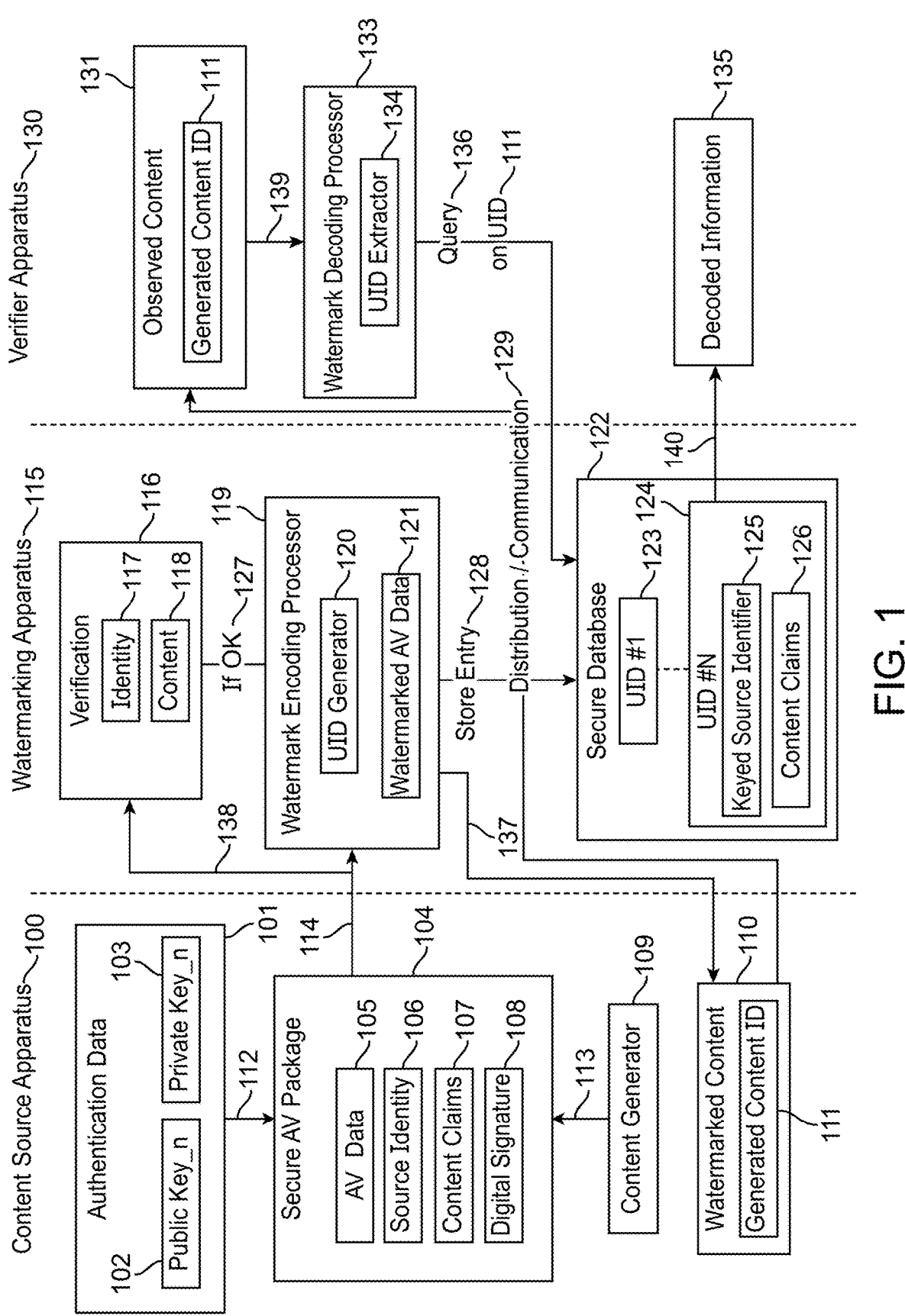
FIG. 1 illustrates a block diagram of a system for authenticating digital audiovisual content, according to aspects of the present disclosure.

Referring to FIG. 1, the system for authenticating digital audiovisual content comprises three main components: a Content Source Apparatus 100, a Watermarking Apparatus 115, and a Verifier Apparatus 130.

The Content Source Apparatus 100 is responsible for generating a secure content package. This package includes digital audiovisual content, information identifying a registered source entity, content annotations, and one or more digital signatures. The digital audiovisual content is produced by a Content Generator 109, which may be a physical camera, a phone camera, a generative AI model, or any other source of digital audiovisual content. The secure content package is then transmitted to the Watermarking Apparatus 115 via data flow 114.

The secure AV package 104 may be a comprehensive data structure that encapsulates various components related to digital audiovisual content. In some aspects, the secure AV package 104 may contain four primary elements: AV data 105, source identity 106, content claims 107, and digital signature 108.

The AV data 105 may comprise the actual digital audiovisual content. This content may be in various formats, such as video files (e.g., MP4, AVI, MOV), audio files (e.g., MP3, WAV, FLAC), or combined audiovisual formats. In some cases, the AV data 105 may include multiple streams or tracks, such as separate video and audio tracks, or multiple audio tracks for different languages.

The source identity 106 may contain information identifying the registered source entity that generated or owns the content. This information may include, but is not limited to, a unique identifier for the source, a username, an email address, a device ID, or a cryptographic public key associated with the source. In some aspects, the source identity 106 may also include metadata about the source, such as the type of device used to create the content, the software version, or the geographical location of the source.

The content claims 107 may encompass a wide range of annotations and metadata associated with the AV data 105. These claims may include both machine-generated fields and user-inputted fields. Machine-generated fields may comprise timestamps indicating when the content was created or modified, geolocation data showing where the content was captured, origination claims specifying the source of the content, and selected metadata such as file size, resolution, or codec information. User-inputted fields may include descriptions of the content, copyright licenses specifying usage rights, AI training permissions indicating whether the content can be used to train AI models, and any other relevant information provided by the content creator or owner.

The digital signature 108 may be a cryptographic signature that ensures the authenticity and integrity of the secure AV package 104. This signature may be generated using the private key of the registered source entity and may cover all or specific parts of the secure AV package 104. In some cases, multiple digital signatures may be included, each serving a different purpose. For example, one signature may validate the source identity, while another may verify the integrity of the AV data 105.

In some aspects, the secure AV package 104 may also include additional components or metadata. For instance, it may contain a version number or identifier for the package format itself, allowing for future extensions or modifications to the package structure. The package may also include encryption information if the AV data 105 or other sensitive components are encrypted.

The secure AV package 104 may be designed to be tamper-evident, meaning that any unauthorized modifications to its contents would invalidate the digital signature 108. This feature ensures that the integrity of the package can be verified at any point in its lifecycle, from creation to distribution to consumption.

In some cases, the secure AV package 104 may be formatted using standardized data serialization formats such as JSON, XML, or Protocol Buffers. This standardization may facilitate interoperability between different systems and allow for easy parsing and validation of the package contents.

The secure AV package 104 may also include provisions for handling large AV data 105. For instance, it may use references or links to externally stored content instead of embedding large files directly in the package. This approach may improve efficiency in transmission and storage while maintaining the security and verifiability of the content.

The Watermarking Apparatus 115 receives the secure content package and validates it using public-key cryptography. This validation process authenticates both the identity of the source entity and the fidelity of the content data using the digital signatures included in the secure content package. Once validated, a unique content identifier is generated by the UID Generator 120. A watermark, which carries the generated content identifier as part of its data payload, is then embedded onto the digital audiovisual content by the Watermark Encoding Processor 119.

The Watermarking Apparatus 115 also records a content database entry in a remote database, represented by the Secure Database 122. This entry, which can be later retrieved using the generated content identifier, includes the content annotations and source entity information from the received secure content package. The watermarked digital audiovisual content is then stored and returned for further distribution.

The Verifier Apparatus 130 is responsible for the authentication of the watermarked digital audiovisual content. It receives the watermarked content and extracts the watermark using the Watermark Decoding Processor 133 and the UID Extractor 134. The Verifier Apparatus 130 then queries the Secure Database 122 using the extracted content identifier to retrieve the corresponding content database entry. The retrieved entry is compared against the observed content to authenticate the content and verify its source.

In some aspects, the system may also include a network processor for transmitting the secure content package and the watermarked digital audiovisual content. The network processor may facilitate communication between the Content Source Apparatus 100, the Watermarking Apparatus 115, and the Verifier Apparatus 130.

In some cases, the system may further include a hash processor for applying one or more hash functions to the watermarked digital audiovisual content. The hash processor generates content hashes, which are stored in the content database entry in the Secure Database 122. These hashes can be later retrieved and compared against corresponding hashes computed on to-be-authenticated content, providing an additional layer of security and verification.

In some embodiments, the Watermarking Apparatus 115 may apply multiple watermarks to the digital audiovisual content. These watermarks may be designed to be both quickly readable by suitably-configured machines and largely imperceptible to the human eye. The steganographic data payload carried by each watermark may include the generated content identifier, allowing for efficient decoding and authentication of the watermarked content.

In some cases, the Content Source Apparatus 100 may be associated with an account management system. The system may validate the account identity and the content fidelity using one or more of the computed digital signatures. This validation process may involve an external secure account login, such as an OAuth JWT, and a TLS certificate on the secure content package network transmission.

In some aspects, the Secure Database 122 may be a public or private ledger, such as a blockchain, ensuring that the recorded content entries cannot be lost or altered. The block addresses of the blocks in which the content entries are stored may be conveyed through the content identifier.

In some embodiments, the system may include a user interface for selecting watermark parameters. The user interface may provide options for selecting among different watermarks or different watermarks for different tasks, with different capabilities. The system may also suggest certain watermarking codecs based on user inputs or preferences for a watermarking operation.

In some cases, the system may allow a user to watermark previously watermarked content. This may involve applying a new watermark to the content while preserving the existing watermark, or replacing the existing watermark with a new one. The system may also support the application of multiple watermarks to the same content, each carrying a copy of the same data payload. As long as one watermark is decodable, the data payload can be recovered.

In some aspects, the system may include a source management module for securely storing a local private key that corresponds to a recorded public key for the registered source entity. The source management module may create one or more of the computed digital signatures using the local private key on a message comprising other components of the secure content package.

In some embodiments, the system may include a content hash comparison module for comparing the content hashes retrieved from the Secure Database 122 against corresponding hashes computed on the observed content. The content hash comparison module may identify any significant differences between the original watermarked content and the observed content, providing a detailed analysis of any alterations made to the content.

In some cases, the system may include a user interface for displaying the authentication result. The user interface may present the observed content along with additional information, such as the source identity, content claims, and a description of any detected alterations. The user interface may also provide options for further actions, such as reporting unauthorized alterations or sharing the authentication result.

In some aspects, the system may include a content hash generation module for computing one or more content hashes on the watermarked digital audiovisual content. The content hash generation module may apply one or more hash functions to the content, producing outputs that can be compared but may have variable length. The computed content hashes may fall under one of several categories, such as cryptographic, perceptive, differential, or compressive, and may be stored in the content database entry in the Secure Database 122.

In some embodiments, the system may include a content annotation module for generating and storing content annotations. The content annotations may include machine-generated fields, such as timestamps, locations, origination claims, and selected metadata, as well as user-inputted fields, such as descriptions, copyright licenses, and AI training permissions. The content annotations may be included in the secure content package and stored in the content database entry in the Secure Database 122.

In some cases, the system may include a content identifier generation module for generating a unique content identifier for each piece of digital audiovisual content. The content identifier may be embedded into the watermark and stored in the content database entry in the Secure Database 122. The content identifier may be used to retrieve the corresponding content database entry for authentication purposes.

In some aspects, the system may include a content verification module for verifying the identity of the source entity and the fidelity of the content data. The content verification module may use public-key cryptography to authenticate the digital signatures included in the secure content package. The content verification module may also compare the content hashes retrieved from the Secure Database 122 against corresponding hashes computed on the observed content to verify the authenticity of the content.

In some embodiments, the system may include a content distribution module for transmitting the watermarked digital audiovisual content to a media source. The content distribution module may facilitate the distribution of the watermarked content through various channels, such as online platforms, broadcast networks, or physical media.

In some cases, the system may include a content storage module for storing the watermarked digital audiovisual content. The content storage module may store the content in a secure manner, preserving the integrity of the watermark and the associated data payload. The content storage module may also store the secure content package, the content database entry, and other related data for future reference or retrieval.

In some aspects, the system may include a content retrieval module for retrieving the watermarked digital audiovisual content and the associated data from the Secure Database 122. The content retrieval module may use the content identifier to locate and retrieve the corresponding content database entry. The content retrieval module may also retrieve the secure content package, the content hashes, and other related data for authentication or analysis purposes.

In some embodiments, the system may include a content analysis module for analyzing the observed content and the retrieved data. The content analysis module may compare the content hashes, verify the digital signatures, and analyze the content annotations to authenticate the content and identify any alterations. The content analysis module may also generate a detailed report of the authentication result, including the source identity, content claims, and a description of any detected alterations.

In some cases, the system may include a content display module for presenting the authentication result to the user. The content display module may display the observed content, the authentication result, and additional information, such as the source identity, content claims, and a description of any detected alterations. The content display module may also provide options for further actions, such as reporting unauthorized alterations or sharing the authentication result.

In some aspects, the system may include a content management module for managing the secure content packages, the watermarked digital audiovisual content, and the associated data. The content management module may coordinate the generation, watermarking, storage, distribution, retrieval, and authentication of the content. The content management module may also manage the Secure Database 122, the content annotations, the content hashes, and other related data.

In some embodiments, the system may include a content editing module for editing the digital audiovisual content. The content editing module may apply various modifications to the content, such as cropping, resizing, rotating, filtering, or overlaying. The content editing module may also apply additional watermarks to the content, either replacing the existing watermark or adding a new watermark alongside the existing one. The content editing module may preserve the integrity of the watermark and the associated data payload during the editing process.

In some cases, the system may include a content generation module for generating the digital audiovisual content. The content generation module may be a physical camera, a phone camera, a generative AI model, or any other source of digital audiovisual content. The content generation module may generate the content in various formats, such as images, videos, audio files, or other types of digital media. The content generation module may also generate the content annotations, the content hashes, and other related data.

In some aspects, the system may include a content transmission module for transmitting the secure content package and the watermarked digital audiovisual content. The content transmission module may facilitate the transmission of the content through various channels, such as online platforms, broadcast networks, or physical media. The content transmission module may also transmit the content identifier, the content annotations, the content hashes, and other related data.

In some embodiments, the system may include a content reception module for receiving the secure content package and the watermarked digital audiovisual content. The content reception module may receive the content from various sources, such as online platforms, broadcast networks, or physical media. The content reception module may also receive the content identifier, the content annotations, the content hashes, and other related data.

In some cases, the system may include a content decoding module for decoding the watermark and extracting the data payload. The content decoding module may use various decoding techniques to extract the content identifier and other data from the watermark. The content decoding module may also decode the content annotations, the content hashes, and other related data.

In some aspects, the system may include a content comparison module for comparing the observed content and the retrieved data. The content comparison module may compare the content hashes, verify the digital signatures, and analyze the content annotations to authenticate the content and identify any alterations. The content comparison module may also generate a detailed report of the comparison result, including the source identity, content claims, and a description of any detected alterations.

In some embodiments, the system may include a content reporting module for reporting the authentication result. The content reporting module may generate a detailed report of the authentication result, including the source identity, content claims, and a description of any detected alterations. The content reporting module may also provide options for further actions, such as reporting unauthorized alterations or sharing the authentication result.

In some cases, the system may include a content tracking module for tracking the distribution and usage of the watermarked digital audiovisual content. The content tracking module may monitor the distribution of the content through various channels, track the usage of the content by various users or devices, and record the authentication results for the content. The content tracking module may also generate a detailed report of the tracking result, including the distribution channels, usage statistics, and authentication results.

In some aspects, the system may include a content protection module for protecting the integrity and authenticity of the digital audiovisual content. The content protection module may apply various protection measures, such as watermarking, digital signatures, content hashes, and secure storage, to protect the content from unauthorized alterations or misuse. The content protection module may also monitor the distribution and usage of the content, detect any unauthorized alterations or misuse, and take appropriate actions to protect the content.

In some embodiments, the system may include a content sharing module for sharing the watermarked digital audiovisual content. The content sharing module may facilitate the sharing of the content through various channels, such as online platforms, social media, email, or physical media. The content sharing module may also share the content identifier, the content annotations, the content hashes, and other related data.

In some cases, the system may include a content search module for searching for the watermarked digital audiovisual content. The content search module may use various search techniques, such as keyword search, image search, audio search, or video search, to find the content. The content search module may also search for the content identifier, the content annotations, the content hashes, and other related data.

In some aspects, the system may include a content analysis module for analyzing the observed content and the retrieved data. The content analysis module may analyze the content annotations, the content hashes, and other related data to understand the content and its context. The content analysis module may also generate a detailed report of the analysis result, including the source identity, content claims, and a description of any detected alterations.

In some embodiments, the system may include a content display module for displaying the observed content and the authentication result. The content display module may display the content in various formats, such as images, videos, audio files, or other types of digital media. The content display module may also display the authentication result, including the source identity, content claims, and a description of any detected alterations.

In some cases, the system may include a content management module for managing the secure content packages, the watermarked digital audiovisual content, and the associated data. The content management module may coordinate the generation, watermarking, storage, distribution, retrieval, and authentication of the content. The content management module may also manage the Secure Database 122, the content annotations, the content hashes, and other related data.

In some aspects, the system may include a content editing module for editing the digital audiovisual content. The content editing module may apply various modifications to the content, such as cropping, resizing, rotating, filtering, or overlaying. The content editing module may also apply additional watermarks to the content, either replacing the existing watermark or adding a new watermark alongside the existing one. The content editing module may preserve the integrity of the watermark and the associated data payload during the editing process.

In some embodiments, the system may include a content generation module for generating the digital audiovisual content. The content generation module may be a physical camera, a phone camera, a generative AI model, or any other source of digital audiovisual content. The content generation module may generate the content in various formats, such as images, videos, audio files, or other types of digital media. The content generation module may also generate the content annotations, the content hashes, and other related data.

In some cases, the system may include a content transmission module for transmitting the secure content package and the watermarked digital audiovisual content. The content transmission module may facilitate the transmission of the content through various channels, such as online platforms, broadcast networks, or physical media. The content transmission module may also transmit the content identifier, the content annotations, the content hashes, and other related data.

In some aspects, the system may include a content reception module for receiving the secure content package and the watermarked digital audiovisual content. The content reception module may receive the content from various sources, such as online platforms, broadcast networks, or physical media. The content reception module may also receive the content identifier, the content annotations, the content hashes, and other related data.

In some embodiments, the system may include a content decoding module for decoding the watermark and extracting the data payload. The content decoding module may use various decoding techniques to extract the content identifier and other data from the watermark. The content decoding module may also decode the content annotations, the content hashes, and other related data.

In some cases, the system may include a content comparison module for comparing the observed content and the retrieved data. The content comparison module may compare the content hashes, verify the digital signatures, and analyze the content annotations to authenticate the content and identify any alterations. The content comparison module may also generate a detailed report of the comparison result, including the source identity, content claims, and a description of any detected alterations.

In some aspects, the system may include a content reporting module for reporting the authentication result. The content reporting module may generate a detailed report of the authentication result, including the source identity, content claims, and a description of any detected alterations. The content reporting module may also provide options for further actions, such as reporting unauthorized alterations or sharing the authentication result.

In some embodiments, the system may include a content tracking module for tracking the distribution and usage of the watermarked digital audiovisual content. The content tracking module may monitor the distribution of the content through various channels, track the usage of the content by various users or devices, and record the authentication results for the content. The content tracking module may also generate a detailed report of the tracking result, including the distribution channels, usage statistics, and authentication results.

In some cases, the system may include a content protection module for protecting the integrity and authenticity of the digital audiovisual content. The content protection module may apply various protection measures, such as watermarking, digital signatures, content hashes, and secure storage, to protect the content from unauthorized alterations or misuse. The content protection module may also monitor the distribution and usage of the content, detect any unauthorized alterations or misuse, and take appropriate actions to protect the content.

In some aspects, the system may include a content sharing module for sharing the watermarked digital audiovisual content. The content sharing module may facilitate the sharing of the content through various channels, such as online platforms, social media, email, or physical media. The content sharing module may also share the content identifier, the content annotations, the content hashes, and other related data.

In some embodiments, the system may include a content search module for searching for the watermarked digital audiovisual content. The content search module may use various search techniques, such as keyword search, image search, audio search, or video search, to find the content. The content search module may also search for the content identifier, the content annotations, the content hashes, and other related data.

In some cases, the system may include a content analysis module for analyzing the observed content Referring to FIG. 1, the Content Source Apparatus 100 is responsible for generating a secure content package. This package includes digital audiovisual content, information identifying a registered source entity, content annotations, and one or more digital signatures. The digital audiovisual content is produced by a Content Generator 109, which may be a physical camera, phone camera, generative AI model, camera application, gallery application, editing application, content upload portal, recording device, or any other source of digital audiovisual content. The secure content package is then transmitted to the Watermarking Apparatus 115 via data flow 114.

In some aspects, the secure content package is received from a registered source. The registered source may comprise one or more physical cameras, physical devices, software applications, generative AI models, digital libraries, or user accounts. The type, identity, and public keys of the source are recorded in a remote database so that the data can be later retrieved using a source identifier. The source information in the content data entry comprises this source identifier.

In some embodiments, the registered source stores, in a secure manner, a local private key that corresponds to a recorded public key. One or more of the computed digital signatures are created using this local private key on a message comprising other components of the secure content package. This ensures the authenticity of the content package and provides a mechanism for verifying the identity of the source entity.

In some cases, the registered source is associated with an account management system. One or more of the computed digital signatures serve to validate the account identity, such as an OAuth JWT from an external secure account login. One or more of the computed digital signatures serve to validate the content fidelity, such as a TLS certificate on the package network transmission. The data within the package corresponding to the account identity validation is sent with or before the data within the package corresponding to the content fidelity validation. This ensures that the identity of the source entity is verified before the content data is processed, providing an additional layer of security and trust in the system.

In some aspects, the secure content package generated by the Content Source Apparatus 100 includes content annotations. These annotations provide additional information about the digital audiovisual content and may be used for various purposes, such as content identification, content description, content categorization, content tracking, and content rights management.

The content annotations may comprise machine-generated fields. These fields may be automatically generated by the Content Generator 109 or another component of the Content Source Apparatus 100. The machine-generated fields may include, but are not limited to, timestamps, locations, origination claims, and selected metadata.

Timestamps may indicate the date and time when the digital audiovisual content was created, modified, or accessed. Locations may specify the geographical location where the content was created or the location within a digital library or file system where the content is stored. Origination claims may identify the entity or entities that created, own, or have rights to the content. Selected metadata may include various types of information about the content, such as file size, file format, resolution, duration, color depth, frame rate, bit rate, codec, compression method, and other technical specifications or characteristics of the content.

In some cases, the content annotations may also comprise user-inputted fields. These fields may be manually entered by a user, such as the owner, creator, distributor, or consumer of the content. The user-inputted fields may include, but are not limited to, descriptions, copyright licenses, and AI training permissions.

Descriptions may provide a textual summary or explanation of the content. Copyright licenses may specify the terms and conditions under which the content may be used, copied, distributed, modified, or otherwise exploited. AI training permissions may indicate whether and how the content may be used for training artificial intelligence models.

In some embodiments, the content annotations may be embedded into the watermark along with the content identifier. In other embodiments, the content annotations may be stored separately from the watermark, such as in the content database entry in the Secure Database 122. In either case, the content annotations may be later retrieved and used for various purposes, such as content search, content verification, content analysis, content management, content reporting, content tracking, content protection, content sharing, and content display.

In some aspects, the Content Source Apparatus 100 includes an Authentication Data 101 component that securely stores cryptographic keys for digital signatures. The Authentication Data 101 component may include a Public Key 102 and a Private Key 103. The Public Key 102 may be used by other components of the system, such as the Watermarking Apparatus 115 and the Verifier Apparatus 130, to authenticate the digital signatures included in the secure content package. The Private Key 103, also known as a signing key, is securely stored in the Content Source Apparatus 100 and is used to create the digital signatures on the content data and other components of the secure content package.

In some embodiments, the Content Source Apparatus 100 may generate one or more digital signatures using the Private Key 103. The digital signatures are computed on a message comprising other components of the secure content package, such as the digital audiovisual content, the source entity information, and the content annotations. The digital signatures serve to authenticate the content data and the source entity, ensuring the integrity and authenticity of the secure content package.

In some cases, the Content Source Apparatus 100 may be associated with an account management system. The account management system may manage various aspects of the registered source entity, such as user accounts, device registrations, and access permissions. The account management system may also facilitate the secure storage and management of the Private Key 103.

In some aspects, one or more of the computed digital signatures may serve to validate the account identity. For instance, an OAuth JSON Web Token (JWT) from an external secure account login may be used to validate the identity of the registered source entity. This provides an additional layer of security and trust in the system, ensuring that the source entity is who they claim to be.

In some embodiments, one or more of the computed digital signatures may serve to validate the content fidelity. For example, a Transport Layer Security (TLS) certificate on the secure content package network transmission may be used to validate the fidelity of the content data. This ensures that the content data has not been tampered with or altered during transmission, preserving the integrity of the content.

In some cases, the data within the secure content package corresponding to the account identity validation may be sent with or before the data within the package corresponding to the content fidelity validation. This ensures that the identity of the source entity is verified before the content data is processed, providing an additional layer of security and trust in the system.

In some aspects, the secure content package generated by the Content Source Apparatus 100 may include content annotations. These annotations may comprise user-inputted fields, such as descriptions, copyright licenses, or AI training permissions. The descriptions may provide a textual summary or explanation of the content. The copyright licenses may specify the terms and conditions under which the content may be used, copied, distributed, modified, or otherwise exploited. The AI training permissions may indicate whether and how the content may be used for training artificial intelligence models. These user-inputted fields provide additional information about the content and may be used for various purposes, such as content identification, content description, content categorization, content tracking, and content rights management.

In some aspects, the Content Source Apparatus 100 may be associated with an account management system. This association may be established during the registration process of the source entity, which may involve providing certain identification information, such as a username, password, or other credentials, to the account management system. The account management system may be responsible for managing various aspects of the registered source entity, such as user accounts, device registrations, access permissions, and other account-related settings and preferences.

In some embodiments, the Content Source Apparatus 100 may generate one or more digital signatures using the Private Key 103. These digital signatures are computed on a message comprising other components of the secure content package, such as the digital audiovisual content, the source entity information, and the content annotations. The digital signatures serve to authenticate the content data and the source entity, ensuring the integrity and authenticity of the secure content package.

In some cases, one or more of the computed digital signatures may serve to validate the account identity. For instance, an OAuth JSON Web Token (JWT) from an external secure account login may be used to validate the identity of the registered source entity. This provides an additional layer of security and trust in the system, ensuring that the source entity is who they claim to be. The OAuth JWT may be generated by the account management system and included in the secure content package as part of the source entity information. The JWT may contain various claims about the source entity, such as the issuer, subject, audience, and other claims, which can be verified by the Watermarking Apparatus 115 or the Verifier Apparatus 130 using the Public Key 102.

In some aspects, one or more of the computed digital signatures may serve to validate the content fidelity. For example, a Transport Layer Security (TLS) certificate on the secure content package network transmission may be used to validate the fidelity of the content data. This ensures that the content data has not been tampered with or altered during transmission, preserving the integrity of the content. The TLS certificate may be generated by the Content Source Apparatus 100 or another trusted entity, and included in the secure content package as part of the digital signatures.

In some embodiments, the data within the secure content package corresponding to the account identity validation may be sent with or before the data within the package corresponding to the content fidelity validation. This ensures that the identity of the source entity is verified before the content data is processed, providing an additional layer of security and trust in the system. The order of the data within the secure content package may be determined based on various factors, such as the security requirements, the size of the data, the processing capabilities of the receiving entity, or other considerations.

In some aspects, the Content Source Apparatus 100 may be associated with an account management system. This association may be established during the registration process of the source entity, which may involve providing certain identification information, such as a username, password, or other credentials, to the account management system. The account management system may be responsible for managing various aspects of the registered source entity, such as user accounts, device registrations, access permissions, and other account-related settings and preferences.

In some embodiments, the Content Source Apparatus 100 may generate one or more digital signatures using the Private Key 103. These digital signatures are computed on a message comprising other components of the secure content package, such as the digital audiovisual content, the source entity information, and the content annotations. The digital signatures serve to authenticate the content data and the source entity, ensuring the integrity and authenticity of the secure content package.

In some cases, one or more of the computed digital signatures may serve to validate the account identity. For instance, an OAuth JSON Web Token (JWT) from an external secure account login may be used to validate the identity of the registered source entity. This provides an additional layer of security and trust in the system, ensuring that the source entity is who they claim to be. The OAuth JWT may be generated by the account management system and included in the secure content package as part of the source entity information. The JWT may contain various claims about the source entity, such as the issuer, subject, audience, and other claims, which can be verified by the Watermarking Apparatus 115 or the Verifier Apparatus 130 using the Public Key 102.

In some aspects, one or more of the computed digital signatures may serve to validate the content fidelity. For example, a Transport Layer Security (TLS) certificate on the secure content package network transmission may be used to validate the fidelity of the content data. This ensures that the content data has not been tampered with or altered during transmission, preserving the integrity of the content. The TLS certificate may be generated by the Content Source Apparatus 100 or another trusted entity, and included in the secure content package as part of the digital signatures.

In some embodiments, the data within the secure content package corresponding to the account identity validation may be sent with or before the data within the package corresponding to the content fidelity validation. This ensures that the identity of the source entity is verified before the content data is processed, providing an additional layer of security and trust in the system. The order of the data within the secure content package may be determined based on various factors, such as the security requirements, the size of the data, the processing capabilities of the receiving entity, or other considerations.

In some aspects, the Content Source Apparatus 100 may be associated with an account management system. This association may be established during the registration process of the source entity, which may involve providing certain identification information, such as a username, password, or other credentials, to the account management system. The account management system may be responsible for managing various aspects of the registered source entity, such as user accounts, device registrations, access permissions, and other account-related settings and preferences.

In some embodiments, the Content Source Apparatus 100 may generate one or more digital signatures using the Private Key 103. These digital signatures are computed on a message comprising other components of the secure content package, such as the digital audiovisual content, the source entity information, and the content annotations. The digital signatures serve to authenticate the content data and the source entity, ensuring the integrity and authenticity of the secure content package.

In some cases, one or more of the computed digital signatures may serve to validate the account identity. For instance, an OAuth JSON Web Token (JWT) from an external secure account login may be used to validate the identity of the registered source entity. This provides an additional layer of security and trust in the system, ensuring that the source entity is who they claim to be. The OAuth JWT may be generated by the account management system and included in the secure content package as part of the source entity information. The JWT may contain various claims about the source entity, such as the issuer, subject, audience, and other claims, which can be verified by the Watermarking Apparatus 115 or the Verifier Apparatus 130 using the Public Key 102.

In some aspects, one or more of the computed digital signatures may serve to validate the content fidelity. For example, a Transport Layer Security (TLS) certificate on the secure content package network transmission may be used to validate the fidelity of the content data. This ensures that the content data has not been tampered with or altered during transmission, preserving the integrity of the content. The TLS certificate may be generated by the Content Source Apparatus 100 or another trusted entity, and included in the secure content package as part of the digital signatures.

In some embodiments, the data within the secure content package corresponding to the account identity validation may be sent with or before the data within the package corresponding to the content fidelity validation. This ensures that the identity of the source entity is verified before the content data is processed, providing an additional layer of security and trust in the system. The order of the data within the secure content package may be determined based on various factors, such as the security requirements, the size of the data, the processing capabilities of the receiving entity, or other considerations.

Figure 3:
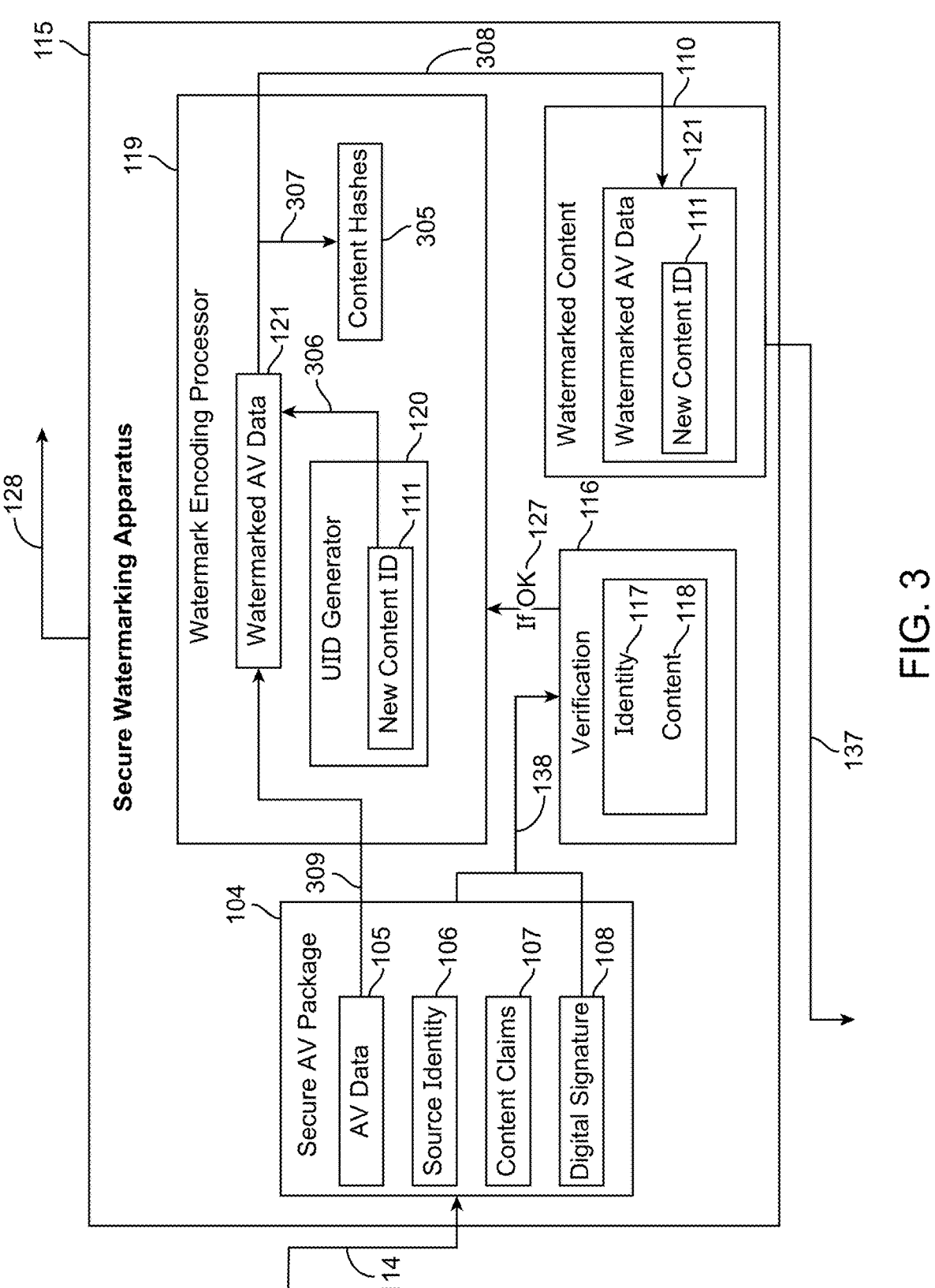
FIG. 3 illustrates a block diagram of a Secure Watermarking Apparatus for processing and authenticating digital audiovisual content, according to aspects of the present disclosure.

Referring to FIG. 3, the Secure Watermarking Apparatus 115 is responsible for processing and authenticating the digital audiovisual content. The apparatus receives the secure content package from the Content Source Apparatus 100 via data flow 114. The secure content package includes digital audiovisual content, source entity information, content annotations, and digital signatures.

Upon receiving the secure content package, the Secure Watermarking Apparatus 115 performs a verification process. This process involves authenticating the secure content package using public-key cryptography. The verification process validates both the identity of the source entity and the fidelity of the content data using the digital signatures included in the secure content package.

Once the secure content package is validated, the Secure Watermarking Apparatus 115 generates a unique content identifier. This content identifier is generated by the UID Generator 120, which may use various techniques to ensure the uniqueness of the identifier. The generated content identifier serves as a unique reference to the digital audiovisual content and is used for subsequent retrieval and authentication of the content.

The Secure Watermarking Apparatus 115 then embeds a watermark into the digital audiovisual content. The watermark is designed to be both quickly readable by suitably-configured machines and largely imperceptible to the human eye. The watermark carries a data payload that includes the generated content identifier. The watermark embedding process is performed by the Watermark Encoding Processor 119, which may use various watermarking techniques to embed the watermark into the content without significantly affecting the quality or perceptibility of the content.

In some aspects, the Secure Watermarking Apparatus 115 may also apply one or more hash functions to the watermarked digital audiovisual content. These hash functions generate content hashes, which are unique representations of the content. The content hashes are generated by a hash processor, which may use various hash functions to produce the hashes. The hash functions may produce outputs that can be compared but may have variable length. The generated content hashes may fall under one of several categories, such as cryptographic, perceptive, differential, or compressive.

In some embodiments, one of the content hashes may be a cryptographic hash generated using the SHA-3 256 hash function. This cryptographic hash enables exact matching between the original watermarked content and a separate item of digital audiovisual content. The SHA-3 256 hash function is a secure hash algorithm that produces a fixed-size output from any input, providing a high level of security and resistance against collision attacks.

The Secure Watermarking Apparatus 115 stores the watermarked digital audiovisual content and the generated content hashes. The watermarked content and the hashes are stored in a content database entry in the Secure Database 122. The content database entry can be later retrieved using the generated content identifier for authentication purposes. The Secure Watermarking Apparatus 115 then transmits the watermarked digital audiovisual content to a media source for distribution or further processing.

In some embodiments, the Watermarking Apparatus 115 may apply a combination of different watermarking techniques to the digital audiovisual content to increase the overall durability of the watermark without significantly compromising its invisibility. This combination of watermarking techniques may include a corner-based discrete cosine transform (DCT) watermark and a global normalized correlation (NCR) watermark.

The corner-based DCT watermark may be applied to corner regions of the digital audiovisual content. The corner regions of the content may be selected based on various factors, such as the size of the content, the complexity of the content, the visibility of the watermark, or other considerations. The DCT watermark may be designed to be robust against various types of content modifications, such as cropping, scaling, rotation, or compression. The DCT watermark may encode the content identifier or other data in a manner that is largely imperceptible to the human eye but can be easily decoded by a suitably-configured machine.

The global NCR watermark, on the other hand, may be applied across the entire digital audiovisual content. The NCR watermark may be designed to be robust against various types of content modifications, such as noise addition, filtering, or compression. The NCR watermark may encode the content identifier or other data in a manner that is largely imperceptible to the human eye but can be easily decoded by a suitably-configured machine.

In some cases, the Watermarking Apparatus 115 may apply the corner-based DCT watermark and the global NCR watermark in a sequential or simultaneous manner. The specific order or manner of application may be determined based on various factors, such as the size of the content, the complexity of the content, the visibility of the watermark, the desired level of security, or other considerations.

In some aspects, the combination of the corner-based DCT watermark and the global NCR watermark may increase the overall durability of the watermark. The durability of the watermark refers to its ability to survive various types of content modifications, such as cropping, scaling, rotation, compression, noise addition, filtering, or other types of modifications. By applying a combination of different watermarking techniques, the system may ensure that at least one of the watermarks survives any given content modification, thereby increasing the overall durability of the watermark.

In some embodiments, the combination of the corner-based DCT watermark and the global NCR watermark may not significantly compromise the invisibility of the watermark. The invisibility of the watermark refers to its ability to be imperceptible to the human eye while still being easily readable by a suitably-configured machine. By carefully designing and applying the corner-based DCT watermark and the global NCR watermark, the system may ensure that the watermark is largely imperceptible to the human eye, thereby maintaining the visual quality of the digital audiovisual content.

In some embodiments, the Watermarking Apparatus 115 may include a hash processor configured to apply one or more hash functions to the watermarked digital audiovisual content. The hash processor may generate content hashes, which are unique representations of the content. The content hashes may be stored in the content database entry in the Secure Database 122. These hashes can be later retrieved and compared against corresponding hashes computed on content to be authenticated, providing an additional layer of security and verification.

The hash processor may use various hash functions to produce the content hashes. These hash functions may produce outputs that can be compared but may have variable length. The generated content hashes may fall under one of several categories, such as cryptographic, perceptive, differential, or compressive. Each category of hash functions may provide different advantages and may be suitable for different types of content or authentication requirements.

In some cases, one of the content hashes may be a cryptographic hash. Cryptographic hashes are designed to be unique for each unique input, making them highly effective for exact matching between the original watermarked content and a separate item of digital audiovisual content. In some embodiments, the hash processor may use the SHA-3 256 hash function to generate a cryptographic hash. The SHA-3 256 hash function is a secure hash algorithm that produces a fixed-size output from any input, providing a high level of security and resistance against collision attacks.

In some aspects, one of the content hashes may be a differential hash. Differential hashes are designed to identify and locate significant differences between the original watermarked content and a similar item of digital audiovisual content. To generate a differential hash, the hash processor may partition the content into a number of regions, compute seeded locally-sensitive hashes on each region, intertwine the results using a sparse matrix, and quantize the intertwined results into a hash format.

The Watermarking Apparatus 115 may also include a database interface configured to record a content database entry in the Secure Database 122. The content database entry may include the content annotations, source entity information, and the generated content hashes. The database interface may facilitate the storage and retrieval of these entries, allowing for efficient management of the watermarked content and its associated data.

In some embodiments, the Watermarking Apparatus 115 may include a storage module configured to store the watermarked digital audiovisual content. The storage module may store the watermarked content in a secure manner, preserving the integrity of the watermark and the associated data payload. The storage module may also store the secure content package, the content database entry, and other related data for future reference or retrieval.

In some cases, the Watermarking Apparatus 115 may include a transmission module configured to transmit the watermarked digital audiovisual content to a media source. The transmission module may facilitate the distribution of the watermarked content through various channels, such as online platforms, broadcast networks, or physical media. The transmission module may also transmit the content identifier, the content annotations, the content hashes, and other related data.

In some embodiments, the Watermarking Apparatus 115 may include a transmission module configured to transmit the watermarked digital audiovisual content to a media source. The transmission module may facilitate the distribution of the watermarked content through various channels, such as online platforms, broadcast networks, or physical media. The transmission module may also transmit the content identifier, the content annotations, the content hashes, and other related data. This transmission process may involve various communication protocols, data formats, and security measures to ensure the integrity, confidentiality, and availability of the transmitted content and data.

In some aspects, the Watermarking Apparatus 115 may include a hash processor configured to apply one or more hash functions to the watermarked digital audiovisual content. The hash processor may generate content hashes, which are unique representations of the content. The content hashes may be stored in the content database entry in the Secure Database 122. These hashes can be later retrieved and compared against corresponding hashes computed on content to be authenticated, providing an additional layer of security and verification.

The hash processor may use various hash functions to produce the content hashes. These hash functions may produce outputs that can be compared but may have variable length. The generated content hashes may fall under one of several categories, such as cryptographic, perceptive, differential, or compressive. Each category of hash functions may provide different advantages and may be suitable for different types of content or authentication requirements.

In some cases, one of the content hashes may be a cryptographic hash. Cryptographic hashes are designed to be unique for each unique input, making them highly effective for exact matching between the original watermarked content and a separate item of digital audiovisual content. In some embodiments, the hash processor may use the SHA-3 256 hash function to generate a cryptographic hash. The SHA-3 256 hash function is a secure hash algorithm that produces a fixed-size output from any input, providing a high level of security and resistance against collision attacks.

In some embodiments, the Watermarking Apparatus 115 may apply a combination of different watermarking techniques to the digital audiovisual content to increase the overall durability of the watermark without significantly compromising its invisibility. This combination of watermarking techniques may include a corner-based discrete cosine transform (DCT) watermark and a global normalized correlation (NCR) watermark.

The corner-based DCT watermark may be applied to corner regions of the digital audiovisual content. The corner regions of the content may be selected based on various factors, such as the size of the content, the complexity of the content, the visibility of the watermark, or other considerations. The DCT watermark may be designed to be robust against various types of content modifications, such as cropping, scaling, rotation, or compression. The DCT watermark may encode the content identifier or other data in a manner that is largely imperceptible to the human eye but can be easily decoded by a suitably-configured machine.

The global NCR watermark, on the other hand, may be applied across the entire digital audiovisual content. The NCR watermark may be designed to be robust against various types of content modifications, such as noise addition, filtering, or compression. The NCR watermark may encode the content identifier or other data in a manner that is largely imperceptible to the human eye but can be easily decoded by a suitably-configured machine.

Figure 4:
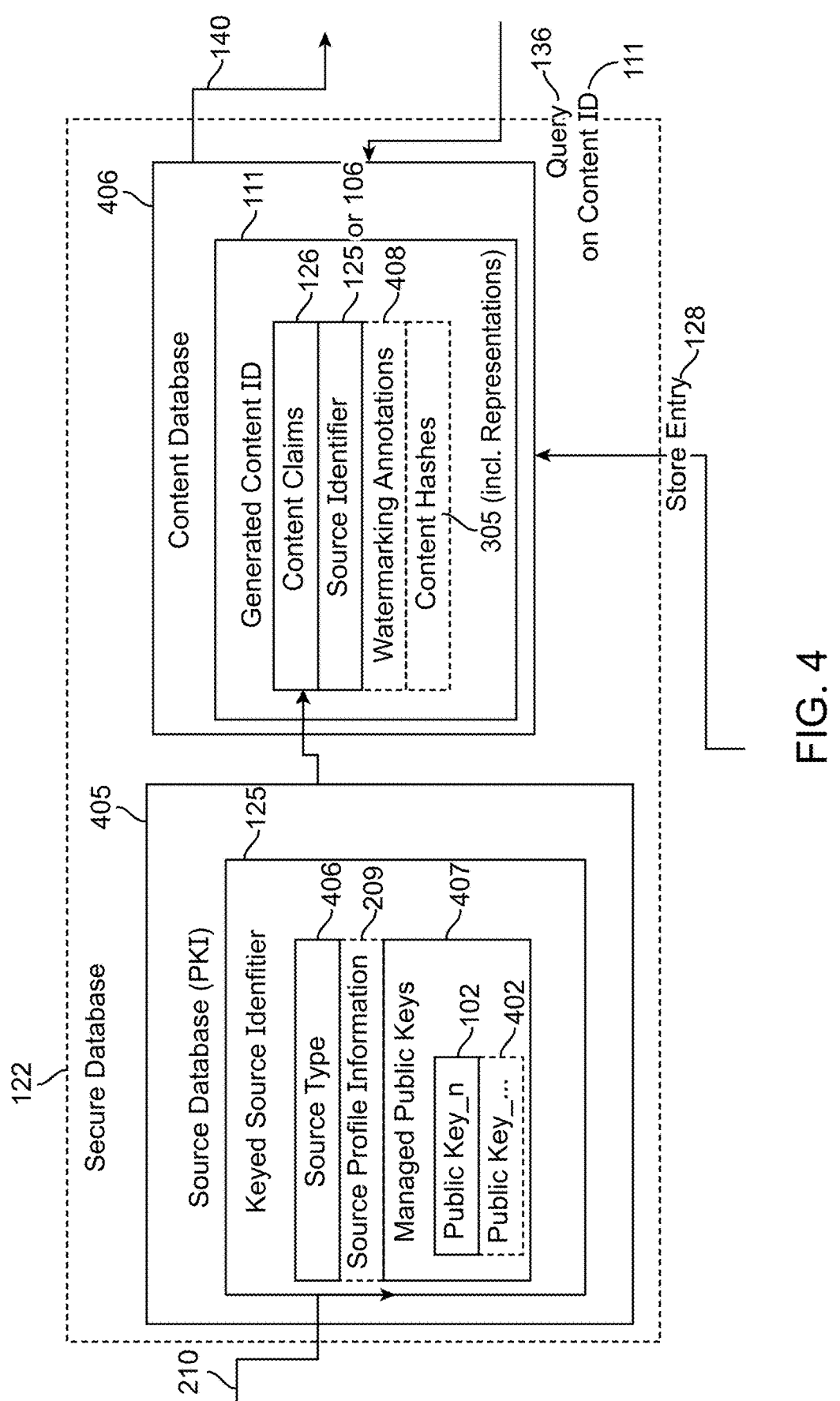
FIG. 4 illustrates a block diagram of a Secure Database system for managing and authenticating digital content, according to an embodiment.
Figure 5:
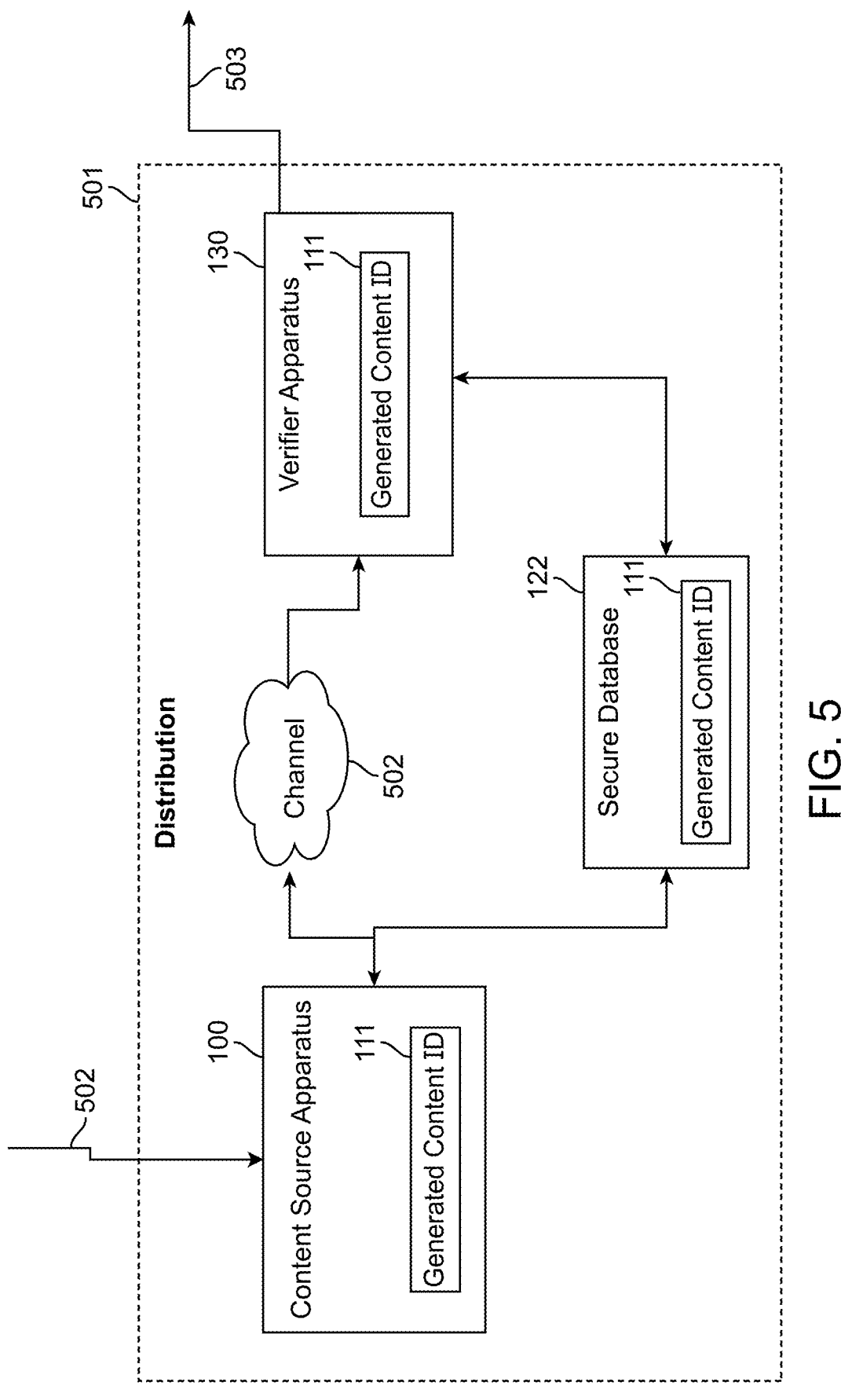
FIG. 5 illustrates a block diagram of a digital content authentication system, according to aspects of the present disclosure.

Referring to FIG. 4, the Secure Database 122 is a key component of the system, serving as a centralized repository for storing and managing information related to content sources and digital assets. The Secure Database 122 comprises two main components: a Source Database 405 and a Content Database 406.

The Source Database 405 stores information related to content sources. It includes a Keyed Source Identifier 125, which further contains Source Profile Information 209 and Managed Public Keys 407. The Source Profile Information 209 may include various details about the source entity, such as its type, identity, and other relevant attributes. The Managed Public Keys 407 section includes multiple public keys, such as Public Key 102 and Public Key 402. These public keys correspond to the private keys held by the registered source entities and are used for validating the digital signatures included in the secure content packages.

The Content Database 406, on the other hand, stores information about the digital audiovisual content itself. It contains a Generated Content ID 111, Content Claims 126, and Source Identifier 125 or 106. The Generated Content ID 111 serves as a unique identifier for each piece of digital audiovisual content and is used for subsequent retrieval and authentication of the content. The Content Claims 126 may include various annotations and metadata associated with the content, such as descriptions, timestamps, locations, copyright licenses, origination claims, and AI training permissions. The Source Identifier 125 or 106 links the content to its registered source entity, enabling traceability and accountability of the content.

In some aspects, the Secure Database 122 may also store the content hashes generated by the hash processor of the Watermarking Apparatus 115. These content hashes are unique representations of the watermarked digital audiovisual content and are stored in the content database entry corresponding to the Generated Content ID 111. The content hashes can be later retrieved and compared against corresponding hashes computed on content to be authenticated, providing an additional layer of security and verification.

In some embodiments, the Secure Database 122 may be implemented as a public or private ledger, such as a blockchain. This ensures that the recorded content entries cannot be lost or altered, providing a high level of data integrity and security. The block addresses of the blocks in which the content entries are stored may be conveyed through the content identifier, enabling efficient and secure retrieval of the content entries.

In some cases, the type, identity, and public keys of the source entity may be recorded in the Source Database 405. This data can be later retrieved using a source identifier, facilitating the validation of the source entity during the authentication process. The source identifier may be included in the secure content package and embedded into the watermark, providing a direct link between the watermarked content and its source entity.

In some aspects, the Secure Database 122 may be managed by a database interface of the Watermarking Apparatus 115. The database interface facilitates the recording and retrieval of the content database entries, allowing for efficient management of the watermarked content and its associated data. The database interface may also interact with the hash processor to store the generated content hashes in the content database entry, enabling future comparison against corresponding hashes computed on content to be authenticated.

In some embodiments, the Secure Database 122 may include a content database entry that comprises a number of secure server records. These secure server records may include a timestamp and information about the settings and results of the watermarking process. The timestamp may indicate the time at which the watermarking process was performed, providing a chronological record of the watermarking operations. The information about the settings and results of the watermarking process may include various details, such as the type of watermark used, the parameters of the watermarking algorithm, the size and format of the watermarked content, the generated content identifier, and any errors or issues encountered during the watermarking process. This information may be useful for troubleshooting, auditing, or analyzing the watermarking operations, and may also provide additional data for the authentication of the watermarked content.

In some cases, the Watermarking Apparatus 115 may include a database interface configured to record the content database entry in the Secure Database 122. The database interface may interact with the Secure Database 122 to store the content database entry, which includes the content annotations, source entity information, and the generated content hashes. The database interface may also record the secure server records in the content database entry. The secure server records may be stored in a specific field or section of the content database entry, or may be integrated with other data in the entry. The database interface may use various database operations, such as insert, update, or upsert operations, to record the secure server records in the content database entry.

In some aspects, the secure server records may be recorded in the content database entry at the time of the watermarking process. The Watermarking Apparatus 115 may generate the secure server records as part of the watermarking process, and the database interface may record the secure server records in the content database entry immediately after the watermarking process. This ensures that the secure server records are up-to-date and accurately reflect the settings and results of the watermarking process.

In some embodiments, the secure server records may be used for various purposes, such as auditing, troubleshooting, analysis, or authentication. For instance, the secure server records may be used to audit the watermarking operations, identify any issues or errors in the watermarking process, analyze the performance or effectiveness of the watermarking algorithm, or authenticate the watermarked content. The secure server records may also provide additional data for the authentication of the watermarked content, complementing the data provided by the content annotations, source entity information, and content hashes.

In some embodiments, the Secure Database 122 may be implemented as a public or private blockchain ledger. Blockchain technology is known for its ability to maintain a secure, immutable record of transactions, making it an ideal choice for storing and managing the content database entries. The use of a blockchain ledger ensures that the recorded content entries cannot be lost or altered, providing a high level of data integrity and security.

In a blockchain ledger, each block contains a number of transactions, and each block is linked to the previous block via a cryptographic hash. This forms a chain of blocks, hence the name "blockchain". The immutability of the blockchain comes from this linking of blocks: if an attacker attempts to alter a transaction in a block, they would need to alter the hash in that block and all subsequent blocks in the chain, which is computationally infeasible with current technology.

In the context of the present system, each content database entry can be considered a transaction that is recorded in a block in the blockchain ledger. The content database entry includes the content annotations, source entity information, and the generated content hashes. When a new content database entry is created, it is added to a new block, and this block is linked to the previous block in the blockchain.

The block addresses of the blocks in which the content database entries are stored may be conveyed through the content identifier. In other words, the content identifier may include information that allows the location of the corresponding content database entry in the blockchain ledger to be determined. This enables efficient and secure retrieval of the content database entries for authentication purposes.

In some cases, the source information in the content database entry comprises a source identifier. The source identifier may be a unique identifier that is assigned to the registered source entity. This source identifier allows the source entity to be uniquely identified and authenticated, and it may be included in the secure content package and embedded into the watermark. The source identifier provides a direct link between the watermarked content and its source entity, enabling traceability and accountability of the content.

In some embodiments, the Secure Database 122 may be implemented as a public or private blockchain ledger. Blockchain technology is known for its ability to maintain a secure, immutable record of transactions, making it an ideal choice for storing and managing the content database entries. The use of a blockchain ledger ensures that the recorded content entries cannot be lost or altered, providing a high level of data integrity and security.

In a blockchain ledger, each block contains a number of transactions, and each block is linked to the previous block via a cryptographic hash. This forms a chain of blocks, hence the name "blockchain". The immutability of the blockchain comes from this linking of blocks: if an attacker attempts to alter a transaction in a block, they would need to alter the hash in that block and all subsequent blocks in the chain, which is computationally infeasible with current technology.

In the context of the present system, each content database entry can be considered a transaction that is recorded in a block in the blockchain ledger. The content database entry includes the content annotations, source entity information, and the generated content hashes. When a new content database entry is created, it is added to a new block, and this block is linked to the previous block in the blockchain.

The block addresses of the blocks in which the content database entries are stored may be conveyed through the content identifier. In other words, the content identifier may include information that allows the location of the corresponding content database entry in the blockchain ledger to be determined. This enables efficient and secure retrieval of the content database entries for authentication purposes.

In some aspects, the content identifier generator of the Watermarking Apparatus 115 is configured to encode block addresses of blocks containing the content entries within the generated content identifier. This encoding process may involve various techniques, such as cryptographic hashing, encoding schemes, or other methods known in the art. The encoded block addresses provide a direct link between the content identifier and the corresponding content database entry in the blockchain ledger, facilitating efficient and secure retrieval of the content database entries.

In some cases, the unique content identifier encodes block addresses of blocks containing the database entry within the blockchain ledger. This encoding process may involve various techniques, such as cryptographic hashing, encoding schemes, or other methods known in the art. The encoded block addresses provide a direct link between the content identifier and the corresponding content database entry in the blockchain ledger, facilitating efficient and secure retrieval of the content database entries.

In some embodiments, the Watermarking Apparatus 115 may include a transmission module configured to transmit the watermarked digital audiovisual content to a media source. The transmission module may facilitate the distribution of the watermarked content through various channels, such as online platforms, broadcast networks, or physical media. The transmission module may also transmit the content identifier, the content annotations, the content hashes, and other related data.

The transmission module may be implemented as a network processor, a communication interface, or any other suitable component capable of transmitting digital data. The transmission module may use various communication protocols, such as HTTP, FTP, SMTP, or any other suitable protocol, to transmit the watermarked digital audiovisual content. The transmission module may also use various data formats, such as JPEG, PNG, MP4, or any other suitable format, to encode the watermarked digital audiovisual content for transmission.

In some cases, the transmission module may include a data compression module for compressing the watermarked digital audiovisual content before transmission. The data compression module may use various data compression algorithms, such as Huffman coding, run-length encoding, or any other suitable algorithm, to reduce the size of the watermarked digital audiovisual content without significantly compromising its quality or the readability of the watermark.

In some aspects, the transmission module may include a data encryption module for encrypting the watermarked digital audiovisual content before transmission. The data encryption module may use various data encryption algorithms, such as AES, RSA, or any other suitable algorithm, to protect the confidentiality of the watermarked digital audiovisual content during transmission.

In some embodiments, the transmission module may include a data integrity module for ensuring the integrity of the watermarked digital audiovisual content during transmission. The data integrity module may use various data integrity techniques, such as checksums, hash functions, or any other suitable technique, to detect any errors or alterations in the watermarked digital audiovisual content during transmission.

In some cases, the transmission module may include a data authentication module for authenticating the watermarked digital audiovisual content during transmission. The data authentication module may use various data authentication techniques, such as digital signatures, MACs, or any other suitable technique, to verify the authenticity of the watermarked digital audiovisual content during transmission.

In some aspects, the transmission module may include a data redundancy module for adding redundancy to the watermarked digital audiovisual content during transmission. The data redundancy module may use various data redundancy techniques, such as error correction codes, parity bits, or any other suitable technique, to increase the robustness of the watermarked digital audiovisual content during transmission.

In some embodiments, the transmission module may include a data rate control module for controlling the data rate of the watermarked digital audiovisual content during transmission. The data rate control module may use various data rate control techniques, such as traffic shaping, bandwidth throttling, or any other suitable technique, to manage the data rate of the watermarked digital audiovisual content during transmission.

In some cases, the transmission module may include a data buffering module for buffering the watermarked digital audiovisual content during transmission. The data buffering module may use various data buffering techniques, such as FIFO, LIFO, or any other suitable technique, to manage the buffering of the watermarked digital audiovisual content during transmission.

Figure 6:
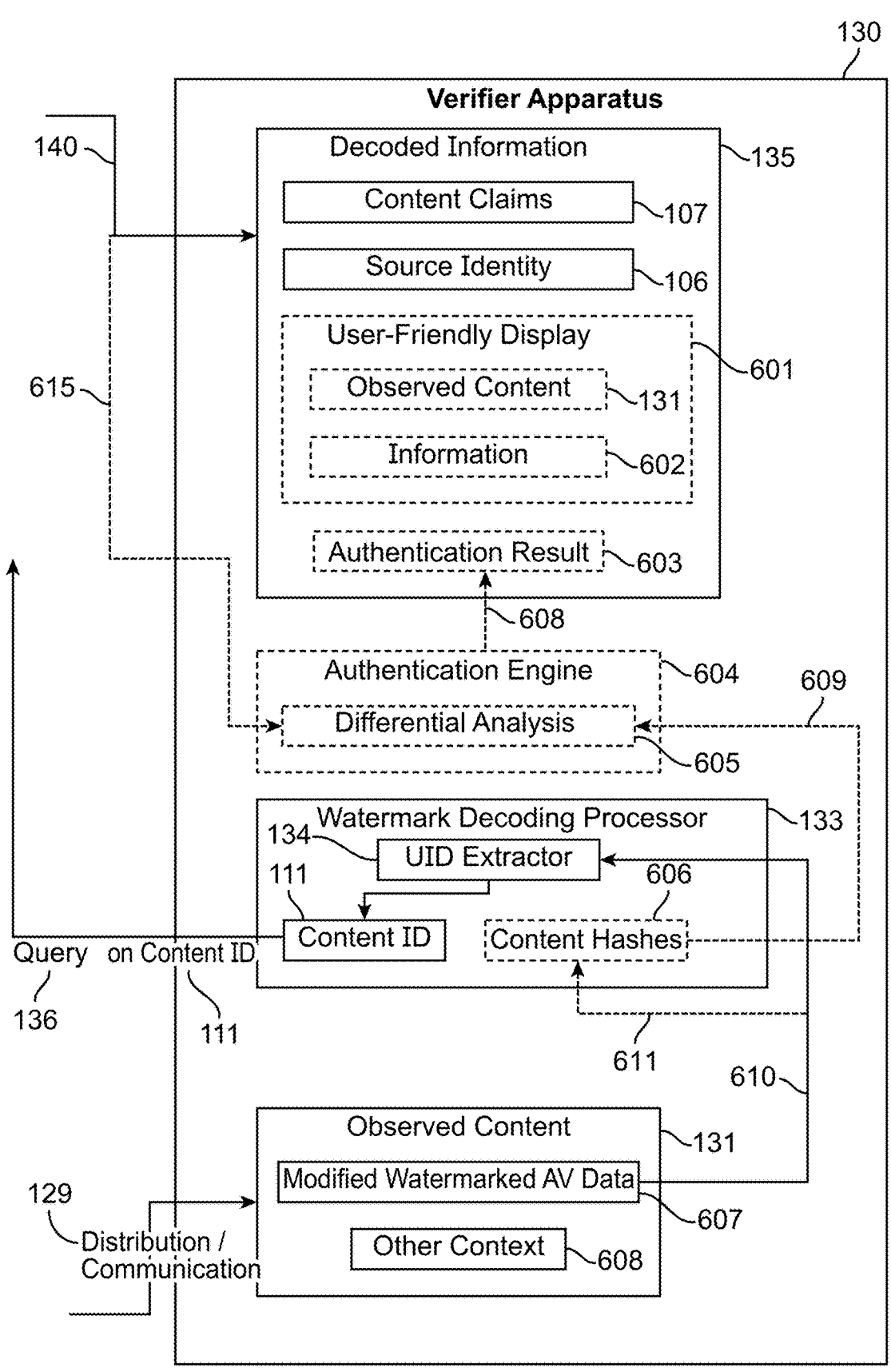
FIG. 6 illustrates a block diagram of a Verifier Apparatus for authenticating digital audiovisual content, according to an embodiment.
Figure 7:
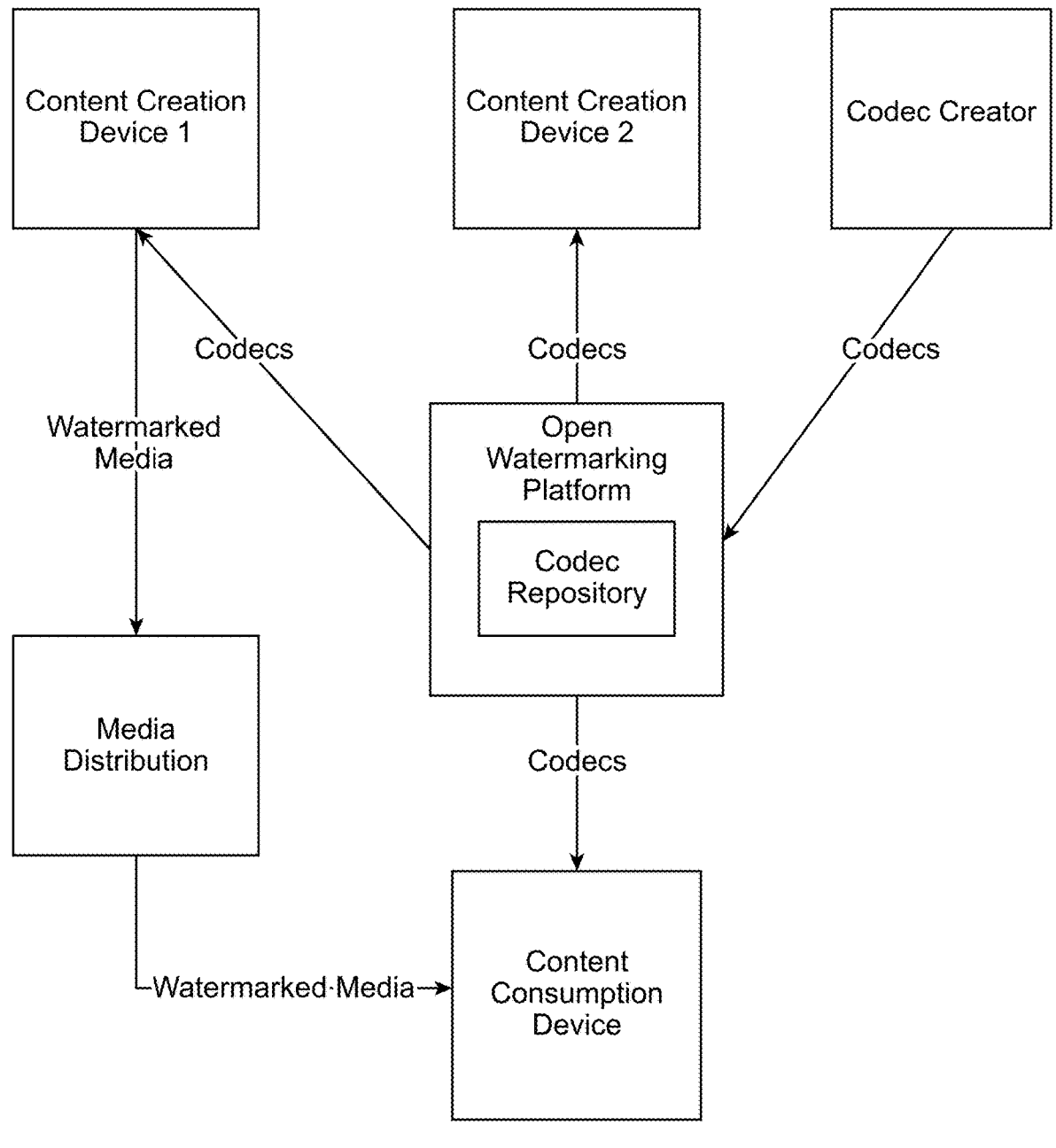
FIG. 7 illustrates a block diagram of an open watermarking system for digital media, according to aspects of the present disclosure.

Referring to FIG. 6, the Verifier Apparatus 130 is a key component of the system, responsible for the authentication of the watermarked digital audiovisual content. The Verifier Apparatus 130 receives the watermarked content and extracts the watermark using the Watermark Decoding Processor 133. The Watermark Decoding Processor 133 is configured to decode the watermark embedded in the observed content and extract the data payload carried by the watermark. This data payload typically includes the content identifier, which is used to retrieve the corresponding content database entry from the Secure Database 122.

The Verifier Apparatus 130 also includes a UID Extractor 134, which is configured to extract the unique content identifier from the data payload of the watermark. The extracted content identifier is then used to query the Secure Database 122 to retrieve the corresponding content database entry. This query operation is represented by data flow 136 in FIG. 6.

Upon retrieval of the content database entry, the Verifier Apparatus 130 performs a differential analysis to compare the observed content with the retrieved data. This differential analysis may involve comparing the content hashes, verifying the digital signatures, and analyzing the content annotations to authenticate the content and identify any alterations. The differential analysis may be performed by an authentication engine or a similar component within the Verifier Apparatus 130.

In some aspects, the Verifier Apparatus 130 may include a user interface for displaying the authentication result. The user interface may present the observed content along with additional information, such as the source identity, content claims, and a description of any detected alterations. The user interface may also provide options for further actions, such as reporting unauthorized alterations or sharing the authentication result.

In some embodiments, the Verifier Apparatus 130 may include a network interface for receiving the watermarked digital audiovisual content and for communicating with the Secure Database 122. The network interface may support various communication protocols and data formats to facilitate the secure and efficient transmission of data.

In some cases, the Verifier Apparatus 130 may include a memory for storing the observed content, the retrieved data, and the authentication result. The memory may be a volatile memory, such as RAM, or a non-volatile memory, such as a hard disk or flash memory. The memory may also store the software instructions for operating the Verifier Apparatus 130, including the watermark decoding algorithm, the differential analysis algorithm, and the user interface software.

In some aspects, the Verifier Apparatus 130 may include a processor for executing the software instructions and performing the various operations of the Verifier Apparatus 130. The processor may be a general-purpose processor, a specialized processor, or a combination thereof. The processor may also include multiple processing cores for parallel processing of tasks.

In some embodiments, the Verifier Apparatus 130 may include a power supply for providing power to the various components of the Verifier Apparatus 130. The power supply may be a battery, a power adapter, or any other suitable power source. The power supply may also include power management features to optimize the power consumption of the Verifier Apparatus 130.

Figure 2:
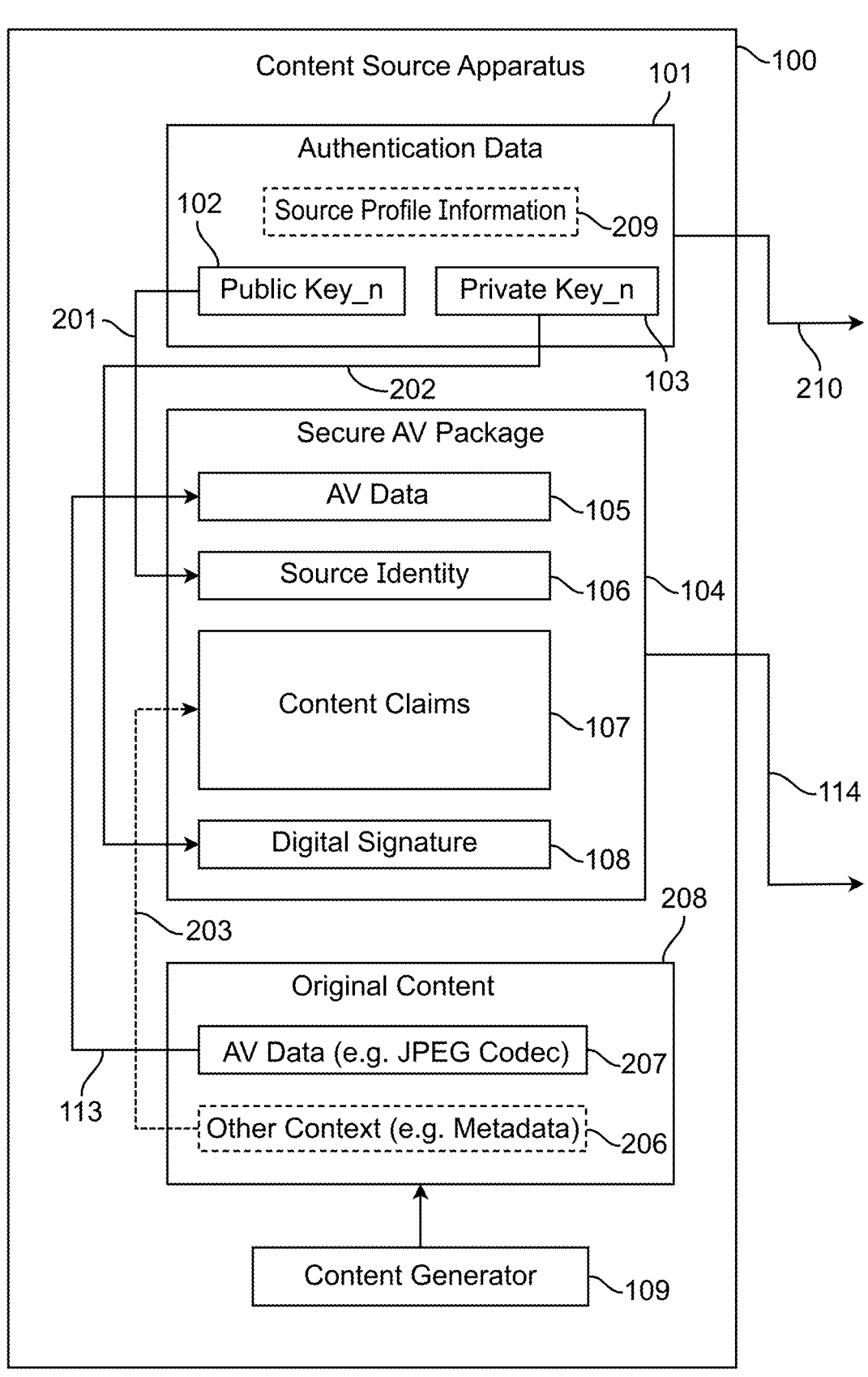
FIG. 2 illustrates a block diagram of a Content Source Apparatus for generating and authenticating digital audiovisual content, according to an embodiment.

Referring to FIG. 2, the open watermarking system for digital media includes several key components: content creation devices, an open watermarking platform, and content consumption devices. These components interact to facilitate the creation, distribution, and consumption of watermarked media.

In some aspects, the content creation devices may include various types of devices capable of generating digital media content. These devices may include, but are not limited to, digital cameras, smartphones, tablets, computers, and other devices equipped with media creation capabilities. In some cases, the content creation devices may also include software applications or services that generate digital media content, such as graphic design software, video editing software, or generative AI models.

The content creation devices are configured to generate digital media content and apply a watermark to the content. The watermark may be applied using one or more watermarking codecs, which are algorithms or sets of instructions for embedding a watermark into digital media content. The watermarking codecs may be provided by the open watermarking platform and may be selected based on various factors, such as the type of content, the desired level of security, the intended distribution channels, or user preferences.

The open watermarking platform serves as a central hub for the watermarking system. It includes a codec repository that stores various watermarking codecs. The codec repository may include a wide range of watermarking codecs, each designed for a specific type of content, level of security, or application scenario. The open watermarking platform may provide the watermarking codecs to the content creation devices on demand, or the codecs may be pre-installed or downloaded onto the devices.

In some embodiments, the open watermarking platform may also provide other services or features related to watermarking. For instance, it may provide tools or interfaces for selecting, configuring, or testing watermarking codecs. It may also provide services for managing, distributing, or updating watermarking codecs. In some cases, the open watermarking platform may also provide services for authenticating watermarked content, such as a verification service that checks the validity of a watermark or a lookup service that retrieves information associated with a watermark.

The content consumption devices are configured to receive and process watermarked media content. These devices may include various types of devices capable of displaying or playing digital media content, such as televisions, monitors, projectors, speakers, smartphones, tablets, computers, and other devices equipped with media playback capabilities. In some cases, the content consumption devices may also include software applications or services that display or play digital media content, such as media player software, web browsers, or streaming services.

The content consumption devices are configured to decode the watermark embedded in the received media content. The decoding process may involve extracting the watermark from the content, decoding the data payload carried by the watermark, and verifying the validity of the watermark. The decoding process may be performed using one or more watermarking codecs provided by the open watermarking platform. The watermarking codecs used for decoding may be the same as or compatible with the codecs used for embedding the watermark.

In some aspects, the content consumption devices may also perform other operations related to watermarking. For instance, they may retrieve information associated with the watermark, such as the source of the content, the time of creation, or other metadata. They may also check the integrity of the content by comparing the content with a reference version or by checking for signs of tampering. In some cases, the content consumption devices may also provide feedback or reporting features, such as reporting the detection of a watermark, reporting the results of a verification process, or reporting any issues or anomalies detected during the decoding process.

In some embodiments, the system may also include a media distribution component that facilitates the distribution of watermarked media content from the content creation devices to the content consumption devices. The media distribution component may include various types of distribution channels, such as broadcast networks, cable networks, satellite networks, internet networks, or physical media. The media distribution component may also include various types of distribution services, such as television broadcasting services, radio broadcasting services, streaming services, download services, or physical media distribution services.

In some cases, the media distribution component may also perform other operations related to watermarking. For instance, it may apply additional watermarks to the content, such as broadcast watermarks or distribution watermarks. It may also check the integrity of the content or the watermark during the distribution process. In some cases, the media distribution component may also provide feedback or reporting features, such as reporting the distribution of a watermarked content, reporting the results of a verification process, or reporting any issues or anomalies detected during the distribution process.

Figure 8:
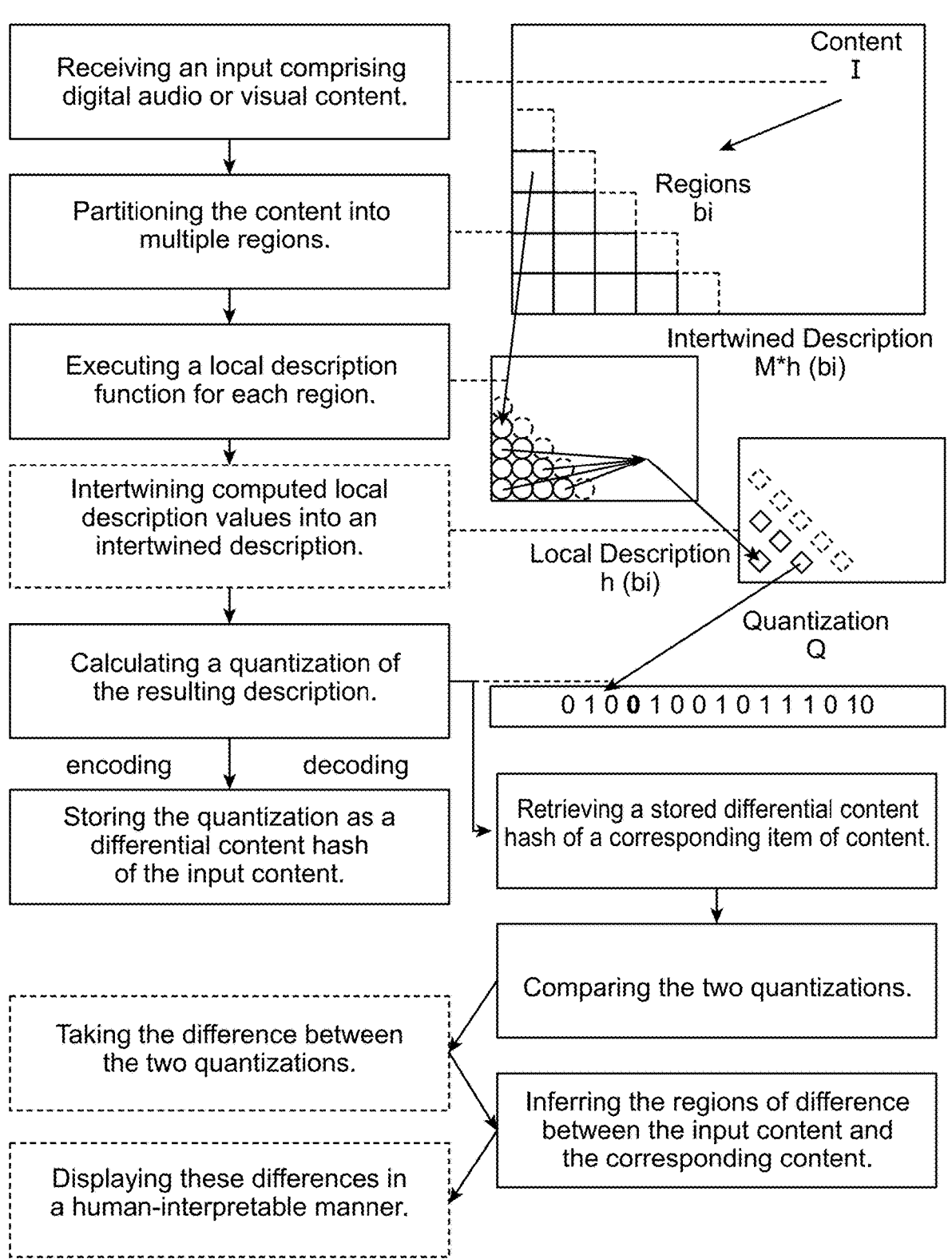
FIG. 8 illustrates a block diagram of a system for processing and comparing digital audio or visual content, according to an embodiment.

Referring to FIG. 8, the system for processing and comparing digital audio or visual content includes a hash processor configured to generate a differential hash. The differential hash is a unique representation of the content that enables the identification and localization of significant differences between the original watermarked content and a similar item of digital audiovisual content.

In some aspects, the hash processor generates the differential hash by partitioning the content into a plurality of regions. The partitioning process may involve dividing the content into equal-sized blocks, segments, or other sub-regions. The size and shape of the regions may be determined based on various factors, such as the size and resolution of the content, the type of content (e.g., image, video, audio), or the desired level of granularity for the differential analysis.

In some cases, the hash processor computes seeded locally-sensitive hashes for each region. Locally-sensitive hashing is a technique that hashes similar input items into the same "buckets" with high probability. The use of a seed in the hashing function ensures that the hash values are unique and unpredictable, enhancing the security of the hashing process.

In some embodiments, the hash processor intertwines the results of the locally-sensitive hashes using a sparse matrix. The sparse matrix may be a matrix in which most of the elements are zero, and it is used to mix or combine the locally-sensitive hashes in a specific way. The intertwining process may increase the robustness of the differential hash against various types of content modifications, such as cropping, scaling, rotation, or compression.

In some aspects, the hash processor quantizes the intertwined results into a hash format. The quantization process may involve rounding or truncating the intertwined results to a certain precision or number of bits. The quantized hash format may be designed to be compact and efficient for storage and comparison, while still preserving the essential information for differential analysis.

In some cases, the hash processor may be configured to generate multiple differential hashes for the same content, each using a different seed, partitioning scheme, intertwining matrix, or quantization level. This may provide multiple perspectives or levels of granularity for the differential analysis, enhancing the reliability and accuracy of the content comparison process.

In some embodiments, the hash processor may be integrated with the Watermarking Apparatus 115, or it may be a separate component or module within the system. The hash processor may be implemented in hardware, software, or a combination thereof, and it may be designed to operate efficiently on various types of content and in various computing environments.

In some embodiments, the hash processor applies a multi-step process to generate a differential hash. This process begins by partitioning the content into a plurality of regions. The partitioning may be performed in various ways, such as dividing the content into equal-sized blocks, segments, or other sub-regions. The size and shape of the regions may be determined based on various factors, such as the size and resolution of the content, the type of content (e.g., image, video, audio), or the desired level of granularity for the differential analysis.

Once the content is partitioned into regions, the hash processor computes seeded locally-sensitive hashes for each region. Locally-sensitive hashing is a technique that hashes similar input items into the same "buckets" with high probability. The use of a seed in the hashing function ensures that the hash values are unique and unpredictable, enhancing the security of the hashing process.

After computing the locally-sensitive hashes, the hash processor intertwines the results using a sparse matrix. The sparse matrix may be a matrix in which most of the elements are zero, and it is used to mix or combine the locally-sensitive hashes in a specific way. The intertwining process may increase the robustness of the differential hash against various types of content modifications, such as cropping, scaling, rotation, or compression.

Finally, the hash processor quantizes the intertwined results into a hash format. The quantization process may involve rounding or truncating the intertwined results to a certain precision or number of bits. The quantized hash format may be designed to be compact and efficient for storage and comparison, while still preserving the essential information for differential analysis.

The differential hash generated by this multi-step process enables the identification and localization of significant differences between the original watermarked content and a similar item of digital audiovisual content. This feature is particularly useful in applications where it is important to detect and locate alterations made to the content, such as in content authentication, copyright enforcement, or content integrity verification.

In some embodiments, the system may include a hash processor configured to apply one or more hash functions to the watermarked digital audiovisual content. These hash functions may produce outputs that can be compared but may have variable length. The hash functions may fall under one of several categories, such as cryptographic, perceptive, differential, or compressive. The computed hashes are stored in the content database entry in the Secure Database 122. These hashes, when later retrieved, can be compared against corresponding hashes computed on content to be authenticated, providing an additional layer of security and verification.

In some cases, one of the content hashes may be a cryptographic hash. Cryptographic hashes are designed to be unique for each unique input, meaning that even a small change in the input content will result in a significantly different hash output. This property makes cryptographic hashes particularly useful for detecting exact matches between the original watermarked content and a separate item of digital audiovisual content. If the cryptographic hashes of the two content items match exactly, it can be determined that the two content items are identical, barring the extremely unlikely event of a hash collision.

In some aspects, the hash processor may use the SHA-3 256 hash function to generate the cryptographic hash. The SHA-3 256 hash function is a member of the Secure Hash Algorithm 3 (SHA-3) family, which is a set of cryptographic hash functions standardized by the National Institute of Standards and Technology (NIST). The SHA-3 256 hash function produces a 256-bit hash value, providing a high level of security against collision attacks. The use of the SHA-3 256 hash function in the system provides a robust and secure method for generating cryptographic hashes, enhancing the reliability of the content authentication process.

Figure 9:
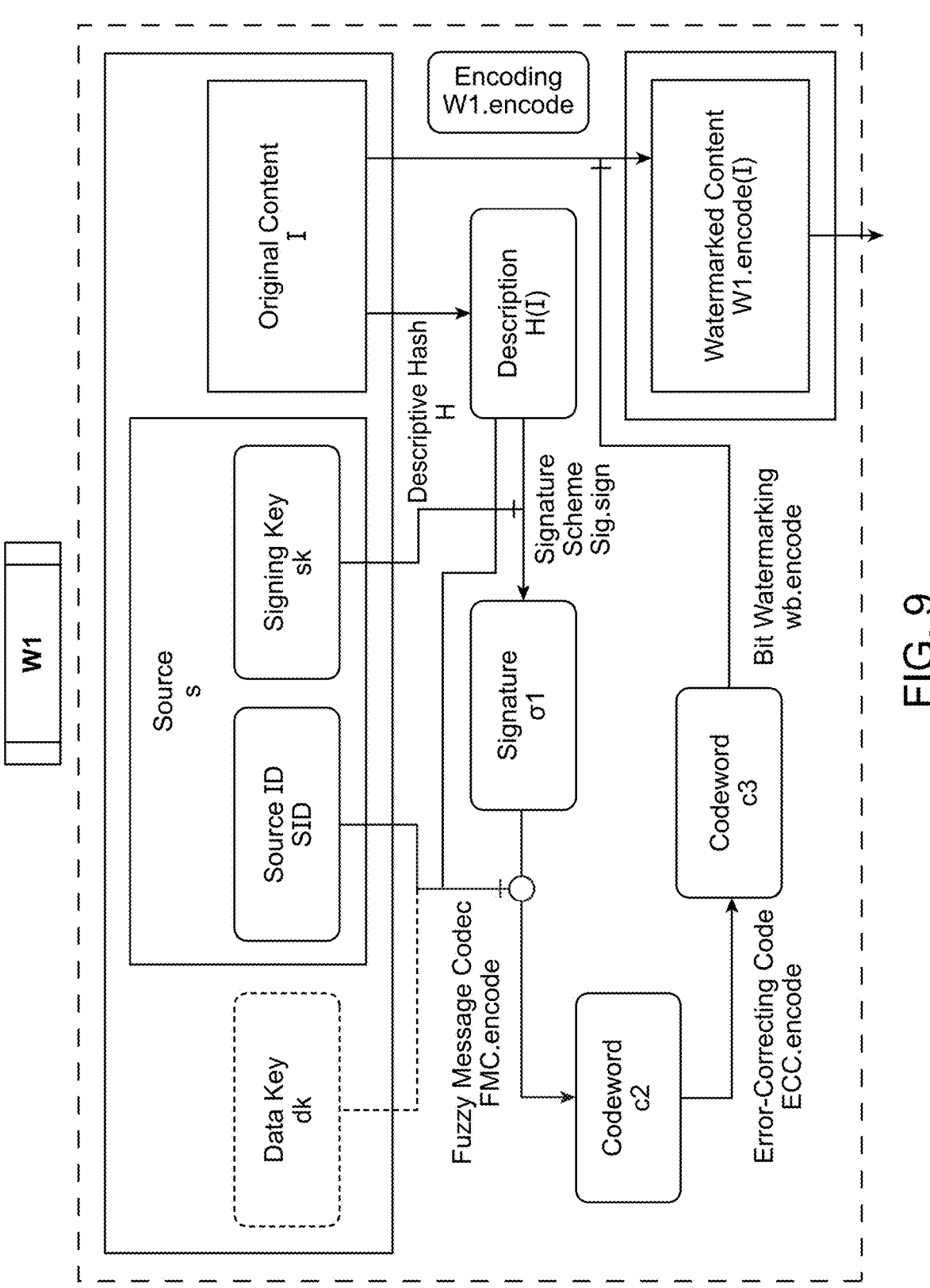
FIG. 9 illustrates a block diagram of a digital content watermarking system, according to aspects of the present disclosure.
Figure 9:
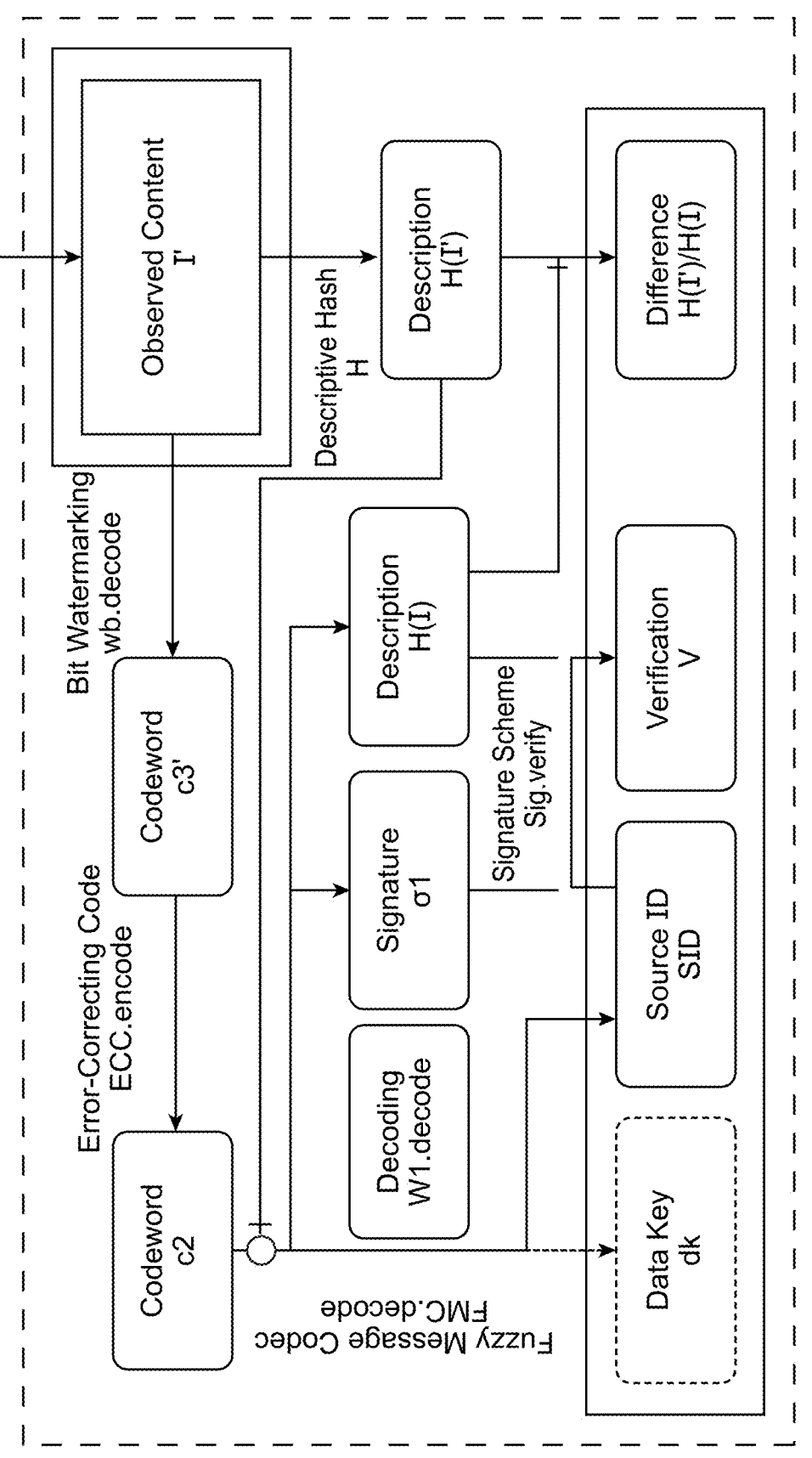

Referring to FIG. 9, the digital content watermarking system W1 is depicted. The system W1 comprises several components and processes for encoding and decoding watermarks into and from digital content. The system W1 includes a source component, which contains source information, a public key, a source ID, and a private key, also referred to as a signing key. The source component is responsible for generating the original content and the associated security information.

In some aspects, the system W1 may include a descriptive hash function H, which is applied to the original content to generate a description of the content. This description may include various characteristics or features of the content, such as its size, format, color distribution, texture, or any other suitable attributes. The description may be used to generate a signature using a signature scheme Sig.sign and the private key. The signature serves as a secure and verifiable proof of the authenticity and integrity of the content.

The system W1 may also include a fuzzy message codec FMC.encode for generating a codeword. The codeword is a representation of the content that is designed to be robust against various types of content modifications, such as cropping, scaling, rotation, or compression. The codeword may be generated by applying a fuzzy message encoding process to the description of the content.

In some cases, the system W1 may include an error-correcting code ECC.encode for further processing the codeword. The error-correcting code is designed to add redundancy to the codeword, enabling the recovery of the original content even in the presence of errors or alterations. The error-correcting code may be applied to the codeword to generate a final codeword, which is then embedded into the content as a watermark.

The watermarking process may be performed by a watermarking module, which is configured to embed the watermark into the content in a manner that is both robust against content modifications and largely imperceptible to human viewers. The watermarking module may use various watermarking techniques, such as spatial domain watermarking, frequency domain watermarking, or any other suitable techniques.

In some embodiments, the system W1 may include a decoding process for extracting the watermark from the observed content and verifying its authenticity. The decoding process may involve extracting the codeword from the watermark, decoding the codeword using an error-correcting code ECC.decode, and verifying the signature using a signature scheme Sig.verify and the public key. The decoding process may also involve generating a description of the observed content using a descriptive hash function H and comparing it with the description embedded in the watermark.

In some aspects, the system W1 may include a user interface for displaying the authentication result. The user interface may present the observed content along with additional information, such as the source identity, content claims, and a description of any detected alterations. The user interface may also provide options for further actions, such as reporting unauthorized alterations or sharing the authentication result.

In some cases, the system W1 may include a network interface for transmitting the watermarked content and the associated data. The network interface may facilitate the distribution of the watermarked content through various channels, such as online platforms, broadcast networks, or physical media. The network interface may also transmit the content identifier, the content annotations, the content hashes, and other related data.

In some embodiments, the system W1 may include a storage module for storing the watermarked content and the associated data. The storage module may store the content in a secure manner, preserving the integrity of the watermark and the associated data payload. The storage module may also store the secure content package, the content database entry, and other related data for future reference or retrieval.

In some aspects, the system W1 may include a retrieval module for retrieving the watermarked content and the associated data from the storage module. The retrieval module may use the content identifier to locate and retrieve the corresponding content database entry. The retrieval module may also retrieve the secure content package, the content hashes, and other related data for authentication or analysis purposes.

Figure 10:
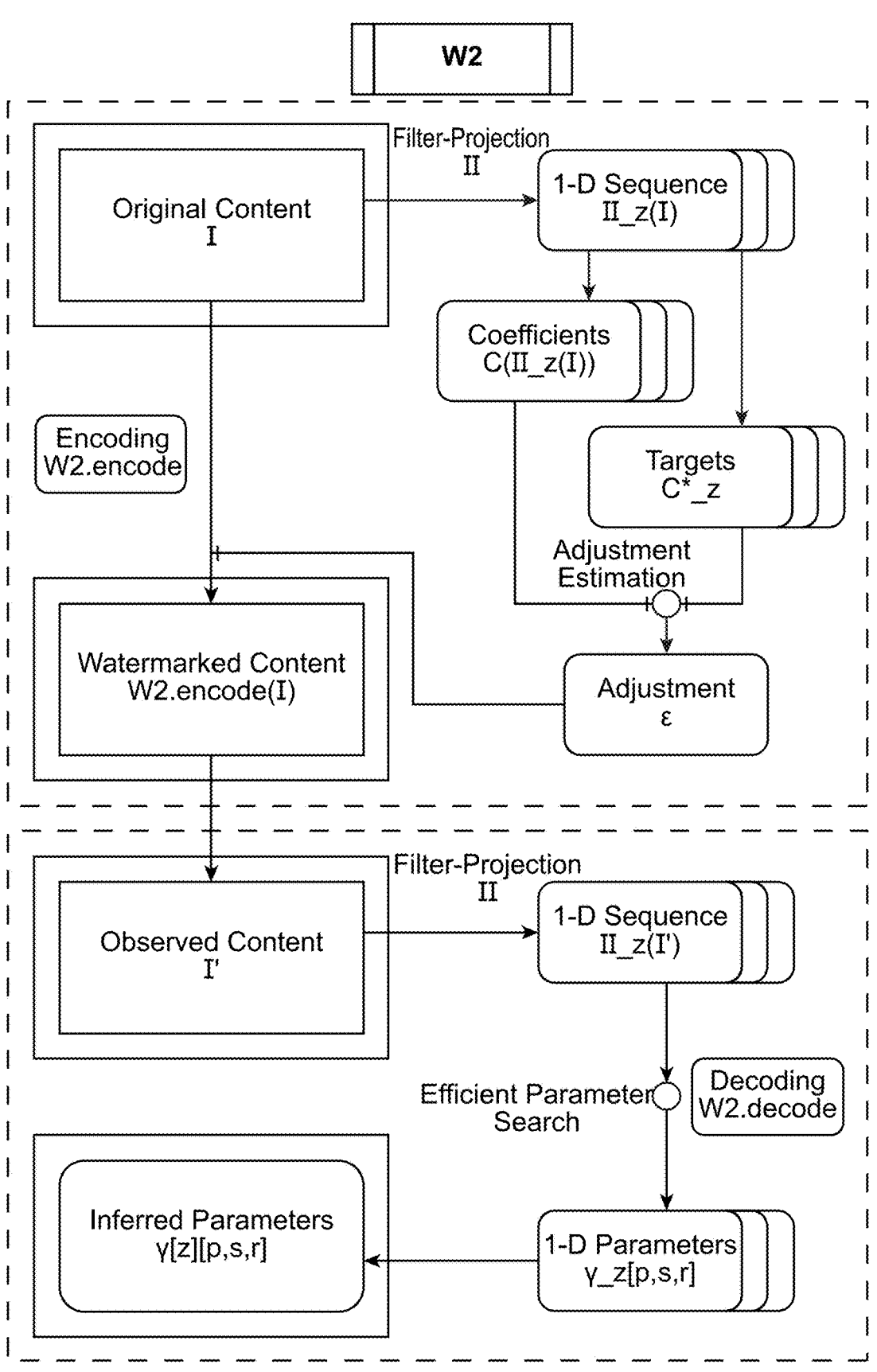
FIG. 10 illustrates a block diagram of a digital content watermarking system labeled W2, according to an embodiment.
Figure 11:
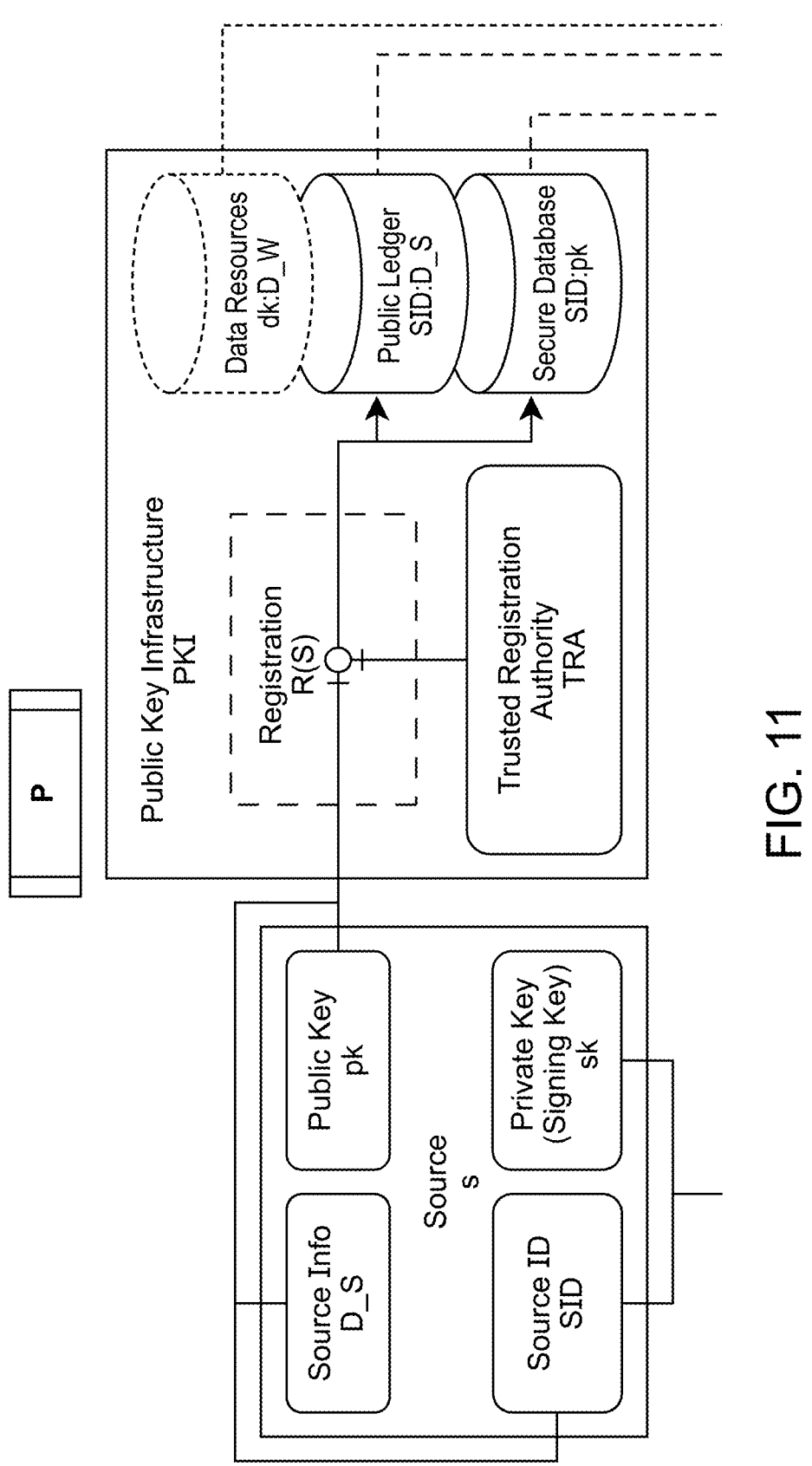
FIG. 11 illustrates a block diagram of a digital content watermarking and verification system, according to aspects of the present disclosure.
Figure 11:
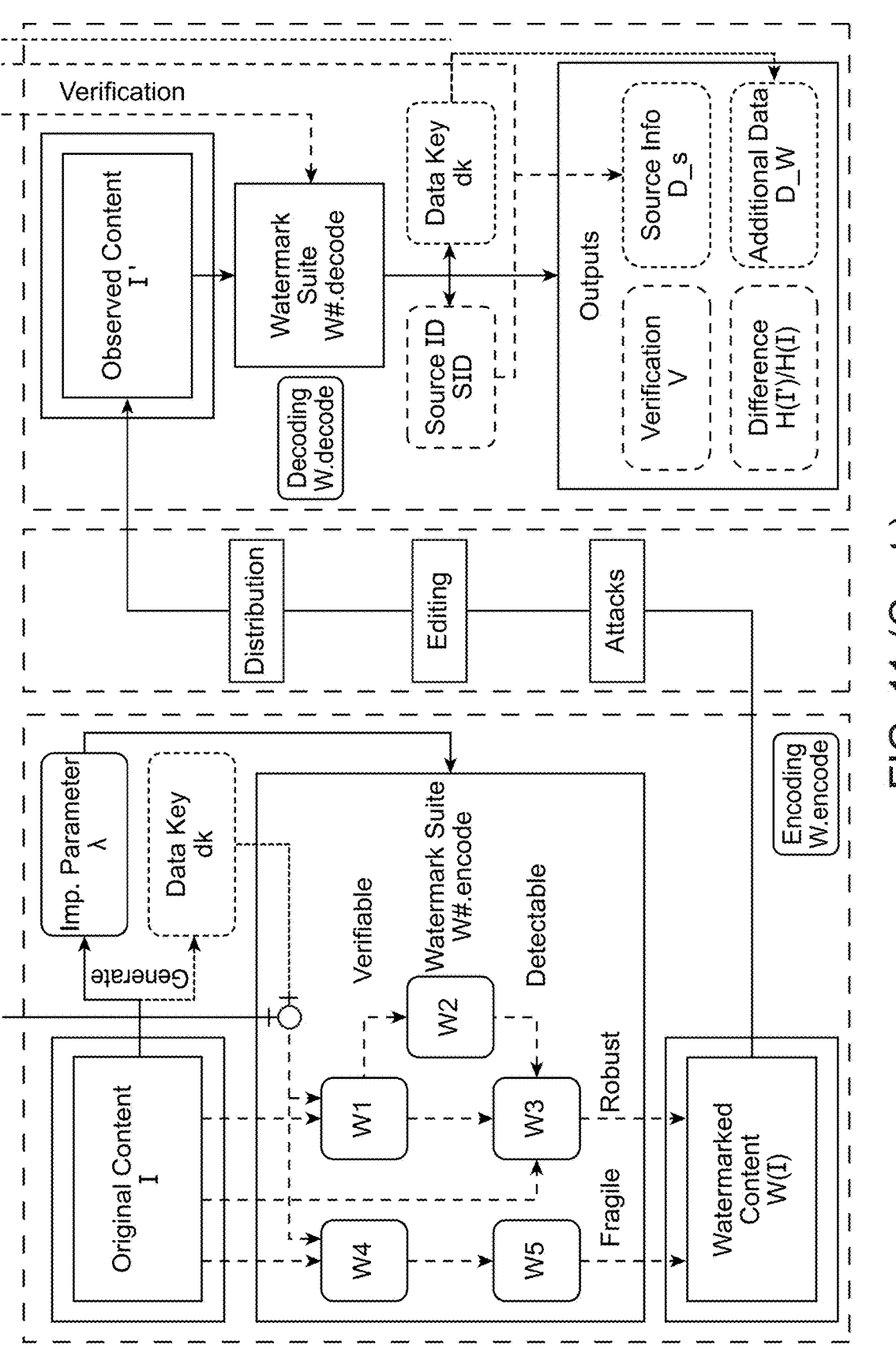

Referring to FIG. 10, the digital content watermarking system W2 is depicted. The system W2 comprises several components and processes for encoding and decoding watermarks into and from digital content. The system W2 includes a source component, which contains source information, a public key, a source ID, and a private key, also referred to as a signing key. The source component is responsible for generating the original content and the associated security information.

In some aspects, the system W2 may include a filter-projection operation which is applied to the original content to produce a 1-D sequence from the content. This operation may involve applying a filter to the content to extract certain features or characteristics, and then projecting the filtered content onto a 1-D space. The filter-projection operation may be designed to preserve certain properties of the content, such as its spatial structure, color distribution, texture, or any other suitable properties.

In some cases, the system W2 may include an efficient parameter search process that is performed on the 1-D sequence to generate 1-D parameters. The parameter search process may involve searching for optimal or near-optimal parameters that best represent the 1-D sequence. The parameters may include various types of information, such as the mean, variance, skewness, kurtosis, or any other suitable statistical measures of the 1-D sequence. The parameter search process may be designed to be efficient, such that it can be performed in real-time or near real-time, enabling the system W2 to process and watermark digital content in a timely manner.

In some embodiments, the system W2 may include a watermark embedding processor that is configured to embed the watermark into the content. The watermark embedding processor may use various watermarking techniques, such as spatial domain watermarking, frequency domain watermarking, or any other suitable techniques. The watermark embedding processor may also be configured to embed the watermark in a manner that is both robust against content modifications and largely imperceptible to human viewers.

In some aspects, the system W2 may include a watermark decoding processor that is configured to decode the watermark embedded in the observed content and extract the data payload carried by the watermark. The watermark decoding processor may use various decoding techniques to extract the data payload, such as correlation-based decoding, transform-based decoding, or any other suitable decoding techniques. The data payload typically includes the content identifier, which is used to retrieve the corresponding content database entry from the secure database.

In some cases, the system W2 may include a user interface for displaying the authentication result. The user interface may present the observed content along with additional information, such as the source identity, content claims, and a description of any detected alterations. The user interface may also provide options for further actions, such as reporting unauthorized alterations or sharing the authentication result.

In some embodiments, the Content Source Apparatus 100 may be associated with an account management system. This association may be established during the registration process of the source entity with the system. The account management system may be an external system, such as a social media platform, an email service, or a cloud storage service, that provides secure account management services, including user authentication, access control, and account settings management.

The account management system may provide a secure login mechanism for the source entity, such as a username and password combination, a two-factor authentication method, or a biometric authentication method. The secure login mechanism may be used to authenticate the identity of the source entity when it generates a secure content package. This authentication process may involve verifying the source entity's credentials, checking the source entity's access rights, or validating the source entity's session token.

In some cases, the account management system may also provide a secure communication channel for transmitting the secure content package from the Content Source Apparatus 100 to the Watermarking Apparatus 115. The secure communication channel may be established using various security protocols, such as Secure Sockets Layer (SSL), Transport Layer Security (TLS), or Internet Protocol Security (IPSec). The secure communication channel may protect the secure content package from unauthorized access, interception, or tampering during transmission.

In some aspects, the account management system may also provide a secure storage space for storing the secure content package, the watermarked digital audiovisual content, and the associated data. The secure storage space may be a secure database, a secure file system, or a secure cloud storage service. The secure storage space may protect the stored data from unauthorized access, modification, or deletion.

In some embodiments, the account management system may also provide various account management features for the source entity, such as account settings management, access control management, or activity logging. These features may allow the source entity to customize its account settings, manage its access rights, or monitor its activity history.

In some cases, the association between the Content Source Apparatus 100 and the account management system may be represented by a source identifier, which is included in the secure content package. The source identifier may be a unique identifier assigned to the source entity by the account management system, such as a user ID, a device ID, or an account ID. The source identifier may be used to identify the source entity in the system and to retrieve the source entity's information from the account management system.

Figure 12:
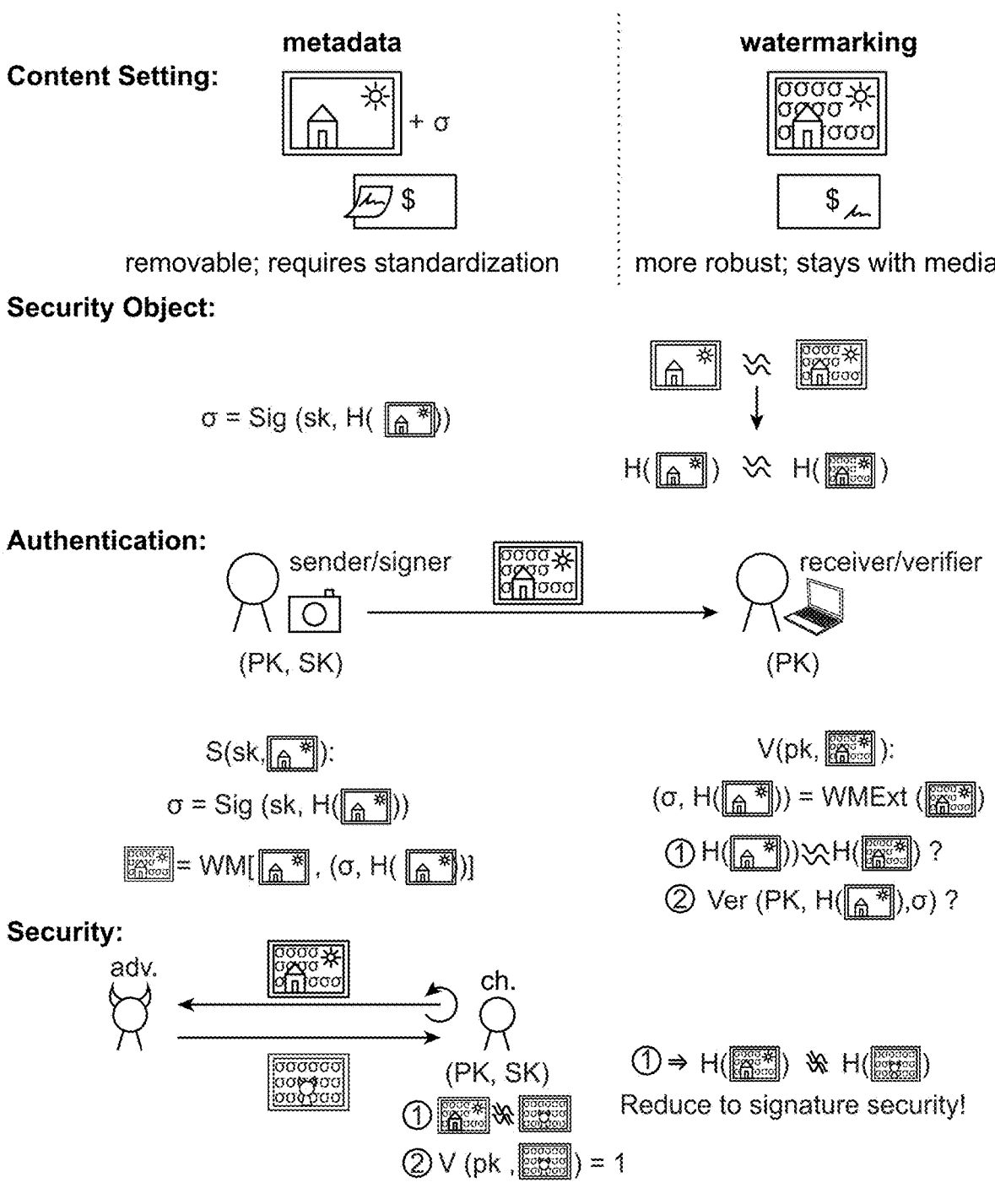
FIG. 12 illustrates a block diagram of a digital content authentication system, according to an embodiment.

Referring to FIG. 12, the digital content authentication system illustrates the interplay between different content setting approaches, the generation of a security object, the authentication process, and the detection of security threats.

In the Content Setting section, two approaches are compared: metadata and watermarking. The metadata approach is described as removable and requiring standardization, while the watermarking approach is noted as more robust and stays with the media. In some aspects, the choice between metadata and watermarking may depend on the specific requirements of the application, such as the desired level of security, the type of content, or the intended distribution channels.

The Security Object section shows mathematical representations for generating a signature using a signing key and a hash function applied to the content. This process involves creating a unique cryptographic signature that can be used to verify the authenticity and integrity of the content. The signature is generated by applying a hash function to the content to create a hash value, and then signing the hash value with the private key of the source entity. The resulting signature is a unique and verifiable proof of the authenticity and integrity of the content.

The Authentication section depicts the process of content transmission and verification between a sender/signer (1) and a receiver/verifier (2). The sender/signer (1) is shown with a camera icon and has access to both public and secret keys (pk, sk). The receiver/verifier (2) is represented with a computer icon and only has access to the public key (pk). The authentication process involves the sender/signer (1) creating a signature and watermarking the content. The receiver/verifier (2) then extracts the watermark and verifies the signature using the public key.

The Security section illustrates potential security threats, showing an adversary attempting to manipulate the content. It demonstrates how the system can detect alterations by comparing hash values and verifying signatures. This section highlights the robustness of the system against various types of content modifications and attacks, and its ability to detect and respond to security threats.

In some embodiments, the system may include additional security measures, such as error detection and correction codes, digital rights management (DRM) systems, or secure communication protocols, to further enhance the security and reliability of the content authentication process. The system may also include various user interfaces, reporting features, or management tools to facilitate the use and administration of the system.

Figure 13:
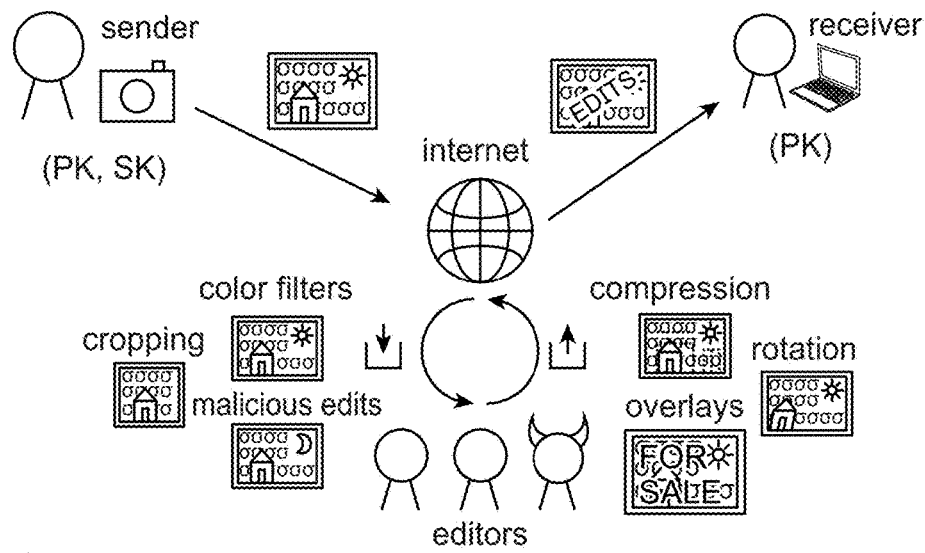
FIG. 13 illustrates a block diagram of a digital content security and authentication system, according to aspects of the present disclosure.
Figure 13:
Figure 13:

Referring to FIG. 13, the digital content security and authentication system illustrates the interplay between security settings, security objects, and content settings in maintaining content integrity and authenticity through transmission and potential modification processes.

In the Security Setting section, the system depicts a sender and a receiver communicating through a network. The sender, represented by a figure with a camera icon, has access to both public and secret keys (pk, sk). The receiver, represented by a figure with a computer icon, only has access to the public key (pk). This setup ensures that only the sender can generate valid signatures using the secret key, while anyone with the public key can verify these signatures. This public-key cryptography scheme provides a robust and secure method for authenticating the sender and verifying the integrity of the transmitted content.

The Security Object section shows mathematical representations for generating a signature using a signing key and a hash function applied to the content. This process involves creating a unique cryptographic signature that can be used to verify the authenticity and integrity of the content. The signature is generated by applying a hash function to the content to create a hash value, and then signing the hash value with the private key of the sender. The resulting signature is a unique and verifiable proof of the authenticity and integrity of the content.

In the Content Setting section, two approaches are compared: metadata and watermarking. The metadata approach is described as removable and requiring standardization, while the watermarking approach is noted as more robust and stays with the media. In some aspects, the choice between metadata and watermarking may depend on the specific requirements of the application, such as the desired level of security, the type of content, or the intended distribution channels.

The Authentication section depicts the process of content transmission and verification between the sender and the receiver. The sender creates a signature and watermarking the content. The receiver then extracts the watermark and verifies the signature using the public key. This process ensures that the content has not been tampered with during transmission and that it originates from the authenticated sender.

The Security section illustrates potential security threats, showing an adversary attempting to manipulate the content. It demonstrates how the system can detect alterations by comparing hash values and verifying signatures. This section highlights the robustness of the system against various types of content modifications and attacks, and its ability to detect and respond to security threats.

In some embodiments, the system may include additional security measures, such as error detection and correction codes, digital rights management (DRM) systems, or secure communication protocols, to further enhance the security and reliability of the content authentication process. The system may also include various user interfaces, reporting features, or management tools to facilitate the use and administration of the system.

Figure 14:
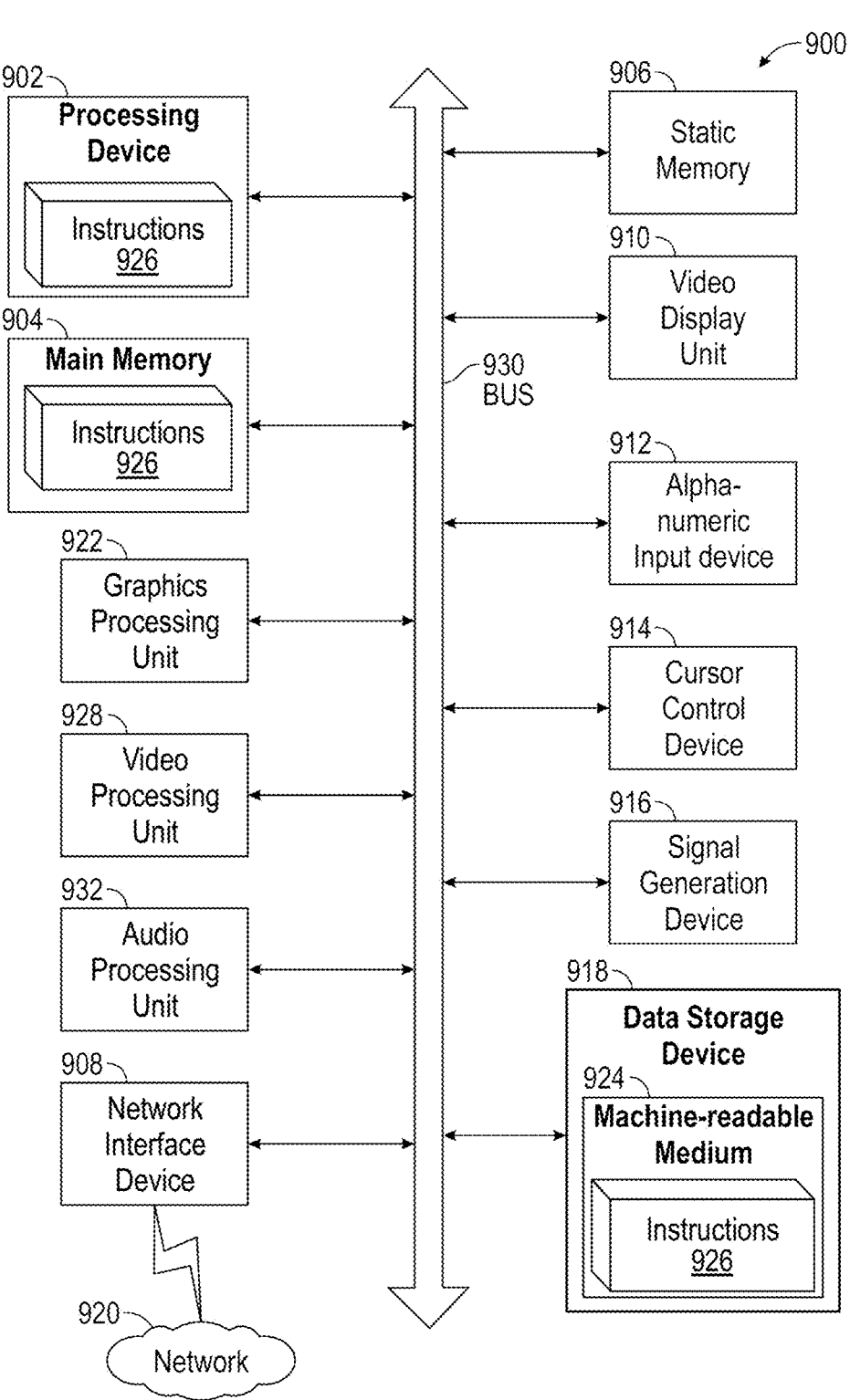
FIG. 14 illustrates a block diagram of a system, according to an embodiment.

Referring to FIG. 14, the system 900 is depicted as a computerized architecture for executing the methods of watermarking and processing digital audiovisual content. The system 900 includes a processing device 902, which may be a central processing unit (CPU), a graphics processing unit (GPU), or any other type of processing device capable of executing instructions. The processing device 902 is connected to a main memory 904 and a static memory 906, which store instructions 926 that are executed by the processing device 902. These instructions 926 may include various algorithms and processes for watermarking and processing digital audiovisual content, as described in the previous sections.

In some aspects, the system 900 may include specialized processing units for performing specific tasks related to the watermarking and processing of digital audiovisual content. For instance, the system 900 may include a graphics processing unit 922 for processing graphical data, a video processing unit 928 for processing video data, and an audio processing unit 932 for processing audio data. These specialized processing units may be configured to perform various operations, such as encoding and decoding watermarks, generating and comparing content hashes, and performing differential analysis on the content.

The system 900 also includes a network interface device 908 for communicating with external networks or devices. This network interface device 908 may facilitate the transmission of the secure content package and the watermarked digital audiovisual content, as well as the reception of observed content for authentication.

The system 900 further includes a data storage device 918, which contains a machine-readable medium 924 storing instructions 926. These instructions 926, when executed by the processing device 902, cause the system 900 to perform the methods of watermarking and processing digital audiovisual content as described herein.

In some cases, the system 900 may be implemented as a standalone device, such as a computer or a server. In other cases, the system 900 may be implemented as a distributed system comprising multiple interconnected devices, each performing a portion of the overall watermarking and processing tasks. The system 900 may also be implemented as a virtual machine or a container running on a cloud-based infrastructure, providing scalability and flexibility in the deployment and operation of the system.

In some embodiments, the system 900 may include a non-transitory computer-readable medium storing instructions that, when executed by a processor, cause the processor to perform a method of watermarking digital media. The method may include receiving a secure content package, validating the secure content package using public-key cryptography, generating a unique content identifier, embedding a watermark into the digital audiovisual content, recording a database entry in a remote database, storing the watermarked digital audiovisual content, and transmitting the watermarked digital audiovisual content to a media source. The non-transitory computer-readable medium may be any type of medium capable of storing data in a non-volatile manner, such as a hard disk, a solid-state drive, a flash memory, or an optical disc.

Figure 15:
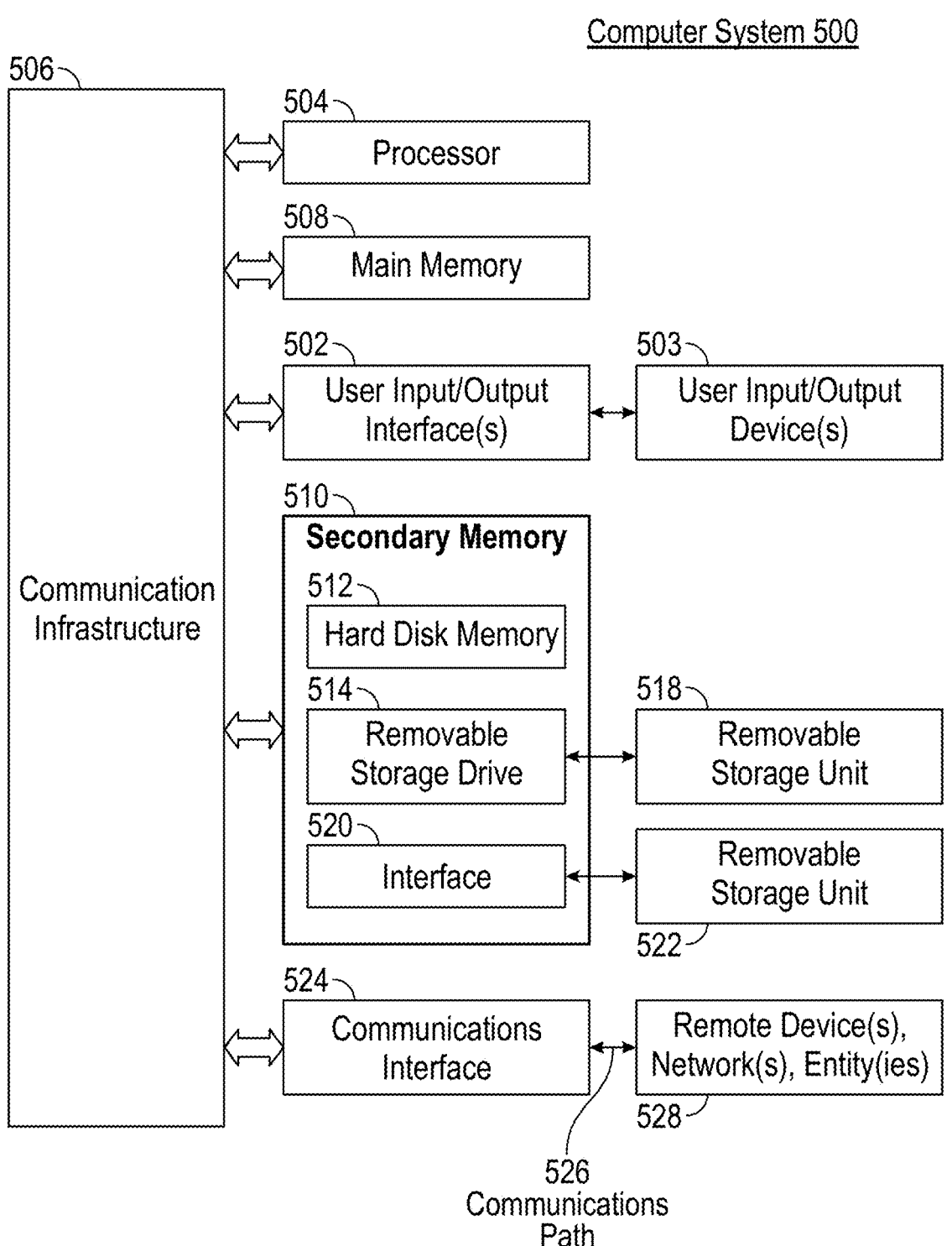
FIG. 15 illustrates a block diagram of a computer system, according to aspects of the present disclosure.

Referring to FIG. 15, the computer system 500 is depicted as a computerized architecture for executing the methods of watermarking and processing digital audiovisual content. The computer system 500 includes a processor 504, which may be a central processing unit (CPU), a graphics processing unit (GPU), or any other type of processing device capable of executing instructions. The processor 504 is connected to a main memory 508 and a secondary memory 510, which store instructions that are executed by the processor 504. These instructions may include various algorithms and processes for watermarking and processing digital audiovisual content, as described in the previous sections.

In some aspects, the computer system 500 may include a network interface device 908 for communicating with external networks or devices. This network interface device 908 may facilitate the transmission of the secure content package and the watermarked digital audiovisual content, as well as the reception of observed content for authentication.

The computer system 500 further includes a data storage device 918, which contains a machine-readable medium 924 storing instructions. These instructions, when executed by the processor 504, cause the computer system 500 to perform the methods of watermarking and processing digital audiovisual content as described herein.

In some cases, the computer system 500 may be implemented as a standalone device, such as a computer or a server. In other cases, the computer system 500 may be implemented as a distributed system comprising multiple interconnected devices, each performing a portion of the overall watermarking and processing tasks. The computer system 500 may also be implemented as a virtual machine or a container running on a cloud-based infrastructure, providing scalability and flexibility in the deployment and operation of the system.

In some embodiments, the computer system 500 may include a non-transitory computer-readable medium storing instructions that, when executed by a processor, cause the processor to perform a method of watermarking digital media. The method may include receiving a secure content package, validating the secure content package using public-key cryptography, generating a unique content identifier, embedding a watermark into the digital audiovisual content, recording a database entry in a remote database, storing the watermarked digital audiovisual content, and transmitting the watermarked digital audiovisual content to a media source.

In some aspects, the computer system 500 may include a user interface for displaying the authentication result. The user interface may present the observed content along with additional information, such as the source identity, content claims, and a description of any detected alterations. The user interface may also provide options for further actions, such as reporting unauthorized alterations or sharing the authentication result.

In some cases, the computer system 500 may include a content management module for managing the secure content packages, the watermarked digital audiovisual content, and the associated data. The content management module may coordinate the generation, watermarking, storage, distribution, retrieval, and authentication of the content. The content management module may also manage the secure database, the content annotations, the content hashes, and other related data.

In some embodiments, the computer system 500 may include a content editing module for editing the digital audiovisual content. The content editing module may apply various modifications to the content, such as cropping, resizing, rotating, filtering, or overlaying. The content editing module may also apply additional watermarks to the content, either replacing the existing watermark or adding a new watermark alongside the existing one. The content editing module may preserve the integrity of the watermark and the associated data payload during the editing process.

In some cases, the computer system 500 may include a content generation module for generating the digital audiovisual content. The content generation module may be a physical camera, a phone camera, a generative AI model, or any other source of digital audiovisual content. The content generation module may generate the content in various formats, such as images, videos, audio files, or other types of digital media. The content generation module may also generate the content annotations, the content hashes, and other related data.

In some aspects, the computer system 500 may include a content transmission module for transmitting the secure content package and the watermarked digital audiovisual content. The content transmission module may facilitate the transmission of the content through various channels, such as online platforms, broadcast networks, or physical media. The content transmission module may also transmit the content identifier, the content annotations, the content hashes, and other related data.

In some embodiments, the computer system 500 may include a content reception module for receiving the secure content package and the watermarked digital audiovisual content. The content reception module may receive the content from various sources, such as online platforms, broadcast networks, or physical media. The content reception module may also receive the content identifier, the content annotations, the content hashes, and other related data.

In some cases, the computer system 500 may include a content decoding module for decoding the watermark and extracting the data payload. The content decoding module may use various decoding techniques to extract the content identifier and other data from the watermark. The content decoding module may also decode the content annotations, the content hashes, and other related data.

In some aspects, the computer system 500 may include a content comparison module for comparing the observed content and the retrieved data. The content comparison module may compare the content hashes, verify the digital signatures, and analyze the content annotations to authenticate the content and identify any alterations. The content comparison module may also generate a detailed report of the comparison result, including the source identity, content claims, and a description of any detected alterations.

In some embodiments, the computer system 500 may include a content reporting module for reporting the authentication result. The content reporting module may generate a detailed report of the authentication result, including the source identity, content claims, and a description of any detected alterations. The content reporting module may also provide options for further actions, such as reporting unauthorized alterations or sharing the authentication result.

In some cases, the computer system 500 may include a content tracking module for tracking the distribution and usage of the watermarked digital audiovisual content. The content tracking module may monitor the distribution of the content through various channels, track the usage of the content by various users or devices, and record the authentication results for the content. The content tracking module may also generate a detailed report of the tracking result, including the distribution channels, usage statistics, and authentication results.

In some aspects, the computer system 500 may include a content protection module for protecting the integrity and authenticity of the digital audiovisual content. The content protection module may apply various protection measures, such as watermarking, digital signatures, content hashes, and secure storage, to protect the content from unauthorized alterations or misuse. The content protection module may also monitor the distribution and usage of the content, detect any unauthorized alterations or misuse, and take appropriate actions to protect the content.

In some embodiments, the computer system 500 may include a content sharing module for sharing the watermarked digital audiovisual content. The content sharing module may facilitate the sharing of the content through various channels, such as online platforms, social media, email, or physical media. The content sharing module may also share the content identifier, the content annotations, the content hashes, and other related data.

In some cases, the computer system 500 may include a content search module for searching for the watermarked digital audiovisual content. The content search module may use various search techniques, such as keyword search, image search, audio search, or video search, to find the content. The content search module may also search for the content identifier, the content annotations, the content hashes, and other related data.

In some aspects, the computer system 500 may include a content analysis module for analyzing the observed content and the retrieved data. The content analysis module may analyze the content annotations, the content hashes, and other related data to understand the content and its context. The content analysis module may also generate a detailed report of the analysis result, including the source identity, content claims, and a description of any detected alterations.

In some embodiments, the computer system 500 may include a content display module for displaying the observed content and the authentication result. The content display module may display the content in various formats, such as images, videos, audio files, or other types of digital media. The content display module may also display the authentication result, including the source identity, content claims, and a description of any detected alterations.

Watermarking Options

In some embodiments, options for watermarking an image can be configured. As non-limiting examples, options can include detection strength (represented as an integer range), robustness or strength (as an integer range), a fuzzy secure message or arbitrary content to securely encode into the watermark (as text), and a fragile secure message or arbitrary content to securely encode into the watermark (as text).

After selecting from the options and configurations, the user can select a command to watermark the image according to the parameters.

In some embodiments, the interface can show the original content along side the watermarked content, for comparison purposes.

The system can support various methods watermark detection. In some embodiments, the differential content hash is used to identify the changes made to the original image, according to the techniques described herein.

1 Constrained Devices 1.1 The Secure Content Package

To begin, the secure content package must be created, by a content generator device. This device produces the original digital audiovisual content. Normally, this will be a physical capture device, such as a standard analog or digital camera, a video or audio recorder, a phone camera, a webcam, or a security camera. However, some other devices, such as mobile applications, cloud-based web services, and individual content uploads, are also permissible.

In addition to producing the content, the content generator device also computes a hash or representation of the content, and then computes a digital signature. This makes it a secure content generator device.

In a simple embodiment, the hash or representation of the content can be a straightforward SHA-256 cryptographic hash of the pixel values of the content. However, there are many other methods of creating a hash or representation of the content, which are described below.

1.1.1 Content Hashing

There are many ways of representing digital audiovisual content in a concise manner, and they generally revolve around some sort of hash.

The primary class of hashes are the cryptographic hashes. These are functions that input a message m and output a hash h(m) in such a way that provides both preimage resistance, i.e. the message m cannot be easily inferred from h(m), and collision resistance, i.e. a message m' with h(m')=h(m) cannot be easily found. These offer provable security.

There are many cryptographic hashes that can be used, such as SHA-2 (256, 384), SHA-3 (256, 384), MD4, MD5, and many others.

The other class of hashes are the locally-sensitive hashes. These are functions that input a message m and output a hash h(m) in such a way that $\|h(m')-h(m)\|$ is small if $\|m'-m\|$ is small. These are more lacking in security, and are especially vulnerable to collision attacks. Their primary use case is to aid in identification of similar content.

There are two important sub-classes of locally-sensitive hashes. One are the perceptive hashes, which are designed specifically for digital audiovisual content. These are widely used, from facial recognition and fingerprint authentication to reverse image search and copyright protection.

Other differential hashes are described herein. Rather than optimizing for the identification of similar content, the hash is designed to detect and describe any moderately-sized modifications in the content, thus striking a careful balance between being robust to changes and providing security.

In a preferred embodiment, the hash used by the secure content generator device is a cryptographic hash, of the SHA-3 256 or SHA-3 384 variety. Furthermore, the hash stored in the database or in the watermark should be a differential hash, though a less-specialized perceptive hash is also permissible.

In addition to the existence of many types of hashes, there are also many ways in which the hash can be applied.

The hash can be applied to the raw content data, on a number of separate levels: the pixel-value level, the DCT-coefficient level, or the encoding-bytes level. The most appropriate level depends on the encoding method and the format container of the digital audiovisual content. For lossless formats (e.g. PNG, AVI), the pixel-value level is preferred; for lossy formats (e.g. JPEG, MPEG), the DCT-coefficient level is preferred.

The data used as the message in the hash can also be restricted to a portion of the content. This portion could be spatial, for example by taking the center region of an image. This portion could be temporal, for example by selecting a subset of I-frames in a video. This portion could be color-based, such as using solely the Y (luminance) layer in a JPEG. This portion could be bit-based, such as only keeping the most significant bits of the pixel values. More contrived use cases, for instance by using an algorithm to select a subset of the content data in a way that depends on the content (and thus offers some level of secrecy), are also permissible.

Lastly, multiple hashes can be combined, to form a composite hash. They can be simply concatenated, such as in a piecewise hash, or intertwined in a more complicated fashion.

In a preferred embodiment, the hash used by the secure content generator device is a single hash that uses the full raw content data as the message to be hashed. However, certain cases where significant benign editing is expected may demand a more careful treatment.

Using this hash or representation, a digital signature is then computed. This uses a cryptographic signature scheme, such as RSA, DSA, EdDSA (Ed25519, Ed448), ECDSA, and many others. The private/public key pair used to compute the signature should belong to the secure content generator device. Preferably, the private key is never shared, and an external public key infrastructure can certify the validity of the public key.

The secure content generator device then pairs the original content data along with the digital signature (plus public key identifier, if appropriate) into a so-called secure content package; this is what will be transmitted across applications or distributed across networks by a network processor to be received by the secure content watermarking apparatus. In some embodiments, the secure content package can include a digital audiovisual file whose main content can include the original content data and whose metadata addendum includes the digital signature.

In addition to these two elements, in some embodiments the second content package will also contain metadata information that provides additional insight into the nature of how the content was produced. This optional metadata is also produced by the secure content generator device and included in the secure content package, and is described below:

1.1.2 Optional Metadata

There are many metadata fields that can be recorded along with the original content data.

The first is the time at which the content was produced. In the case where the secure content generator device is a camera, this would be the time at which the photo is taken. This time can be represented in many different formats. In a preferred embodiment, the format should either be the ISO8601 string format or the Unix epoch integer format; both should be in UTC.

The second is the location in which the content was produced. In the case where the secure content generator device is a camera, this would be the location in which the photo is taken. This location can be represented in many different formats. In a preferred embodiment, the format should either be the ISO6709 string format or the decimal-degree integer tuple format.

The third is an identifier of the secure content generator device. In the case where the secure content generator device is a camera, this would be the serial number (or other unique ID) of the camera. This identifier must be recorded in a PKI that is recognized by the authentication system. In some embodiments, the identifier does not need to be unique, but rather only needs to provide some information about the secure content generator device. In the case where the secure content generator device is a camera, this would be the model and make of the camera.

Other fields include: any relevant settings under which the content was produced; any custom annotations made by the user or the device; any other useful hashes or representations of the content.

For the fields whose values can be enumerated, such as the model and make or the settings chosen, the data may be formatted using a specific enumerated code. These codes will depend on the field.

Since metadata can be altered, and even more easily so than the content data, it must also be secured by a digital signature.

In a preferred embodiment, the original content data (or the digital signature that has been computed for it) is appended in the metadata before computing this digital signature. This nuance is necessary to certify that the metadata corresponds to the original content data. Otherwise, although the metadata cannot be altered, a separate metadata-signature pair can be copied over, which would be a fatal weakness.

In one embodiment, that will be implemented in practice, the secure content package comprises the following:

(1) The raw content data, in a PNG or JPG format that can be deterministically decoded into a 3-dimensional array (height, width, color) of 8-bit unsigned integers.

(2) A 32-bit signing entity ID, which is associated with an Ed25519 private/public key pair.

(3) A 512-bit Ed25519 signature signed with said private key and signed on a SHA-256 hash of the concatenated bytes of said raw content data.

(4) A metadata dictionary object containing a 32-bit integer Unix epoch timestamp and two 32-bit float decimal degree locations.

(5) A 512-bit Ed25519 signature signed with said private key and signed on a SHA-256 hash of said metadata dictionary object.

In another embodiment, the secure content package is an extended image file whose metadata addendum contains manifests compatible with the C2PA guidelines.

1.2 The Watermarking Apparatus

The secure content watermarking apparatus receives the secure content package via the network processor, and uses the digital signatures to verify the original content data and any optional metadata. In order to do so, a public key is needed. The public key can be retrieved directly from the secure content package, from querying an external PKI using an identifier retrieved from the secure content package, or from querying an external PKI using an identifier provided by the network processor during data transmission. The secure content watermarking apparatus should also check with an external PKI that the public key corresponds to a trusted entity.

Then, the secure content watermark apparatus will determine what the data payload of the watermark should be and what information needs to be stored in the database processor. Various methods of designing the data payload and the stored information are described herein.

The first method uses a network connection, and is based on a unique watermark identifier. The watermark only needs to contain this watermark identifier. In a preferred embodiment, this identifier is 64 bits long. It should be long enough to account for the fact that there could be upwards of a quadrillion watermarking instances, because there are billions of people in the world and each person could produce upwards of a million pieces of content to be watermarked. However, it should not be too long, since the larger the data payload the less effective the watermark. In a preferred embodiment, this watermark should also be as robust as possible, especially with respect to benign edits that include cropping and rotation.

In this case, a network connection is used to update the database every single time a new watermark is applied. The information should be keyed by the watermark identifier and contain values that include at least one hash or representation of the content, for the purposes of subsequent comparison and authentication. In a preferred embodiment, the values include one cryptographic hash and one perceptive or differential. Alternatively, the value could just be a copy of the original content data; this is the most powerful, but uses more of storage.

In a preferred embodiment, the information should further be encrypted or protected by a digital signature (or both), to prevent attacks on the database. The secret key or public key must be made known to the decoder somehow; for instance the secret key could be unique to the watermarking application or cloud service; for instance the public key could be stored in the database and certified by an external PKI.

Alternatively, the database could be a public ledger, such as a blockchain, which guarantees immutability of the information stored.

The second method does not require a network connection, and is based on a unique source identifier. The watermark should contain this source identifier along with a digital signature based on a hash or a representation of the content. In a preferred embodiment, this identifier is 64 bits long, though shorter values are permissible. It should be long enough to account for the fact that there could be billions of content producing sources, such as individual people. In a preferred embodiment, this watermark should be as robust as possible, though because the digital signature is rather long, at 512 bits for the Ed25519 scheme, it will be subject to more limitations than in the first method. This is a big drawback for the identification of similar content, but is not too concerning for the authentication of captured content.

In this case, a network connection only used once per content producing source. For example, this could be done at the time of account creation for individual users or at the time of manufacturing for physical devices. However, the database will need to contain additional information about the content producing source, to act as a certificate authority in the authentication process and to provide any additional information that is required or relevant. This information should include the public key to be used to verify the digital signatures. The information should be protected in a similar fashion to the information in the first method.

In a preferred embodiment, the hash or representation of the content that is used is a differential hash, and the hash output is included in the data payload along with the digital signature based on the hash output.

In some embodiments, the watermark identifier or the source identifier could simply be the corresponding public key(s) required to verify any digital signature(s) involved in the authentication process.

Hybrid versions of the two methods are also permissible, though some features in the resulting design may be redundant. For example, both a watermark identifier and a source identifier could be included in the data payload, and perhaps the source identifier could be a substring of the watermark identifier.

There are many ways in which to apply the actual watermark. The most notable methods and techniques are described below:

1.2.1 Watermarking Methods

In various embodiments, there are different methods of embedding a watermark that contains a data payload, as described herein.

The first method is the spatial domain. A simple method is to embed the data in the least significant bit of every pixel value. For a standard HD image, this amounts to nearly a megabyte of data. However, this method is very fragile. A slightly more robust method is to shift the pixel values up or down by one in a preset pattern, and then take the correlation between the image and the preset pattern. However, the capacity of the data payload is much lower, and if optimized well (64-by-64 regions plus error correction), a hundred bits or so could be reliable squeezed out of a standard HD image. A separate method is to select a subset of bits could be chosen and modified. This is similar to the first simple method, but can be done in secrecy.

The second method is the frequency domain. There are three main domains: DCT (discrete cosine transform), DFT (discrete Fourier transform), DWT (discrete wavelet transform). In all these cases, the coefficient values are modified.

The same methods work, but two other methods prove useful here. One is the quantization method, which defines buckets of coefficient values and modifies the coefficients accordingly (effectively a custom-scaled least-significant-bit method for float values). The other is the spread signal method, which adds some resistance to narrow-band attacks through redundancy by embedding the data across multiple frequencies (a.k.a. coefficients).

Because most compression algorithms, such as JPEG and MPEG, operate in the DCT space, the DCT method offers a high data payload capacity at a moderate cost of image quality. Because the Fourier transform is largely invariant under geometry (all three of rotation, scaling, translation are well-behaved), the DFT method offers robustness under geometric edits. Because the wavelet bases is very aware of resolution, the DWT method offers a moderate data payload capacity ad a low cost of image quality.

The third method is the feature domain. A set of features, which in some embodiments are dependent on the content data, is calculated, and certain values are changed. Again, quantization and spread signal methods are useful here. One method of selecting the features involves first computing a unfiltered set of features, modifying the content in different ways, and then choosing the features that are the least sensitive; any information embedded in these features should be quite robust, and external agents who do not know the exact algorithm cannot encode or decode the watermark easily. The actual features could correspond to salient points, statistical metrics, and other properties of the content.

Machine learning methods use the feature domain as well, except the feature is hidden inside a neural network. There are two main methods. One is to use a neural network to select a set of features; for example, these could be constructed from certain intermediate neuron values in a large image model; because of the large potential feature space, external agents cannot infer these features easily. The other is to apply a pattern in the diffusion process, which most current models include. This pattern is subtly worked into the final output, and can be detected with another trained model.

This system provides a secure method of applying an authentication-enabling watermark onto produced content. The subsequent authentication process then comprises the decoding of the watermark, the retrieval of information from the database, the verification of any digital signatures, and the authentication by comparison of the information at hand.

According to one embodiment, the secure content watermarking apparatus comprises the following:

(1) A processor that receives the secure content package and outputs the raw content data, metadata dictionary object, the signing entity ID, the two SHA-256 hashes of the content and metadata, and the two Ed25519 signatures of the content and metadata.

(2) A processor that retrieves the public key of the signing entity from a database using the signing entity ID, certifies that the signing entity is trustworthy, and verifies the two Ed25519 signatures against the two SHA-256 hashes using said public key.

(3) A processor that constructs a data payload. The data payload contains the secure content watermarking apparatus ID, an Ed25519 signature of a differential hash of the content data, the metadata content, (5) A database that contains information pertaining to the watermarking apparatus IDs, including its public key and trustworthiness.

In another embodiment, the following modifications are made:

(4*) A processor that constructs a data payload and creates a database entry. The data payload contains a unique ID corresponding to each particular watermarking instance. The database entry is keyed by watermarked content ID and includes a SHA-256 hash of the content data, a differential hash of the content data, the watermarking apparatus ID, Ed25519 signatures of both signed with the public key of the watermarking apparatus, and if space-permitting, a copy of the original content data.

(5*) A database that contains information pertaining to the watermarked apparatus IDs, including its public key and trustworthiness, and information pertaining to the watermarked content IDs as created by said processor.

Differential Content Hashing

Embodiments described herein include a class of hashing functions that serve to distinguish similar audio-visual content (data); in contrast, standard hashing serves to verify identical data and fuzzy hashing serves to detect similar data. To achieve this, the differential content hash (DCH) strikes a balance between the security of a traditional hash (via the intertwining operation) and the sensitivity of a fuzzy hash (via the local differential hashes). Implemented correctly, any substantial changes to the content will result in meaningful changes to the DCH. Example methods for effective interpretation of the changes to the DCH are also presented.

A: Differential Content Hash (DCH), H

With reference to the examples of FIG. 8, the class of DCH-type functions combines two main steps: generating a local description for each content region and then intertwining these descriptions in a geometry-informed manner.

1. Inputs: the content (I), optionally, an implementation parameter ($\lambda$).
   (a) The content I is a portion of some audiovisual (AV) content (image, video, etc.).
      i. In a preferred embodiment, this portion is a single frame, but, in other embodiments, similar procedures can be applied on portions that resemble (1) a plurality of frames or (2) a selection of audio.
   (b) The optional implementation parameter A is a set of parameters that act as inputs to implemented functions. Some use cases of these parameters include but are not limited to:
      i. Determining what algorithms are used (e.g. for asymmetric key exchange, using a 256-bit Ed25519 vs. a 4096-bit RSA).
      ii. Providing values for numerical constants (e.g. for content region sizing, 8-by-8 blocks vs. 16-by-16 blocks).
      iii. Acting as a seed for pseudorandom generators (e.g. when generating random values that need to be replicated elsewhere).
2. Partitions the content into a number of regions $I \rightarrow \{B_i\}_i$.
   (a) A region of the content is a subset in the spatial domain of the content (as opposed to a subset in the frequency domain).
   (b) In a preferred embodiment, the regions are disjoint 8-by-8 (pixel) blocks, but, in other embodiments, the regions could be smaller, larger, or potentially overlapping.
3. Computes a local description $h(i, B_i)$ for each region $B_i$.
   (a) The local description function h maps a content region to a number h: $(i, b_i) \rightarrow \mathbb{R}$.
      i. A content-preserving alteration is an alteration of the content that does not substantially alter the human interpretation of the content, such as resizing the content dimensions or applying a light JPEG compression.
      ii. A content-changing alteration is an alteration of the content that substantially alters the human interpretation of the content, such as cropping our regions of the content or swapping faces using deepfake technology.
      iii. The function h should satisfy the property that $h(i, B'_i) - h(i, B_i)$ is small when $B_i \rightarrow B'_i$ is a content-preserving alteration and large when $B_i \rightarrow B'_i$ is a content-changing alteration.
      iv. The function h is a type of fuzzy hash; in particular, it is a type of locally-sensitive hash that is tailored specifically to the problem of distinguishing AV content.
      v. In other embodiments, the output could take on a value outside of $\mathbb{R}$.
   (b) In a preferred embodiment, $h(i, b_i) := b_i \cdot v_i$, where $b_i$ is a vector representation of $B_i$ and $v_i$ is a pseudo-random vector that captures a range of geometries.
      i. In a preferred embodiment, a blend of Haar-like wavelets is used, given by the formula $$v_i(x, y) = \sum_{k=1}^{\log_2(b) \, b/2^k, b/2^k} \sum_{m,n} c^k a_{m,n,k} \cdot \phi(x/2^k - m) \cdot \phi(y/2^k - n),$$

where b=8 is the block side length in pixels, c=¾ is a calibrated constant, $a_{m,n,k} \sim \mathcal{U}(-1, 1)$ are pseudorandom coefficients, and $\phi$ is the function that is 1 in the range [0, 1) and 0 elsewhere.
4. Computes the intertwined description from the local descriptions $[\tau \circ h](I) \leftarrow \tau(\{h(i, b_i)\}_i$.
   (a) The intertwining operation T maps a collection of local descriptions to a single (vector) description $\tau: \{x_i\}_i \in \mathbb{R}^m \rightarrow h \in \mathbb{R}^n$.
      i. In a preferred embodiment, the mapping $\tau$ represents should take into account the geometry of the content regions $B_i$; in other words, where the $B_i$ are relative to each other (e.g. near or far; left or right; etc.) should matter.
      ii. At the minimum, $\tau$, when viewed as a matrix over the boolean algebra of order two, should not be invertible, but, in other embodiments, this may be the case (e.g. if $\tau$ is simply the identity function).
   (b) In a preferred embodiment, $\tau(\{h(b_i)\}_i) := M \cdot h_b$, where $h_b$ is a vector representation of $\{h(b_i)\}_i$ and M is a matrix whose nonzero entries correspond to the edges of a sparse graph.
   (c) In a preferred embodiment, M is a product of two matrices, $M := P \cdot Q$:
      i. In a preferred embodiment, $P_{A,B}$ is nonzero if and only if A and B are very close (adjacent), and this magnitude is inversely proportional to the distance between A and B. This enables the reliable detection of local content alterations.
      ii. In a preferred embodiment, for each region A, $Q_{A,B}=1$ only for a few (3) select regions B; otherwise, $Q_{A,B}=0$. In particular, if $Q_{A,B}=1$, then either A=B or $Q_{B,A}=0$. In a preferred embodiment, these regions B are those corresponding to fixed horizontal shift or a fixed vertical shift of A. This enables the accurate differentiation between random noise and material changes.

5. Computes the DCH $H(I) \leftarrow Q(h_I)$.
   (a) The quantization function Q inputs a vector $m \in \mathbb{R}^n$ and outputs a sequence of bits $x \in \{0, 1\}^n$, where the i-th element of m affects only the i-th element of x.
   (b) In a preferred embodiment, $Q(h_i) = q_i(\text{int}[h_i/c])$, where $q_i$ is a pseudorandom hash $q_i: \mathbb{Z} \rightarrow \{0, 1\}$ and c is calibrated empirically.
6. Outputs the differential content hash H(I).

B: DCH-Based Alteration Classifier, $\mathcal{C}$

A method of classifying content alterations via interpreting the changes in the DCH.
   1. Inputs: the observed content (I'), the DCH change $H(I')-H(I)$ along with the DCH function H, and optionally, an implementation parameter ($\lambda$).
      (a) The observed content I' is content that may or may not have been modified (by watermarking or by alterations).
      (b) The DCH change $H(I')-H(I)$ is the difference between the DCH computed from the observed content H(I') and the DCH of the original content (likely recovered from an embedded watermark) H(I).
   2. Computes the clarified difference from the DCH change $\Delta \leftarrow v(H(I')-H(I))$.
      (a) The clarifying operation v transforms a vector $a \in \mathbb{R}^n \rightarrow b \in \mathbb{R}^n$, where a corresponds to changes in H(I) and b corresponds (approximately) to changes in I.
         i. The clarifying v is related to the intertwining $\tau$ in a mathematical manner.
      (b) In a preferred embodiment, for the intertwining operation $\tau := P \cdot Q$ as described earlier, breaking down $Q = \Sigma_i Q_i$, an appropriate clarifying operation is $v := \otimes_i (P^T \cdot Q_i)$, where $\otimes$ indicates Hadamard multiplication.
   3. Generates a number of scores $s \leftarrow \mathcal{M}(\Delta)$.
      (a) The statistical model $\mathcal{M}$ inputs the observed content I' and the clarified difference $\Delta$ and outputs a number of scores s.
         i. In a preferred embodiment, the model involves the fine-tuning of existing deep learning architectures on datasets that incorporate DCH changes associated with content alterations.
      (b) In a preferred embodiment, the model is a pre-trained convolution-transformer model (current state-of-the-art in image recognition) that is fine-tuned on a proprietary dataset of content alterations. This dataset can include automatically-generated (I', $\Delta$) pairs along with their human-labeled classifications $\mathcal{C}$ (I'-I).
   4. Outputs a human-interpretable classification $C \leftarrow s$.

W: Fuzzy-Secure Watermarking

With reference to the examples of FIG. 9, the W1 watermark is a watermarking method that, by making use of a differential content hash and error-correcting codes, is able to (1) verify the content under certain content alterations and (2) safely characterize those content alterations.

A: Encoding, W1.encode

This is the encoding mechanism of the fuzzy-secure watermark.
   1. Inputs: the original content (I), a DCH function H, the source attributes (sk, SID), in some embodiments, optionally, a data key (dk), and, in some embodiments, optionally, an implementation parameter ($\lambda$).
      (a) The original content I is content that the source would like to watermark.
      (b) The source is the entity whose attributes include (1) a signing key sk, used for encoding, and (2) a source ID SID, used for decoding (and carried in the watermark).

i. In a preferred embodiment, the Ed25519 algorithm generates a private/public key pair; the signing key is the private key and the source ID is used to retrieve the public key.
      (c) In some embodiments, optionally, the data key is a value that enables the (1) access to or (2) verification of additional data (external to the content).
         i. In a preferred embodiment, the data key is a 256-bit number.
   2. Computes the differential hash H(I).
   3. Computes a signature of the differential hash $\sigma_1 \leftarrow \text{Sig.sign}(sk, m_1)$, where $m_1$ contains H(I).
      (a) A public-key signature scheme Sig is a cryptographic scheme that, given a message m, a signing key sk, and a public key pk, can (1) compute a signature $\text{Sig.sign}(sk, m) \rightarrow \sigma$ and (2) verify the signature $\text{Sig.verify}(pk, m, \sigma) \rightarrow V \in \{0, 1\}$. This verification ensures that m has not been tampered at all by a third party that does not know sk (an exact match is required).
      (b) The message $m_1$ can be any message from which H(I) can be inferred, but, in a preferred embodiment, $m_1 = H(I)$.
      (c) In a preferred embodiment, the Ed25519 signature scheme is used for Sig.
   4. Constructs the codeword $c_2 \leftarrow \text{FMC.encode}(H(I), m_2)$, where $m_2 = \sigma_1 \oplus \text{SID} \oplus dk$ and $\oplus$ denotes simple concatenation.
      (a) An error-correcting code ECC is an encoding/decoding mechanism that, given a message m, can (1) construct a codeword $\text{ECC.encode}(m) \rightarrow c$ and (2) recover the message $\text{ECC.decode}(c') \rightarrow m$ provided that c'~c are not too dissimilar.
      (b) A fuzzy-message codec FMC is an encoding and decoding mechanism that, given a message m and a differential content hash H(I), can (1) construct a codeword $\text{FMC.encode}(H(I), m) \rightarrow c$ and (2) recover the original inputs $\text{FMC.decode}(H(I'), c) \rightarrow (H(I), m)$ provided that $H(I')$~H(I) are not too dissimilar.
      (c) In other embodiments, the message $m_2$ can be any message from which $\sigma_1$, SID, and, in some embodiments, optionally, dk can be precisely inferred.
      (d) In a preferred embodiment, FMC.encode can include the following steps:
         i. Using an error-correcting code, computes the codeword $c_1 \leftarrow \text{ECC.encode}(m_2)$.
         ii. Constructs the codeword $c_2 \leftarrow c_1 \oplus H(I)$, where $\oplus$ is a function that satisfies the property $(a \oplus b) \oplus b = a$. In a preferred embodiment, $\oplus$ is the XOR operation.
      (e) In other embodiments, FMC.encode could simply be $c_2 \leftarrow m_2 \oplus H(I)$.
   5. Constructs the error-correcting codeword $c_3 \leftarrow \text{ECC.encode}(c_2)$.
      (a) In a preferred embodiment, ECC can include the following steps:
         i. Partitions the message and the codeword into message-chunk codeword-chunk pairs in a scrambled fashion, so that each codeword-chunk is an appropriate size.
         ii. Applies an error-correcting code on each pair, in a preferred embodiment, an 8-bit Reed-Solomon codec is used.
         iii. Joins the chunks back together as appropriate.
         iv. Encoding: inputs the message, encodes each pair, outputs the codeword.

v. Decoding: inputs the observed codeword, decodes each pair; if all are successful, outputs the message and the original codeword; otherwise, raises an exception.

6. Embeds the codeword onto the original content $I^* \leftarrow w_b$.embed($c_3$, I).

(a) A local watermarking mechanism $w_b$ is a watermarking mechanism where, given some bit-data x and some content I, the embedding of each bit $x_i$ is localized to a small spatial region of I; it can (1) generate watermarked content $w_b$.embed(x, I)$\rightarrow I^*$ and (2) extract the bit-data $w_b$.extract($I^*$)$\rightarrow$x.

(b) The bit-data x is the sequence of bits to be embedded.

(c) In some embodiments, optionally, the bit-function g maps tuples of coefficients to bits $c \in \mathbb{R}^k \rightarrow x \in [0, 1]$.

i. In a preferred embodiment, the bit-function is the parity of int[$(\Sigma_j w_j c_j)/w$], for suitably chosen constants $w_j$, w.

(d) In a preferred embodiment, $w_b$.embed can include the following steps:

i. Inputs the original content I and the bit-data $x \leftarrow c_3$.

ii. Partitions I into 8-by-8 blocks.

iii. Assigns to each block $b_i$ some bits $\{x_{i,j}\}_j$ to be embedded; assigns to each bit $x_{i,j}$ some mid-frequency DCT coefficients with which to encode the data.

iv. For each bit, computes the original coefficient vector $c_{i,j} \in \mathbb{R}^k$.

v. For each bit, computes the closest coefficient vector $c^*_{i,j}$ such that $B(c_{i,j}) = x_{i,j}$ and in some embodiments, optionally, $\epsilon(B, c_{i,j}) > \epsilon_0$, where $\epsilon(B, c)$ is defined as how much c can be changed without changing the output bit of $B(c+E)$ and $\epsilon_0$ is a suitably chosen constant.

vi. For each bit, estimates an adjustment $I \rightarrow I + \alpha_i$ so that $c_{i,j} \rightarrow c^*_{i,j}$.

vii. Outputs the adjusted (watermarked) content $w_b$.embed(x, I):=$I + \Sigma_i \alpha_i$.

7. Outputs: watermarked content W1.encode(I).

B: Decoding, W1.decode

This is the decoding mechanism of the fuzzy-secure watermark.

1. Inputs: the observed content (I'), a DCH function H, and in some embodiments, optionally, an implementation parameter ($\lambda$).

2. Computes a differential hash H(I').

3. Extracts $c'_3 \leftarrow W_b$.decode(I').

(a) In a preferred embodiment, $w_b$.extract can include the following steps:

i. Inputs the observed content I'.

ii. Partitions I' into 8-by-8 blocks.

iii. Assigns to each block $b'_i$ some bits $x'_{i,j}$ to be read; assigns to each bit $x'_{i,j}$ some mid-frequency DCT coefficients from which to decode the data.

iv. For each bit, calculates the observed coefficient vector $c'_{i,j} \in \mathbb{R}^k$.

v. For each bit, calculates the bit $x'_{i,j}:=B(c'_{i,j})$.

vi. Outputs the decoded bit-data x'.

4. Recovers $c_2 \leftarrow$ECC.decode($c'_3$).

(a) If $c'_3$ is too dissimilar to $c_3$, then the decoding will fail and an exception will be raised.

(b) In some embodiments, optionally, recovers $c_3 \leftarrow$ECC.encode($c_2$).

5. Recovers H(I), ($\sigma_1$, SID, dk)$\leftarrow$FMC.decode(H(I'), $c_2$).

(a) In a preferred embodiment, if H(I') is too dissimilar to H(I), then the decoding will fail and an exception will be raised.

(b) In a preferred embodiment, FMC.decode can include the following steps:

i. Computes $c'_1 \leftarrow c_2 \oplus$(H(I')).

ii. Recovers $m_2 \leftarrow$ECC.decode($c'_1$).

iii. Separates $m_2 = \sigma_1 \oplus$SID $\oplus dk \rightarrow (\sigma_1$, SID, dk).

iv. Computes $c_1 \leftarrow$ECC.encode($m_2$).

v. Computes H(I)$\leftarrow c_1 \oplus c_2$.

6. Retrieves pk using SID.

7. Verifies the signature V$\leftarrow$Sig.verify(pk, $m_1$, $\sigma_1$).

8. In some embodiments, optionally, compute the differential information H(I)$\oplus$(H(I') and/or $c_3 \oplus c'_3$.

9. Outputs: verification result V, source ID SID, in some embodiments, optionally, data key dk, and in some embodiments, optionally, differential information H(I) $\Theta$H(I') and/or $c_3 \Theta c'_3$.

Disclosed herein are a number of steps, on both the encoding and decoding side.

In a preferred embodiment, for image data, the DFT coefficient space is used, primarily because the two-dimensional fast Fourier transform of a frame is well-behaved under most geometric transformations:

| Spatial Domain | Fourier Domain |
|---|---|
| rotation | rotation (axis) |
| scaling | none |
| cropping (reduction) | scaling (axis, value) |
| cropping (translation) | phase shift (value) |

Additionally, the two-dimensional fast Fourier transform is also quite fast, since there are many incredibly optimized libraries (FFTW, MKL), which enable the processing of 4K frames in a fraction of a second. This speed is critical for scalable watermark adoption.

In a preferred embodiment, the DFT space is taken over a specific color layer of the content data. In some embodiments, this layer is static, and is usually the Y (luminance) or G (green) layer. In other embodiments, this layer is dynamic, and is chosen to match the PCA vector of color variation in the image; this PCA vector can be computed as a global constant or a local function (i.e. may vary by location or time in the digital audiovisual content). This can be useful for grayscale images, and functions well under the application of color filters.

1.3 Low-Magnitude Patterns

The methods described herein can be configured to balance between being independent of the content and being dependent on the content.

The watermark identifies known subset X of the Fourier space, then embeds a spatial pattern $\mathcal{P}$ whose Fourier transform is:

$$\hat{f}_\mathcal{P}(\xi) = \begin{cases} -C \cdot \hat{f}_I(\xi) & \text{if } \xi \in X, \\ 0 & \text{otherwise,} \end{cases}$$

Typically, C=1, though it is admissible to set 0<C<1 in lighter versions of the watermark.

When $\mathcal{P}$ is added onto $\mathcal{I}$ as a watermark, the Fourier coefficients satisfy $|\hat{f}_{\mathcal{I}+\mathcal{P}}(\xi)| < |\hat{f}_\mathcal{I}(\xi)|$ for $\xi \in X$ (in the typical case of C=1, the values are approximately 0). This results in a pattern of low-magnitude values, and is advantageous for three reasons.

The values of $\hat{f}_{\mathcal{I}}(\xi)$ are fairly random, so the spatial pattern $\mathcal{P}$ is fairly random as well. This results in a watermark that is less perceptible to the human eye (even though the PSNR/SSIM scores may not be affected).

The variance in the magnitude of the Fourier coefficients of X $$\text{Var} = \frac{1}{|X|} \cdot \sum_{\xi \in X} \left\| \hat{f}_{\mathcal{I}+\mathcal{P}}(\xi) \right\|_2$$

is small. This means that a two-sample t-test on $|\hat{f}_{\mathcal{I}-\mathcal{P}}(\xi)|$ is surprisingly effective: although $|X|$ may be small, the standard deviation of the values is also small (which is not true if, say, $\hat{f}_{\mathcal{P}}(\xi) = C$ is a constant), so the resulting statistic is still significant.

The low-magnitude pattern is invariant under phase shifts. This reduces the search space significantly because the dimension corresponding to spatial translation can be disregarded.

There are a few guidelines for choosing X.

One is that it should lie primarily in the mid-frequency region of Fourier space: low-frequency coefficients are dominated by the actual content, and high-frequency coefficients are affected by compression. The range $\|\xi\|_2 \in (50, 200)$ is appropriate.

Another guideline is that X should not be too sensitive to the discreteness of the 2-D FFT. For this reason, X should not be too thin. Points should have a radius r and lines or circles should have a width w, ideally with r, w≥2.

Lastly, $|X|$ should be sufficiently large. If noise from edits made to the content accounts for a fraction $\gamma$ of the variance in the Fourier coefficients, then $|X| > 8t^2\gamma^3$ serves as a rough condition to obtain a t-stat of t when C=1. For t=5 and $\gamma$=1, this gives $|X|$=200; as C decreases, this recommended value of $|X|$ scales faster than $C^{-2}$.

1.4 Alignment and Detection

The watermark begins with an alignment step in the mid-frequency region of the Fourier space. This type of template-based geometric synchronization has been explored before, for instance by creating a perpendicular line pattern. In a preferred embodiment, the watermark instead uses low-magnitude patterns, with the primary shapes being points and circles.

Since the image data $\mathcal{I}$ is real, its Fourier transform $\mathcal{F}(\mathcal{I})$ is symmetric. This means that in practice, modifications can be done solely in the upper-half plane of $\mathcal{F}(\mathcal{I})$, though the amplitudes are doubled.

In a preferred embodiment, two major alignment points $p_i$ of radius 6 are placed at (±50, 50) in the Fourier space; the lower frequency aids detection. When matched correctly, the alignment of the underlying content is resolved up to 90-degree rotations and reflections (which form a group isomorphic to D4).

In a preferred embodiment, a low-magnitude circle-arc pattern of radius 100 and width 2 is also added; the circle-arc includes the angles [0, 3π/4) and excludes the angles [3π/4, π). The location of the excluded angles further resolves the alignment of the underlying content up to 180-degree rotations only.

Given major alignment points at $(x_1, y_1)$, $(x_2, y_2)$, the coefficients of the circle of radius r after the geometric transformation are given by:

$$c_{rr} = 2 \cdot (x_1 \cdot y_2 - x_2 \cdot y_1)^2, \; c_{xx} = y_1^2 + y_2^2,$$

$$c_{yy} = x_1^2 + x_2^2, \; c_{xy} = -2 \cdot (x_1 \cdot y_1 + x_2 \cdot y_2),$$

and the detection circle region with width w is given by:

$$C(r, w) := \left\{ (x, y) \text{ where } \left| c_{xx}x^2 + c_{yy}y^2 + c_{xy}xy - \left(\frac{r}{100}\right)^2 \cdot c_{rr} \right| \le rw \cdot \frac{c_{rr}}{100^2} \right\}.$$

This formula allows for an efficient evaluation of the detection circle.

Alternatively, in some embodiments, an additional half dozen minor alignment points $p_j$ of radius 4 are then placed in the vicinity of (±100,100) at prescribed locations; the higher frequency aids precision. For best performance, the locations of the minor alignment points should satisfy:

$$\bigcup_{g \in \mathcal{G}} \left[ \bigcup_j p_j \cap \bigcup_j g \cdot p_j \right] = \emptyset, \; \mathcal{G} := \text{Stab}_{GL_2(\mathbb{R})} \left( \bigcup_i (\pm 50, \pm 50) \right).$$

This primarily serves to resolve the alignment of the underlying content up to 180-degree rotations only, though in practice is not as effective as the circle-arc method.

A statistical test, based on a simple one-sided t-test on the average absolute magnitude of the coefficients in a selected region, can be performed to evaluate the alignment of the alignment points and the detection of a detection circle. In a preferred embodiment, caution is taken to account for oddities in the distribution of the coefficients or overfitting in the alignment or detection process. For example, first normalizing the Fourier coefficient magnitudes by their expected value as a function of the distance from (0, 0) results in a much more homogeneous $\mathcal{N}(0, 1)$ distribution of coefficients, resulting in more accurate evaluation results.

1.5 The Data Payload

In a preferred embodiment, the watermark carries two categories of data: label data (2 bits) and message data (36 bits). The label data can include the following labels:

A "this is AI-generated" label (1 bit).

A "do not copy or use without permission" label (1 bit).

The AI/copyright labels are useful from both a usage and a legal perspective. The message data can include a 36-bit ID corresponding to the watermark (unique) or the entity (user, application, or device) that created the watermark. Given the difference in size and style of these two categories of data, two separate methods of embedding data patterns are used.

1.5.1 Label Data: Circles

In a preferred embodiment, the various labels k will be embedded as low-magnitude patterns $X_k$, which are designated circle-arc subsets of the circle of radius 80 and width 2. The detection process is a simple statistical test and the p-value cutoff is chosen to be 0.00003%, the same 5-sigma threshold used in particle physics.

In other embodiments, the label data may not be included.

1.5.2 Message Data: Points

In a preferred embodiment, a 4-bit Reed-Solomon error-correcting code is first applied to the ID, and the resulting codeword is 60 bits. This length is chosen to make optimal use of the Galois field of size $2^4$, since $4 \cdot (2^4 - 1) = 60$. Up to three errors in the 4-bit characters are tolerated. The 36-bit ID is large enough to encode a comfortable 67 billion unique values.

In a preferred embodiment, this codeword is represented in the low-magnitude pattern as a sequence of points of radius 6 spaced out across the 105-125 radius range. Each point corresponds to a single 4-bit character, so there are 15 points in total. A precise alignment is necessary for this step.

In other embodiments, the message data could be embedded using other methods, that do not necessarily use low-magnitude patterns. For instance, the Fourier transform of the 85-95 radius band could be used to store information (this transform would be similar to the Fourier-Mellin log-polar transform, but restricted to a circular ring mask region).

In other embodiments, the message data may not be included.

1.6 Watermark Construction

There are a number of ways to modify the content so that the resulting coefficients match the low-magnitude pattern.

In a preferred embodiment, a pattern $\mathcal{P}$ is constructed whose feature coefficients is equal to the feature coefficients of the target low-magnitude pattern minus the feature coefficients of the original content data $\mathcal{I}$.

In a preferred embodiment, this is done by applying an inverse FFT on said feature coefficient difference, and then casting the result to floats (real, not complex). The pattern is then added to the original content, and the result is pseudo-randomly rounded to the nearest integer and casted to an 8-bit unsigned integer format.

1.6.1 Pattern Scaling

In a preferred embodiment, in order to mitigate watermark perceptibility, two scaling operations are performed on $\mathcal{P}$.

First, the pattern should not contain too many extreme values. Adding together many Fourier components will result in an average magnitude of $O(\sqrt{n})$, but there will be some localized spikes of magnitude $O(n)$. These can be smoothed out without affecting the Fourier signature much.

Second, the pattern should be scaled in proportion to the local variability of the frame. A light watermark will be very apparent in a smooth section of the frame, while a heavy watermark will be hard to notice in a rough section of the frame. The local changes in the frame are transformed (using a sigmoid) and averaged (using an exponential moving average), both in a two-dimensional fashion, to obtain a composite scale. The pattern $\mathcal{P}$ is then scaled accordingly. $\mathcal{P}$

1.6.2 Iterative Descent

Due to the effects of the pre-FFT filters and the pattern scaling, the low-magnitude patterns may not be exactly zero, i.e. $\hat{f}_{\mathcal{I}+\mathcal{P}}(\xi) > \epsilon$. This has an adverse effect on decoding, but in a preferred embodiment, can be dealt with nicely by iteratively applying the encoding process multiple times. Some care must be taken, however, to ensure that the pattern amplitude does not scale unbounded; halving the pattern amplitude limit on each iteration should work well. This iterative descent process does come at a performance cost: the encoding process ends up taking quite a bit longer, usually by a factor of two or so.

1.7 Context of Use

This robust watermark can be used to transmit a number of short data payloads, including the existence of a watermark, the existence if certain meaningful labels, and the value of a message data whose length typically lies between 8 bits and 64 bits.

The labels can be used by content producers to protect their content from unauthorized use, such as the unwanted redistribution of content or the unwanted use of content in AI models. The labels also be used by generative models to label their content as AI-generated in order to comply with government regulations.

The message data generally conveys an identifier. This identifier can be unique to the watermarked content or unique to the content producing entity. Once decoded, the content consumer or the decoding software can use the identifier to access additional information related to the watermarked content or the content producing entity. This information could include identity, provenance, authentication, advertising, and other forms of data. Typically, the identifiers are connected to a public key infrastructure, which provides a degree of security and trust to the identifier ecosystem.

1.8 Data Annotations

In some embodiments, the protocol can support a wide variety of data annotation tools. Certain metadata fields, from C.meta, can be embedded directly into the watermark. These fields fit within a 128-bit string, and follow a specific format as set by the MetadataField enum.

General data can also be associated with the watermark; these are called annotations. Multiple methods are available for annotation.

According to one method, annotations are stored in metadata. A secure hash of the annotation would be computed using TP.hash, and then embedded into the watermark as the data key dk. This annotation would not only prove that the annotation was created by the source, but also that the annotation was generated along with the watermark. The annotation will need to be formatted in a specific manner dependent on the content file type. Furthermore, downstream entities are still free to add their own annotations in the metadata; these additions, however, would not be associated with the watermark.

According to another method, annotations are stored externally. The platform or other trusted vendors will provide data access services. The data key dk in the watermark would then serve as the access key for the data, and is of the format dk:[database].[location].[verification].

The trusted vendor would then be able to locate the data, and use the verification portion of the data key to read in the data (it could be encrypted or password-protected). Depending on the source, the data stored in the databases could either be the annotation itself, or simply a link to the annotation (such as a URL).

In some aspects, a method for watermarking content may be provided. The method may include presenting a series of options to a user to select from a group of available watermarks techniques. The method may also include receiving a selection by the user of a watermark technique. The selected watermark may then be applied to the content.

In some cases, a method for encoding a source ID using a public key infrastructure (PKI) may be implemented. This method may involve encoding a source ID using the public key infrastructure.

A method for decoding a fuzzy-secure watermark may be provided in some implementations. This method may include receiving digital audiovisual (DAV) content and calculating a representation R1 of the received content. Data D may be extracted from the watermark. The method may further involve recovering the representation R2 of the original content by applying an error-correcting code to said data D. A digital signature and the corresponding public key may be obtained. The method may then verify the digital signature with the public key and said representation R2.

The method may also include verifying that representations R1 and R2 are not too different. Finally, the verification results may be returned.

In some aspects, this method may allow for the authentication of altered DAV content. A fuzzy-key signature scheme may be used in some cases, which may be based on biometric data.

In some implementations, the method may use SID/NTMAC, which uses shared secret keys, not public/private keys, for verification. The decoder may not have access to the original content in some cases.

A differential content hash (DCH) may be used for the representation in some aspects. The digital signature or the corresponding public key may be extracted from the message M, retrieved from the content metadata, or received from external databases.

In some cases, the method may include a fuzzy-message signature for encoding. Pattern spectrum magnification may be used, which can make the watermark unique per image and less noticeable. Alignment points may be included for efficient pattern search and better rotation, scaling, and translation (RST).

A method for efficiently decoding watermarked DAV content may be provided in some implementations. This method may include receiving DAV content and detecting a standardized data object in the content file. Information about which watermarks have been embedded in the content may be extracted from the standardized data object. The method may then apply decoding processes only for the detected watermarks. Finally, the decoding results may be returned.

This method may allow for efficient decoding of watermarked content when many potential watermarks could have been applied. Information from one watermark may reveal limited geometric information about other watermarks embedded in the content.

In some aspects, the standardized data object may be a universal watermark embedded in the content or retrieved from the content metadata.

A unique source ID may be used as a key in a database to access information about the corresponding source. This information may include at least a source type and a public key.

The method may support linkages between source IDs, accounts and verified accounts, applications and application users, groups and organizations, and integrated devices.

In some implementations, the method may execute source-based authentication for watermarked content using the identity management system in conjunction with watermarks.

A method for verifying metadata associated with watermarked content may be provided in some aspects. This method may include receiving DAV content with a watermark encoding a digital signature. The digital signature may be extracted from the watermark. The corresponding public key may be obtained. Data D may be extracted from the metadata attached to the content file. The method may then verify the digital signature with the public key and data D. Finally, the verification results may be returned.

A method of securely embedding a watermark for verification may be implemented in some cases. This method may include receiving DAV content and adding a digital signature of a hash of the content in the content metadata. The digital signature may be verified against the content in another application. The method may then apply a watermark that can securely verify the content, which may be fragile or fuzzy-secure.

In some aspects, the method may include applying a metadata hash first at a source device, then applying the watermark subsequently before further distribution.

An apparatus for securely watermarking digital audiovisual content may be provided in some implementations. This apparatus may include a network processor configured to receive a secure content package. The secure content package may comprise the original digital audiovisual content data and a first computed digital signature based on a first hash or representation of said content.

The apparatus may also include a secure content watermarking apparatus configured to verify the first digital signature against the received content and subsequently apply a watermark containing a data payload to the received content. The data payload may contain a second hash or representation of said content, a second computed digital signature based on said hash or representation, and an identifier unique to the signing entity.

A database processor may be included in the apparatus. This processor may be configured to store the identifier, along with a corresponding public key and the appropriate certifying information of the signing entity. The stored information may be made accessible by the identifier for subsequent authentication of content through the verification of the second digital signature by the identifier.

In some implementations, the apparatus may further include a secure content generator. This generator may produce the original content data, construct an appropriate secure content package, and transmit said package over an internal or external network.

The secure content package may, in some cases, further comprise one or more metadata fields associated with the original content and one or more digital signatures. The secure content watermarking apparatus may further verify the additional metadata using one or more digital signatures.

In some aspects, the metadata may include data that identifies the time at which the original content was produced, the location where the original content was produced, or the specific device or type of device with which the original content was produced. The metadata may also include a digital signature based on a hash or representation of a portion of the original content.

The second hash or representation may, in some cases, be the same as the first hash or representation, and the second computed digital signature may be the same as the first computed digital signature.

The hashes or representations may be SHA-256 hashes of the bytes-representation of the content data, and the digital signatures may be Ed25519 signatures signed by an appropriate private key. The digital signatures may comprise one or more constituent signatures, each based on a hash or representation of a portion of the original content.

In some implementations, the network processor and the secure content watermarking apparatus may be installed in a centralized server, and the network processor may receive the secure content package over the Internet. Alternatively, they may be installed in the same physical device as the initial point of production of the digital audiovisual content, and the network processor may receive the secure content directly.

The network processor may receive the secure content package from a physical camera device, a camera accessory in a phone or a computer, or a software application. The original content may be raw captured digital audiovisual data or authenticated by the application.

The watermark may, in some aspects, be of a fragile type that embeds information in the least significant bits of selected pixel values or DCT coefficients of the content data. In other cases, the watermark may be of the fuzzy-secure type and the data payload may contain a digital signature of the differential type, which together allows for the secure authentication of moderately altered content.

The database processor may store both a cryptographic hash and a differential hash in some implementations.

Another apparatus for securely watermarking digital audiovisual content may be provided in some aspects. This apparatus may include a network processor configured to receive a secure content package, comprising the original digital audiovisual content data and a first computed digital signature based on a first hash or representation of said content.

The apparatus may also include a secure content watermarking apparatus configured to verify the first digital signature against the received content and subsequently apply a watermark containing a data payload to the received content. The data payload may contain a first identifier unique to the watermarked content.

A first database processor may be included, configured to store the first identifier, along with a second hash or representation of said content, a second computed digital signature based on said hash or representation, and a second identifier unique to the signing entity. The stored information may be made accessible by the identifier for subsequent authentication of content through the verification of the second digital signature.

In some implementations, the apparatus may further include a second database processor configured to store the second identifier, along with a corresponding public key and the appropriate certifying information of the signing entity.

The apparatus may also include a secure content generator that produces the original content data, constructs an appropriate secure content package, and transmits said package over an internal or external network.

The secure content package may further comprise one or more metadata fields associated with the original content and one or more digital signatures. The secure content watermarking apparatus may further verify the additional metadata using one or more digital signatures.

In some aspects, the metadata may include data that identifies the time at which the original content was produced, the location where the original content was produced, or the device or type of device with which the original content was produced. The metadata may also include a digital signature based on a hash or representation of a portion of the original content.

The second hash or representation may, in some cases, be the same as the first hash or representation, and the second computed digital signature may be the same as the first computed digital signature.

The hashes or representations may be SHA-256 hashes of the bytes-representation of the content data, and the digital signatures may be Ed25519 signatures signed by an appropriate private key. The digital signatures may comprise one or more constituent signatures, each based on a hash or representation of a portion of the original content.

The database processor may, in some cases, store both a cryptographic hash and a differential hash.

The network processor and the secure content watermarking apparatus may be installed in a centralized server, and the network processor may receive the secure content package over the Internet. Alternatively, they may be installed in the same physical device as the initial point of production of the digital audiovisual content, and the network processor may receive the secure content directly.

In some aspects, the network processor may receive the secure content package from a physical camera device, a camera accessory in a phone or a computer, or a software application. The original content may be raw captured digital audiovisual data or authenticated by the application.

The watermark may, in some implementations, be of a robust type that embeds information in a frequency domain of the content, such as involving the application of a DFT, DCT, or DWT algorithm. In other cases, the watermark may be of a robust type that embeds information in a feature domain of the content, such as involving training or adopting a DNN and selecting a feature subspace.

In some aspects, the second hash or representation may be a copy of the original content data.

A method for encoding a robust watermark onto digital audiovisual content may be provided in some implementations. This method may include calculating a predetermined set of coefficients based on the content data, constructing a subset of said coefficients whose orientation or composition encodes a data payload, creating a target low-magnitude pattern by reducing the average absolute magnitude of the coefficients in said subset, and modifying the content data so that the updated calculated coefficients of the modified content data match said target low-magnitude pattern.

In some aspects, the predetermined set of coefficients may be a subset of the discrete Fourier transform of the content data. The content data may be projected onto a predetermined color layer before applying the discrete Fourier transform, where said color layer may depend on the content data in a predetermined manner. A signal filter may be applied to the content data before applying the discrete Fourier transform, to reduce the impact of noise.

The identified subset of coefficients may comprise one or more alignment points, to aid in the geometric alignment of the watermarked content in decoding. The subset may further comprise a detection circle-arc, to signal the existence of the watermark and assist in the geometric alignment process. One or more label circle-arcs may be included to signal the existence of a meaningful label, such as a "do-not-copy" or an "is-generated" directive. A variable subset of coefficients may be included, whose location under proper geometric alignment encodes a data message. An error-correcting code may be applied to said data message.

The target low-magnitude pattern may be created by setting the coefficients in said subset to a multiple, such as zero, of the original values. Alternatively, the average change in the coefficients under various modifications of the content data may be computed, and the target low-magnitude pattern may be created by setting the coefficients in said subset to zero minus said average change.

In some implementations, the difference between the calculated coefficients and the target low-magnitude pattern may be computed, a watermark pattern whose calculated coefficients match said computed difference may be constructed, and said watermark pattern may be applied onto the content data to achieve the desired modifications. The watermark pattern may be scaled based on the content data, in proportion to the perceptive noisiness of the local regions. The watermark pattern may be recomputed and reapplied multiple times in iterative descent, so that the resulting calculated coefficients converge to the target low-magnitude pattern.

A method for decoding a robust watermark from digital audiovisual content may also be provided. This method may include calculating a predetermined set of coefficients based on the content data, searching for a low-magnitude pattern by scanning for suitable subsets of coefficients with low average absolute magnitudes, determining the orientation of composition of said suitable subset, and communicating the data payload encoded by said correctly-aligned subset.

The predetermined set of coefficients may be a subset of the discrete Fourier transform of the content data. The content data may be projected onto a predetermined color layer before applying the discrete Fourier transform, where said color layer may depend on the content data in a predetermined manner. A signal filter may be applied to the content data before applying the discrete Fourier transform, to reduce the impact of noise.

In some aspects, a search may be conducted on the alignment points in the potential low-magnitude patterns, one or more candidate alignment points may be selected, and the corresponding candidate low-magnitude patterns may be evaluated. A detection circle-arc may be evaluated and an "is-detected" result may be produced. One or more label circle-arcs may be evaluated and one or more corresponding "has-label" results may be produced.

The location of a variable subset of coefficients may be evaluated after proper geometric alignment, and a data message may be produced from the location data. An error-correcting code may be applied to decode said raw location data into said produced data message.

2 Trust Platform 2.1 Sources and Content

The platform is built on top of two objects. A content is an item of digital media (images, videos, audio) that may have associated trusted data. A source is an entity, with an associated reputation that can associate trusted data with content it produces.

2.1.1 Source Entities

In a preferred embodiment, each source entity is identified by a unique 64-bit (8-byte) source ID. Associated to each source entity is a asymmetric key pair, generated using the Ed25519 algorithm.

Each source entity is labeled with a source type. The source types include:

Developer entities, for testing.

Standard accounts, for users.

Verified accounts, for public figures.

Enterprise accounts, for managed users.

Enterprise entities, for user management.

Organization entities, for user associations.

Application entities, for integrated applications.

Application accounts, to link users and applications.

Device entities, for integrated physical devices.

Different source types are associated with different reputations. For example, since anyone can create a standard account, the trust associated with content produced by that account is limited, perhaps to a verified email address at best. On the other hand, the trust associated with a device entity corresponding to a camera is fairly strong, as an image produced by the entity should be an actual photograph.

Further associated to each source entity is public information that downstream consumers of content can view, such as:

A (display) name.

A textual description.

One or more links (i.e. URL).

Relevant contact information (email, phone).

A verified email address, social media username, or other trustable login.

For non-interactive verification, an X.509 certificate.

For verified accounts, the verification status.

For user accounts, the relevant enterprises or organizations.

For applications and devices, the associated user account.

A dynamic indicator of trustworthiness based on ecosystem reputation.

In order to ensure user safety, these fields should be vetted somewhat. For example, offensive language may be censored. Additionally, URL domains that have not been vetted may not be allowed; this may limit valid URLs to a small set of trusted domains, such as well-known social media platforms.

The public information is stored in a secure database. In a preferred embodiment, a non-relational database in the cloud is used, and is both protected via API key management and backed up elsewhere periodically. In other embodiments, a blockchain database could be used, so as to ensure data immutability and enable decentralized access. Likewise, depending on the source type, the appropriate private information is stored as well, though access is tightly controlled.

In a preferred embodiment, systems will be in place to update the private and public keys associated with a source in case it is compromised (e.g. forgetting the password, being hacked by bad actors). Content signed with the expired key pairs may still be associated with the source, but the expired nature of the association will be communicated accordingly. Other updates, such as password changes and information updates, are dealt with accordingly.

There are formal registration processes and source entity management protocols as well; those pertaining to the cloud-based API and the user account system will be described in more detail later in § 5.3.

There are also numerous relationships between sources. For example, an application entity may be linked to many application account entities. For example, a standard account entity belonging to a person may be linked to a device entity for each phone or camera the person owns and to an application account entity for each integrated application the person uses. For example, an organization entity may be linked to many standard account entities. These relationships are also stored in a secure database.

In some cases, a method for authenticating digital audiovisual content may be implemented. This method may include receiving an item of marked digital audiovisual content. An identifier may be extracted from the content item. Information pertaining to the source entity associated with the content item may be retrieved from a secure database using the identifier. The retrieved information may be an indicator of the source entity's trustworthiness, comprising an assigned unique source identifier and a verified known source type. The method may further include communicating the retrieved information.

In some aspects, the retrieved information may further comprise verified identity information. This verified identity information may provide additional context about the source entity associated with the content item.

In some cases, the retrieved information may further comprise other linked source entities. These linked source entities may represent relationships or connections between the source entity associated with the content item and other entities within the authentication ecosystem.

The method described above may allow for efficient and secure authentication of digital audiovisual content by leveraging information stored in a secure database. By retrieving and communicating information about the source entity's trustworthiness, verified identity, and linked entities, the method may provide valuable context for assessing the authenticity and reliability of the marked digital audiovisual content.

2.1.2 Content Items

In a preferred embodiment, each content item is identified by a unique 64-bit (8-byte) content ID. In most watermarks, the content ID is included in the data payload so that the relevant data can be fetched from the cloud when needed.

The main component of a content item is the AV (audiovisual) data. The AV data, which is often very large, is only stored in the cloud in certain embodiments, as is necessary. There are a number of AV formats that are accepted, including: (image, lossless) PNG, WEBP, TIFF; (image, lossy) JPEG, HEIC, AVIF; (video, lossless) AVI; (video, lossy) GIF, MP4, H264, H265; (audio, lossless) WAV; (audio, lossy) MP3, AAC. Adding in support for additional codecs and containers should be a fairly smooth process.

Further associated to each content item is some public information that downstream consumers of content can view, such as:

The source ID.

A (display) name.

A textual description.

One or more links (i.e. URL).

A timestamp at creation (recorded by a secure server).

Selected metadata fields (e.g. location, make/model).

A content usage license or do-not-copy/AI-generated tag (with some legal weight).

The storage of vetted content information in a secure database arranged in a similar fashion as that of the vetted source information. The source ID is can be used to access the source information from a separate database, though in some cases the source information may be stored directly alongside the content information.

In a preferred embodiment, a creation timestamp is recorded by the server when the content item is received. This may differ from the timestamps in the metadata, but because it is generated server-side, it will be secure.

In some cases, a number of content tags, some of which may carry legal implications, may be stored. These may indicate copyright intentions such as "DO-NOT-COPY" or "DO-NOT-TRAIN" or regulatory labels such as "AI-GEN-ERATED." More detailed information, such as the content licensing terms (e.g. Creative Commons), may be recorded as well.

A number of hashes are also recorded, as part of the private information. These hashes, which are described in detail in § 4, are signed by the source entity.

The generation and extraction of content identifiers should follow a careful protocol. This is because (1) the method through which the content identifier should be extracted may differ based on the content item and (2) in certain methods, such as those corresponding to a watermark that is designed to be both invisible and robust, the data payload is limited and therefore compromises must be made. As such, the 64-bit space of content identifiers is broken down into a number of subdivisions.

In a preferred embodiment, these subdivisions are organized by prefixes. Certain prefixes can correspond to content formats (e.g. image vs. video) or extraction methods (e.g. watermark vs. metadata). The following standard subdivisions are currently set aside:

| Subdivision | amp; Prefix |
| --- | --- |
| image, short | amp; 0x00000001 |
| image, long | amp; 0x01 |
| video, short | amp; 0x00000002 |
| video, long | amp; 0x02 |

-continued

| Subdivision | amp; Prefix |
| --- | --- |
| audio, short | amp; 0x00000003 |
| audio, long | amp; 0x03 |

The short and long divisions serve to take advantage of the trade-off between scalability and efficiency. A longer prefix allows for a shorter data payload, which enables more effective encoding and decoding in watermarks. A shorter prefix allows for a longer data payload, which enables a more content items to be recorded without running out of space. Here, the short division has a 32-bit-long prefix and a 36-bit-long data payload, and the long division has an 8-bit-long prefix and a 60-bit-long data payload. These numbers are chosen carefully:

The 4-bit overlap serves to act as a buffer between content formats. For instance, without the overlap, a screenshot of a video may be mistaken as a standalone image.

The 36-bit-length of the short data payload fits into Reed-Solomon error correction well. In order to take the most advantage of the Galois field of order $2^4$, the codeword should be $4*(2^4-1)=60$ bits long. Supporting up to 2 error corrections (13%) requires the message to be at most 36-bits long.

The 56-bit length of the non-overlapped portion of the long data payload is large enough accommodate mass adoption. A few trillion photos are taken each year (AI-generated images is catching up). Since $2^{56}=7\cdot10^{16}$, even if every single photo is recorded, it would take a millennia to run out of space.

The 4-bit prefix is being set aside for now, to leave room for future changes to the protocol.

The short and long divisions are also compatible with efficient encoding and decoding processes.

In some cases, a method for extracting a content identifier from watermarked digital audiovisual content may be implemented. This method may include receiving an item of watermarked digital audiovisual content. A first data payload may be extracted from the watermark. Based on the contents of the first data payload, the existence and extraction method of a second data payload may be determined. The second data payload may then be extracted from the watermark. The content identifier may be computed from the contents of the second data payload by identifying and prepending the appropriate prefix. The method may further include communicating the content identifier and any relevant additional data.

In some aspects, the first data payload may be a single bit that indicates whether the content identifier recorded in the second data payload belongs to a content identifier subdivision of the short or long type. This may allow for efficient encoding and decoding of content identifiers with different payload sizes.

In some cases, the extraction process for the long data payload may comprise first extracting a sequence of bits from the watermark and then applying an error-correcting scheme on said sequence of bits to recover the data payload. This may improve the robustness of the extraction process for longer content identifiers.

In some implementations, the first data payload may indicate the location where the second data payload is stored. This location may comprise the specific color dimension, the specific spatial region, or the specific frequency domain. By encoding location information in the first payload, the method may be able to efficiently locate and extract the main content identifier data from various parts of the watermarked content.

In some cases, a method for extracting a content identifier from watermarked digital audiovisual content may be implemented. This method may include receiving an item of watermarked digital audiovisual content. A first data payload may be extracted from the watermark. Based on the contents of the first data payload, the existence and extraction method of a second data payload may be determined. The second data payload may then be extracted from the watermark. The content identifier may be computed from the contents of the second data payload by identifying and prepending the appropriate prefix. The method may further include communicating the content identifier and any relevant additional data.

In some aspects, the first data payload may be a single bit that indicates whether the content identifier recorded in the second data payload belongs to a content identifier subdivision of the short or long type. This may allow for efficient encoding and decoding of content identifiers with different payload sizes.

In some cases, the extraction process for the long data payload may comprise first extracting a sequence of bits from the watermark and then applying an error-correcting scheme on said sequence of bits to recover the data payload. This may improve the robustness of the extraction process for longer content identifiers.

In some implementations, the first data payload may indicate the location where the second data payload is stored. This location may comprise the specific color dimension, the specific spatial region, or the specific frequency domain. By encoding location information in the first payload, the method may be able to efficiently locate and extract the main content identifier data from various parts of the watermarked content.

These considerations are less important when the content identifier is stored in the metadata or in a more fragile or visible watermark.

2.2 Authentication

The authentication process used in the platform contains two elements that are inadequately addressed by existing authentication systems:

1. The content hashes enable the authentication of content by downstream consumers without requiring the storage and subsequent retrieval of the original content item that many existing content authentication systems rely on. This is an important advantage, because digital audiovisual content files are large and therefore expensive to store. Using this type of hash-based authentication effectively is difficult (see § 4), but if done well, results in a more scalable system.

2. The authentication of content extends only as far as the reputation of the source entity. This is especially true in the context of cybersecurity, as although simple metadata may suffice as proof in a confined setting, a widely-adopted public protocol would be subjected to attacks; many existing content authentication systems have been shown to be far too vulnerable. Therefore, a strong connection to a source entity in a managed PKI must be established.

The system of source entities and content items, and the manner in which they are used in conjunction with labelled or watermarked digital audiovisual content, addresses both of these points.

In some cases, a method for authenticating digital audiovisual content may be implemented. This method may include receiving an item of marked digital audiovisual content. A content identifier may be extracted from the content item. Information pertaining to the content item may be retrieved from a secure database using the content identifier. The retrieved information may include a source identifier, one or more content hashes, and a timestamp recorded by a secure server. Information pertaining to the source entity may be retrieved from a secure database using the source identifier. The content may be authenticated against the retrieved content hashes. The method may further include communicating the authentication result as well as the retrieved information associated with the content item and with the source entity.

In some aspects, the content identifier may be extracted from a watermark that was embedded onto the original digital audiovisual content. This may allow for robust authentication even if the content has been modified or redistributed.

In some implementations, the content identifier may be extracted from metadata that was appended onto the original digital audiovisual content. This approach may be suitable for scenarios where the content has not been significantly altered during distribution.

In some cases, one of the content hashes may be an exact, reformatted, or compressed copy of the original digital audiovisual content. This may allow for precise verification of the content's integrity, while potentially reducing storage requirements.

In some aspects, the information pertaining to the source entity may be retrieved directly using just the content identifier, alongside the information pertaining to the content item. This approach may streamline the authentication process by reducing the number of database queries required.

More detail regarding how the various content hashes can be used to authenticate the content is described in § 4.

Most of the authentication described so far is centralized and interactive, and can use API calls to a managed cloud server. Decentralization is fairly straightforward, as the stored data can be moved onto a blockchain. The main concern is the content identifier must now contain enough information to locate the appropriate block. This is done by introducing a separate subdivision of content identifiers for decentralized data retrieval, and setting a predetermined subset of the content identifier (after the prefix) to be equal to the block address.

In some cases, a method for authenticating digital audiovisual content may be implemented. This method may include receiving an item of marked digital audiovisual content. A content identifier may be extracted from the content item. Information pertaining to the content item may be retrieved from a secure database using the content identifier. The retrieved information may include a source identifier, one or more content hashes, and a timestamp recorded by a secure server. Information pertaining to the source entity may be retrieved from a secure database using the source identifier. The content may be authenticated against the retrieved content hashes. The method may further include communicating the authentication result as well as the retrieved information associated with the content item and with the source entity.

In some aspects, the content identifier may be extracted from a watermark that was embedded onto the original digital audiovisual content. This may allow for robust authentication even if the content has been modified or redistributed.

In some implementations, the content identifier may be extracted from metadata that was appended onto the original digital audiovisual content. This approach may be suitable for scenarios where the content has not been significantly altered during distribution.

In some cases, one of the content hashes may be an exact, reformatted, or compressed copy of the original digital audiovisual content. This may allow for precise verification of the content's integrity, while potentially reducing storage requirements.

In some aspects, the information pertaining to the source entity may be retrieved directly using just the content identifier, alongside the information pertaining to the content item. This approach may streamline the authentication process by reducing the number of database queries required.

More detail regarding how the various content hashes can be used to authenticate the content is described in § 4.

Most of the authentication described so far is centralized and interactive, and can use API calls to a managed cloud server. Decentralization is fairly straightforward, as the stored data can be moved onto a blockchain. The main concern is the content identifier must now contain enough information to locate the appropriate block. This is done by introducing a separate subdivision of content identifiers for decentralized data retrieval, and setting a predetermined subset of the content identifier (after the prefix) to be equal to the block address.

In some cases, the method for authenticating digital audiovisual content may utilize secure servers that are write-restricted public ledgers. The address of the block containing the recorded information may be extracted from the content identifier. This approach may allow for decentralized authentication of digital audiovisual content using blockchain technology.

By using write-restricted public ledgers as secure servers, the authentication process may benefit from the immutability and transparency provided by blockchain systems. The content identifier may be designed to include information about the specific block address where the relevant authentication data is stored. This may enable efficient retrieval of the necessary information without requiring a centralized database.

In some implementations, the content identifier may be structured to contain both a prefix indicating the content type and subdivision, as well as a portion that directly corresponds to the block address in the public ledger. This approach may allow for quick and direct access to the relevant authentication data stored on the blockchain.

The use of public ledgers may provide additional security and trust in the authentication process, as the recorded information would be distributed across multiple nodes in the blockchain network. This decentralized approach may help prevent single points of failure and increase the overall robustness of the authentication system.

Supporting non-interactive authentication requires more compromises, but provides benefits in (1) reducing reliance on internet connections and (2) reducing tail risk against server cyberattacks. One method to write the appropriate content hashes along with their digital signatures into the metadata of the content file; this is essentially an X.509 certificate with the appropriate content hashes as the claim.

In some cases, the method for authenticating digital audiovisual content may involve retrieving similarity content hashes directly from the metadata of the content file. Along with the similarity content hashes, a digital signature and a public key may also be retrieved from the metadata. The similarity content hashes may then be verified using the retrieved digital signature and public key. This approach may allow for non-interactive authentication of the content without requiring access to a secure database or server.

In some implementations, the method for authenticating digital audiovisual content may involve retrieving differential content hashes directly from the metadata of the content file. The digital signature and public key may also be retrieved from the metadata along with the differential content hashes. The differential content hashes may then be verified using the retrieved digital signature and public key. This approach may enable offline verification of content modifications without the need for an internet connection or access to a centralized server.

By storing the content hashes, digital signature, and public key directly in the metadata of the content file, the authentication process may become more portable and resilient. This method may allow for verification of the content's authenticity and integrity even in situations where access to external resources is limited or unavailable. The use of digital signatures and public key cryptography may help ensure that the stored hashes have not been tampered with and originated from the claimed source.

Another method is to include the requisite information in the watermark, as metadata is not very robust and can be easily removed or altered. This is straightforward for fragile watermarks, since the data payload size is large and authentication is only relevant when the content item is not altered.

In some cases, the method for watermarking digital audiovisual content may include additional information in the watermark. The watermark may contain the public key of the source entity. This public key may be used to verify the authenticity of the source entity. Additionally, the watermark may include a digital signature. This digital signature may be generated by signing the cryptographic hash with the private key of the source entity. The inclusion of both the public key and the digital signature in the watermark may provide a means for verifying the integrity of the content and the identity of the source entity without requiring access to external databases or servers. This approach may be particularly useful in scenarios where the watermark needs to carry self-contained authentication information.

In the case of robust watermarks and fuzzy authentication, however, the data payload size is small and authentication is still relevant when the content item has been altered.

In some cases, a method for authenticating digital audiovisual content may be implemented. This method may include receiving an item of watermarked digital audiovisual content. A sequence of bits may be extracted from the watermark. An error-correction scheme may be applied to the sequence of bits to recover a message. The original differential content hash may be extracted from the message, along with a digital signature and a public key. The original differential content hash may be verified using the digital signature and public key. The differential content hash may be recomputed using the content data of the content item. The differences between the pairs of differential content hashes may be analyzed, wherein differences in a subset of the differential content hash may imply that alterations were made in a corresponding subset of the content data. The method may further include communicating the inferred alterations between the received content item and the original content item.

In some implementations, the error-correction scheme may be designed to recover the message from potentially corrupted or incomplete bit sequences. This approach may enhance the robustness of the authentication process, allowing for successful recovery of the embedded information even if the watermark has been partially degraded during content manipulation or transmission.

The extraction of the original differential content hash, digital signature, and public key from the recovered message may provide a compact way to embed critical authentication information within the watermark. This approach may allow for self-contained verification without relying on external databases or servers.

In some aspects, the verification of the original differential content hash using the digital signature and public key may ensure the integrity and authenticity of the embedded information. This cryptographic verification step may help detect any tampering with the watermark or the embedded authentication data.

The recomputation of the differential content hash using the content data of the received content item may allow for a direct comparison with the original hash. This comparison may reveal any modifications made to the content since it was originally watermarked.

In some cases, the analysis of differences between the pairs of differential content hashes may provide a granular understanding of content alterations. By examining subsets of the differential content hash, it may be possible to localize and characterize specific modifications made to the content.

The communication of inferred alterations between the received content item and the original content item may provide valuable information to users or systems relying on the authentication process. This information may help in assessing the nature and extent of any modifications made to the content, enabling informed decisions about its authenticity and integrity.

Lastly, since the authentication is limited by the trustworthiness of the source entity, the registration of source entities and verification of associated information is critical, and the proper procedures should be taken, and will depend on the source type. The procedures for standard accounts is described in § 5.

2.3 Points of Entry

In order for the platform to be adoptable, there must be a a variety of accessible entry points from which both source entities and content items can enter the ecosystem. In a preferred embodiment, the main interface is an API that offers cloud-based authentication services along with a user-friendly web portal that the general public can use. This fundamental suite, along with user account management and backend server settings, is described in detail in § 5.

There are a number of other entry points, which include:

A website that supports encoding and decoding with a simple drag and drop functionality.

A simple API that software applications can call provided an API key.

A phone application that supports encoding photos taken directly by the phone camera.

A browser extension for users that supports automatic decoding of content.

A physical hardware device that is integrated with the authentication ecosystem.

An online content platform that is integrated with the authentication ecosystem.

One issue with a trust-based system is that the content information can only be trusted to the extent that the source entity can be trusted. While this provides a decent amount of value on its own, it falls short of providing a guarantee that the content information is actually accurate. For example, an account could claim that an image was taken by a camera even if it was altered with an AI application. For example, an account could claim that an image was original artwork even if it was created with an AI application. Two methods of providing more meaningful points of entry are detailed, one for captured photos and one for artistic work.

2.3.1 Metadata Conversion

Applying the authentication process disclosed herein at the point of capture may require hardware integration, significant computation, and an Internet connection. One workaround is to postpone the complex steps; however, the time between when the content is captured and when the content is registered in the ecosystem is vulnerable to attacks: benign actors could inadvertently edit captured content before applying the watermark; malicious actors could intercept the content as it is being transmitted and modify it freely. This can be resolved by including a digital signature of the content data, stored in the metadata section of the content file, at the moment of capture. As long as this digital signature can be verified, the other steps can be done later. The details are covered in more detail herein.

In some cases, an apparatus for securely marking digital audiovisual content may be implemented. This apparatus may include a network processor configured to receive a secure content package. The secure content package may comprise the original digital audiovisual content data and a first computed digital signature based on a first hash or representation of said content.

The apparatus may further include a secure content watermarking apparatus. This apparatus may be configured to verify the first digital signature against the received content. Subsequently, the secure content watermarking apparatus may apply a watermark containing a data payload to the received content. The data payload may contain a first identifier unique to the watermarked content.

A first database processor may also be included in the apparatus. This processor may be configured to store the first identifier, along with a second hash or representation of the content, a second computed digital signature based on said hash or representation, and a second identifier unique to the signing entity. The stored information may be made accessible by the first identifier for subsequent authentication of content through the verification of the second digital signature.

In some implementations, the apparatus may further include a secure content generator. This generator may produce or capture the original content data, construct an appropriate secure content package, and transmit said package over an internal or external network.

3 Watermarks

In this section, a number of the core watermarks are outlined.

3.1 Background

In more sophisticated settings, the watermark W is designed to transmit a designated data payload d, which may vary in composition. Outside of this data payload, there are three main characteristics of watermarks that are important:

Robustness The watermark should be resistant to common (and targeted) content manipulations, such as compression and cropping.

Interference The watermark should not interfere with the underlying content, i.e. it should be imperceptible to the human eye.

Performance The watermark should be easy to encode and easy to decode, so as to enable widespread adoption and standardization.

There are also two other characteristics, that are relatively less important in the context of the platform:

Security The watermark should not be susceptible to forgery or falsification attacks. Forgery is when the data payload d is put on a different watermark W' on a different content object. Falsification is when the data payload d is replaced by a modified data payload d'. This is generally addressed with secrecy (below) or with embedding digital signatures. In the case of the watermarks disclosed herein, the content hashes along with the PKI-based authentication procedure takes care of the issue.

Secrecy The watermark should only be detectable and decodable by an authorized party. Some popular techniques include: using a secret key to symmetrically encrypt the data payload; using a secret key to determine where the data payload is encrypted. Sometimes the secret key is the original content object, which works well in the case of copyright protection via web crawling. In the case of the watermarks disclosed herein, the authentication platform is designed for public adoption, so such secrecy is not yet a priority.

The data payload of the watermark is also an extremely important characteristic: shorter data payloads are easier to carry; longer data payloads are harder to carry. There are three main categories:

Zero-Bit Detection The information is simply the existence of a particular watermark.

Historically, the most common use case is to demonstrate ownership. The particular water-mark is usually kept secret: only the watermark encoder can decode the watermark. As a result, the detection of the particular watermark is meaningful. If it is detected where it should not be, that is a potential copyright violation. If it is not detected where it should be, that is a potential tampering of content.

The recent trend, however, is in the detection of a more specific label, that carries some legal or regulatory weight. The particular watermark is usually standardized: anyone can encode or decode these labels. For instance, a "do-not-copy" label can be added to provide some copyright protection, and an "AI-generated" label can be added to comply with potential regulations. Even if these labels can be removed, their initial application provides some degree of liability insurance.

Message Recovery The information is a message to be transmitted via the watermark.

The correctness and reliability of the message is an important concern. Error-correcting codes are very useful here. By transmitting some extra data along with the base message, the algorithms are able to detect and correct errors in the data transmission. These are used extensively in telecommunications, so consequently are polished and powerful both in theory and in practice. The Reed-Solomon code is perhaps the most common, and is well-suited to messages with a few hundred characters.

Spread signal methods, which introduce redundancy and hence robustness by for instance embedding the information throughout both low and high-frequency bands, are also used to increase the chances that the message can be recovered successfully.

Linked Data The information is retrieved from elsewhere using a key placed in the watermark.

This category is probably the most versatile, as it can take advantage of the Internet and all the awesome things that have been built using the Internet. The key only needs to be long enough to be unique, so roughly 32 to 64 bits. Then, it can serve a variety of purposes, including but not limited to:

An ID of a digital entity, such as: a device or an application; a person or an organization; the content or the watermark.

A cryptographic access key, such as: a symmetric secret key, for decryption, an asymmetric public key, for verification.

An external resource address, such as: a secure centralized database, a public ledger, a.k.a. blockchain, any general URL.

Or any combination of the above!

3.2 Corner, DCT

The Discrete Cosine Transform (DCT) domain is great for embedding a large data payload that is resistant to digital compression. The drawbacks are that: (1) the interference is noticeable, generally as in an increased graininess of the audiovisual data, because the modifications made to the coefficients must be fairly large to survive compression; (2) the DCT blocks must be aligned precisely, so any sort of cropping or resizing would immediately invalidate the watermark.

Typically, certain coefficients are selected to carry the data. These are often the mid-frequency coefficients, and can either be pre-determined (e.g. fixed coefficients per DCT block) or dynamic (e.g. largest coefficient per DCT block). The actual bits are often stored in the parity or remainder of the coefficient relative to some base.

As a non-limiting example, a corner-based DCT watermark as disclosed herein can be configured to work as follows:

1. In each corner, a number of 8-by-8 blocks are labeled in a pre-defined sequence. The labeling is done such that the orientation of the corner relative to the sequence is identical (as if the image were rotated so that each corner can be treated like the top-left corner).

2. The first block contains one bit, conveying whether the content identifier is of the short or long type.

3. The next two blocks contains two bits, conveying which of the four corners the current corner is.

4. The remaining blocks contain an error-correcting code of the content identifier suffix. The standard Reed-Solomon code is used. The Galois field of order $2^4$ is used, and each block contains one 4-bit code chunk. By matching code chunks to blocks, decoding errors will be more localized.

5. Blocks containing single bits embed the bit in three pre-determined DCT coefficients.

6. Blocks containing code chunks embed the 4 bits in a predetermined DCT coefficient sequence, that prioritizes large DCT coefficients over small DCT coefficients.

7. The bits are stored in the parity of the DCT coefficient modulo a quantization matrix. This quantization matrix is symmetric, but is similar to the default JPEG quantization matrix (and also to some standard video quantization matrices).

8. DCT coefficients are small if they quantize to $\{-1, 0, +1\}$ and large otherwise. DCT coefficients that quantize in the range $(-2, -1)$ or $(+1, +2)$ are rounded. By rounding these in-the-middle coefficients, small/large classification will be more robust.

Some embodiments can be configured to restrict the watermark to only the corners of the frame. This is because (1) the data payload containing the content identifier is quite small and (2) corners are preserved well in many image manipulations. By doing so, (1) the increased graininess is often limited to just 1% of the image area and so becomes effectively imperceptible, and (2) the watermark would survive rotations (by 90-degrees), reflections, and mild cropping (that leaves at least one corner intact), in addition to JPEG compression.

In some cases, a method for watermarking digital audiovisual content may be implemented. This method may include receiving an item of digital audiovisual content. One or more of the four corners of the content may be selected, such that the selected corners only cover a small portion of the content area. The same data payload may be embedded into each of said corners, such that the same decoding process can be applied effectively on each corner. The resulting watermarked digital audiovisual content may then be communicated.

In some aspects, the data payload may contain the content identifier or appropriate content identifier suffix. This may allow for efficient identification and retrieval of information associated with the watermarked content.

In some implementations, the data payload embedded in each corner may further include information about which corner said corner is. This may enable the decoding process to orient any decoded corner effectively, improving the robustness of the watermarking method against rotations or other geometric transformations.

In some cases, the data payload may be embedded in the DCT coefficients of a pre-defined sequence of DCT blocks of each corner. This approach may leverage the properties of the Discrete Cosine Transform to provide resistance against compression and other common image processing operations while maintaining the imperceptibility of the watermark.

Some embodiments can be configured to further optimize the coefficient bit embedding. Using pre-determined coefficients results in a lot of low-value coefficients being changed, which is more perceptible than if high-value coefficients were changed. Using the maximum coefficient is unstable and inefficient, because the maximum could change on image manipulation and only one coefficient is used to store data. Instead, by using a pre-determined order, high-value coefficients are identified confidently and used when available.

In some cases, a method for embedding information into DCT coefficients may be implemented. This method may include receiving a block of computed DCT coefficients and a sequence of bits of information to embed. From a pre-determined sequence of DCT coefficients, the method may determine which ones are large. Any remaining bits of information may be embedded in the large coefficients by adjusting the value of said large coefficients. The method may then determine from the pre-determined sequence of DCT coefficients which ones are small. Any remaining bits of information may be embedded in the small coefficients by adjusting the value of said small coefficients. The resulting DCT coefficients with embedded information may then be communicated.

In some implementations, the computed DCT coefficients may be computed from a block of original image pixels. The block of watermarked image pixels may be computed from the resulting DCT coefficients.

In some aspects, the bits of information may be encoded in the parity of the coefficients modulo a standard quantization matrix. The magnitude of said standard quantization matrix may be scaled by a parameter in some cases.

This method for embedding information into DCT coefficients may provide a way to efficiently encode data within image or video content while maintaining visual quality. By prioritizing large coefficients for embedding, the method may achieve a balance between robustness and imperceptibility of the embedded information. The use of a standard quantization matrix with adjustable magnitude may allow for fine-tuning of the embedding process to suit different content types or application requirements.

3.3 Visible, Checkered

Visible watermarks are commonly seen in classified documents and in online stock photos, and are perhaps the most common. Typically, they are (1) optimized for human readability and (2) designed to have high interference. Developments in digital watermarking have largely left visible watermarks untouched, as most visible watermarks still only consist of a (possibly-repeated) word or logo. Some, though, have introduced incorporating IDs into the design, but only in the form of human-readable numbers.

In the context of the trust platform disclosed herein, and using PKI-linked content IDs or source IDs, the visible watermarks would solve an important problem: because they are visible, consumers of content will know that the watermarked content can be verified. This is important in commercial adoption, especially in the earlier stages, because chances are that only a small fraction of content online will be watermarked, and getting negative reading after negative reading is not a good user experience.

There is a lot of room for improvement and for application, especially in regards to designing a visible watermark that is automatically readable. Such a visible watermark would share some features with the now-popular QR codes, as bits of data would need to be stored in the design, but there are two key differences: (1) the visible watermark should be optimized for digital reading, rather than optical reading, and (2) the visible watermark should be more aesthetic in design, with a translucent feel.

According to one example approach, a method is to define a region of the content and then embed the data payload there using a distinct texture pattern. There are a number of parameters: (1) the region or the texture should be easy to locate, (2) the data payload in the texture should be robust, and (3) the texture should be aesthetically pleasing. To this end, for the initial design, the region is the bottom edge of the image and the texture is a translucent checkered pattern.

Some embodiments of the visible checkered watermark can be configured to work as follows:

1. A bottom edge region of the image is either selected or appended; the thickness is variable, but for best aesthetics anywhere between 8 pixels and 5 percent of the image height is suitable.
2. The pixels of the bottom edge region are smoothed using a generous Gaussian filter; a dark gray or light gray sheen is then applied, resulting in a frosted glass appearance.
3. A checkerboard pattern is applied to the bottom edge region in the Y color band; the bottom edge region should be exactly 4 checker squares high.
4. A number of locations, denoting where the data payload will be embedded, are selected.
5. Starting at each location, a locator marker is made, by increasing the contrast of the next three consecutive columns in the checkerboard pattern and decreasing the contrast of the next three consecutive columns.
6. Following the marker, the code chunks of the appropriate error-correcting code of the content identifier (analogous to the corner DCT code) are embedded in the checkerboard pattern. An additional code chunk representing whether the content identifier is of the short or long type is included as well.

7. Every three consecutive columns contains two code chunks, one in the light squares and one in the dark squares. Since $$\binom{6}{3} \geq 2^4,$$

the code chunk can be encoded into each six-square group by making three squares slightly lighter and three squares slightly darker.

Some embodiments include the use of the designated edge region to transmit a computer-readable data payload in a visible but aesthetic manner. In contrast to traditional visible watermarks: (1) the location of the watermark is in a known and searchable location, (2) the watermark is easy to notice but does not compromise the content, and (3) the watermark contains data that is readable by computers but not humans.

In some cases, a method for watermarking digital audiovisual content may be implemented. This method may include receiving an item of digital audiovisual content. A region adjacent to the border of the content may be identified so that it can be searched and located in an efficient manner. The region may constitute a small proportion of the content and may be an existing portion of the content or an appended area to the content. The method may further include modifying said region so that it is clearly noticeable to the human eye. A data payload that is primarily readable by computers may be encoded in said region. The resulting watermarked digital audiovisual content may then be communicated.

In some implementations, the data payload may contain the content identifier or appropriate content identifier suffix. This may allow for efficient identification and retrieval of information associated with the watermarked content.

In some aspects, the region may constitute a thin border around the content. This approach may provide a consistent and easily identifiable location for the watermark while minimizing interference with the main content area.

In some cases, the region may be a rectangular area along the bottom edge of the content. This configuration may offer a balance between visibility and minimal content obstruction, as the bottom edge is often less critical for visual information in many types of digital audiovisual content.

Some embodiments include the use of the checkerboard texture to effectively encode the data payload in the visible watermark. Many textures were experimented with, but the vast majority were either not visually appealing or not easily decodable. These include: high-contrast bits, high-contrast stripes, perturbations in color space, logo-shaped regions, non-border rectangular regions, and many more. The semi-transparent checkerboard pattern was the result of extensive testing, and has the pleasant aesthetic of textured glass while also being computationally easy to align.

Furthermore, the method of encoding locator patterns and the data payload copies into the checkerboard pattern is highly optimized. The locator patterns are easy to detect and provide both the location and read direction of the associated data payload copy. The data payload encoding itself is also robust to background variations and subsequent modifications.

In some cases, a method for encoding a data payload into digital audiovisual content in a visible manner may be implemented. This method may include generating a checkerboard pattern of alternating light and dark squares for a designated region of the content. The light and dark squares may be slightly adjusted to encode a data payload, such that the overall checkerboard pattern remains dominant. The resulting pattern may then be applied onto the designated region of the content.

In some implementations, the data payload may contain the content identifier or appropriate content identifier suffix. This approach may allow for efficient identification and retrieval of information associated with the watermarked content.

In some aspects, the designated region of the content may be smoothed, blurred, or filtered before applying the resulting pattern. This preprocessing step may help to integrate the watermark more seamlessly with the original content.

In some cases, one or more locator patterns may be encoded into the checkerboard pattern by adjusting the light and dark squares in a pre-determined pattern. These predetermined patterns may be designed to be quickly detected and located. A copy of the data payload may be encoded into the checkerboard pattern in a fixed position relative to each locator pattern. This approach may facilitate efficient detection and decoding of the watermark.

In some implementations, the computed auto-correlations of the appropriate edge of the content may be used to detect and align the checkerboard pattern when decoding. This technique may improve the robustness of the watermark detection process, particularly in cases where the content may have been cropped or resized.

3.4 Video Adaptations

All the watermarks discussed so far, while designed for image content formats, are compatible with video content formats. In particular, the global-NCR, global-DFT, and visible-checkered watermarks are fully continuous across time, and the corner-DCT watermark is almost always fully continuous. This means that by treating the video as a collection of images (frames), that the watermarks will retain similar robustness and interference qualities. However, for commercially-viable video watermarking, there are two other factors that are very important.

Performance Videos are much larger than images, so computational efficiency in both the encoding and decoding processes is much more important. As a result, videos are often processed in real-time (i.e. streaming), so the watermark decoding and authentication analysis must also be done in real-time for the best user experience. This has been widely studied across a variety of fields, and generally requires a mix of (1) restricting the use of operations that are computationally expensive, (2) doing much of the processing at the codec-level rather than the pixel-level, and (3) developing efficient algorithms at both the software and hardware level.

Temporal Resolution In images, the main benign manipulations are a mix of JPEG compression, geometric edits, color filters, and user modifications. In videos, the main benign manipulations are MPEG+ compression and temporal alterations. The former is generally similar to JPEG compression. The latter, however, is new, and is very important. Video segments can be cut or spliced, the frame rate can be altered, and not all frames are equal (in codecs). Furthermore, based on how users understand video content, authentication (and especially differential) analysis should be done frame-by-frame basis. This requires matching the frame to the corresponding content hash. The obvious way to do so is to embed a frame number in the watermark on each frame. Many improvements are needed, however, in order to achieve a high-quality watermarking experience.

According to some embodiments, optimization can be specific to the codec employed or the hardware used. Both the corner-DCT and global-NCR watermarks decode very quickly, so speed is not a problem. The global-DFT and visible-checkered take a longer period of time, but most of the computation is spent on detection and alignment, so decoding a sequence of frames will not be too slow; nevertheless, the global-DFT should be avoided because the 2-D fast Fourier transform is still expensive, and the robustness of that watermark against geometric edits is less valuable on videos.

The authentication analysis also needs to be optimized. Because the content hashes are fairly small, they can be cached or streamed accordingly, and then compared when the time comes. The cryptographic hashes are fairly quick to compute; however, the differential hashes along with the differential analyses do take some time. In high-performance systems, these computations can be run in parallel on a GPU, so should still be functional for high-FPS 4K video settings provided the lower-level optimizations are compiled and calibrated correctly.

The systems and methods disclosed herein address the issue of temporal resolution in a number of ways:

Instead of numbering the frames in increasing order, the sequence of frame identifiers forms a path (ideally Hamiltonian) through the hypercube $Q_{16}$, with the Gray code being one example. This way, the frame identifier of adjacent frames are similar in bit space, so the decoding of frame identifiers is more robust and the transitions in between frames more smooth.

For any given frame, the decoded frame identifier may have a number of matching original frame identifiers. This could be due to bits that are not decoded confidently, so nearby frame identifiers need to be considered. This could be due to there being a lot (more than $2^{16}$) of frames in the video, so multiple frames may have the same frame identifier. These can both be resolved by comparing multiple content hashes for each such frame. However, for longer clip segments, the local sequence of decoded frame identifiers can (fully) disambiguate the uncertainty.

I-frames are given special treatment, because they are subject to the least amount of compression. This involves prioritizing encoding and decoding computation time on these frames, and restricting the frame identifiers on the I-frames to a pre-defined subset of $Q_{16}$.

The frame identifier is embedded in a pre-defined manner in the corresponding watermark, in a way that does not interfere with the content identifier.

In some cases, a method for watermarking digital audiovisual content may be implemented. This method may include receiving an item of digital audiovisual content. A static content identifier may be generated, which may be used to retrieve external information. A dynamic frame identifier may be generated per frame and taken from a pre-defined sequence of values. For each frame, a data payload may be constructed containing the content identifier and the frame identifier. A digital watermark containing the data payload may be embedded in each frame. The resulting watermarked digital audiovisual content may then be communicated.

In some implementations, the pre-defined sequence may form a Hamiltonian cycle through a graph with vertices corresponding to integers or bit-arrays. This approach may provide a structured and efficient way to generate unique frame identifiers across the video content.

In some aspects, the local sequence of frame identifiers may be used to disambiguate low-confidence frame identifiers or duplicate frame identifiers. This technique may improve the robustness of the watermarking system, particularly in cases where frame identification may be challenging due to content modifications or compression artifacts.

In some cases, the I-frames of the video may be given characteristic frame identifiers and more attention during encoding and decoding. This approach may take advantage of the higher quality and importance of I-frames in video compression schemes to enhance the overall watermarking process.

The data payload may further comprise the frame identifier in various watermarking techniques. In some implementations, the data payload of a corner DCT watermark may include the frame identifier. In other cases, the data payload of a global NCR watermark may incorporate the frame identifier. Similarly, the frame identifier may be included in the data payload of a global DFT watermark in some aspects. For visible watermarks, the data payload may also comprise the frame identifier in certain implementations.

By incorporating the frame identifier into various watermarking techniques, the system may provide a more comprehensive and robust method for authenticating and tracking individual frames within the watermarked digital audiovisual content. This approach may offer improved resistance against temporal manipulations and enable more precise frame-level authentication and analysis.

3.5 Audio Adaptations

Whereas video content has one more dimension than image content, audio content has one less dimension. This means that the computations are less expensive but the space in which the watermark can be embedded is smaller. In particular, the various watermarks described so far are not directly applicable to audio content.

There are a number of existing techniques. Most popular ones involve the use of spread-signal methods to carry the data payload across the entire frequency range, so that the effect in any band is imperceptible and that the watermark is more robust against noise and targeted attacks. In some cases, a secret key is used to scramble (via flipping the sign) the spread-signal pattern, to reduce the perceptibility (and increase the allowable amplitude) of the watermark. These techniques, like the ones for images, are primarily tailored for piracy and copyright protection, so they are generally zero-bit in nature and lack authentication features.

3.6 Repeated Watermarks

In some cases, content that has already been watermarked may be re-watermarked. There are two main cases: one where the original watermark is still readable, and one where the original watermark is no longer readable.

In either case, repairing a compromised watermark is difficult. In a preferred embodiment, a completely new watermark, containing a completely new content identifier, is applied. The efficacy of the new watermark should not be significantly affected by the presence of the old watermark (however, certain watermarks, like the global-DFT watermark, may be affected).

If the old watermark is of a different type than the new watermark, the old watermark may still be readable, which may cause confusion later on. In a preferred embodiment, any old watermarks that are readable are destroyed. The exact method depends on the watermark type, but for the lighter watermarks, the process usually involves applying a second new watermark of the same type as the old watermark but containing a dummy content identifier (which the system will recognize as being invalid).

In a preferred embodiment, the derivative nature of the new watermark would be recorded as well. The content information associated with the new content item will include the old content identifier.

In some cases, a method for watermarking already-watermarked digital audiovisual content may be implemented. This method may include receiving an item of watermarked digital audiovisual content. The old content identifier of the content item may be decoded, and a new unique content identifier may be generated for the content item. New watermarks with the new content identifier may be applied to the content item. Any readable watermarks with the old content identifier may be destroyed. The resulting once-again watermarked digital audiovisual content may then be communicated.

In some implementations, the old content identifier may be stored in a secure database or a public ledger. This stored old content identifier may be accessible using the new content identifier. This approach may allow for maintaining a record of the content's watermarking history while providing a means to access previous identifiers through the current identifier.

4 Content Hashes

Traditionally, digital authentication involves using digital signatures based on asymmetric public-key cryptography. In this setting, the content data is hashed (using SHA-3 256 or similar), the source entity signs the hash with its private key (using Ed25519 or similar), the signature and public key are sent to the downstream consumer (via watermark or metadata), and the downstream consumer can recalculate the hash and verify the signature to ascertain that the content data has not changed since the source entity signed it.

This is a secure authentication scheme and is already widely adopted across a variety of digital fields. It is incorporated into the platform in a number of ways: first, on the full content file (the raw bytes data), and second, on just the audiovisual data (the RGB pixel values). The former includes metadata and will not survive file format changes. The latter does not include metadata but will survive lossless file format changes. In some cases, and particularly with video data, the cryptographic hash may be applied on segments of the full audiovisual data, such as pre-determined groups of frames. For the purposes of authenticating content, this provides effective proof that the content consumed is exactly what the source produced.

However, one important characteristic of digital audiovisual content is that it is distributed over the web. During this distribution process, many things happen, such as:

The AV codec or format is changed. For example, iPhone images are stored as HEIC files, but no popular browsers support HEIC, so they are typically converted to JPEG files.

The metadata is lost or altered. For example, Instagram removes all metadata from user-uploaded photos and iPhones (by default) remove all metadata from airdropped photos.

The content item is compressed. For example, communication tools such as Google's GMail and Meta's Messenger apply different compression procedures to digital audiovisual content.

The color space is modified. For example, users on social media can apply color filters on their photos. For example, photographs may touch-up the lighting and contrast on their photos.

The geometry is changed. For instance, the dimensions of the content item could be changed. For instance, the content could be reflected or rotated.

The material is cropped. For instance, a screen capture may be taken.

The material is edited. For instance, users may add caption text directly into the content. For instance, users may change certain regions of the content.

These operations affect a large portion of the content consumed, and they all invalidate a standard cryptographic signature.

4.1 Similarity

Some embodiments of a similarity hash can include a locally-sensitive hash that is designed to quantify how similar two content items are.

There is extensive work on perceptive hashes. These are fuzzy (non-cryptographic) hashes that upon comparison can quantify, oftentimes with a dot-product score or a binary classification, how perceptually similar two content items are.

One widely-used example is pHash, which works on images by resizing them to a thumbnail, computing the coefficients of a transform, and distilling the significant components into a fixed-length hash. This transform is traditionally DCT, but some versions use other orthogonal bases such as the Marr wavelets in order to increase sensitivity towards edge detection. Google's reverse image search uses a similar process to index and find similar images.

Facial recognition is another example. There are a variety of statistical techniques that have been developed in the process of improving facial recognition, the most seminal perhaps being the Viola-Jones detection framework. In recent years, significant progress in deep learning has been made, further elevating the technology used in generating the perceptual hashes (or, in the context of machine learning, a latent space encoding) involved.

Some embodiments of a similarity hash are configured to include some of these advancements to create an improved version of the generic perceptive hash:

1. A foundation model for image classification is fine-tuned using internal data for the purpose of image validation.

2. The similarity hash is computed to be the latent space vector representation of the content item, and the quantified similarity between two similarity hashes is the dot-product of the corresponding vectors.

3. A sufficiently high quantified similarity indicates that the two content items are similar enough to be meaningfully compared.

In some embodiments, the platform can be configured to use content identifiers to index stored content hashes. The similarity hashes, on the other hand, are used to (1) quickly filter out false positives that arise in the decoding process and (2) orient and align content items for a more thorough analysis.

In some cases, a method for authenticating digital audiovisual content may be implemented. This method may include receiving an item of digital audiovisual content along with a content identifier. One or more similarity content hashes may be retrieved from a secure database using the content identifier. The similarity content hashes may be designed such that similar content data results in similar hash values and dissimilar content data results in dissimilar hash values.

The method may further include recomputing the similarity content hashes using the content data of the received content item. In some implementations, the recomputation may be performed using various orientations or alignments of the content data.

The method may then involve checking whether the pairs of similarity content hashes (the retrieved hashes and the recomputed hashes) are indeed similar. Based on this comparison, a determination may be made as to whether the content identifier is likely to be the content identifier corresponding to the original content item. In some cases, this determination may include information on which orientations or alignments resulted in the most similar hashes.

If the determination is negative, indicating that the content identifier is unlikely to correspond to the original content item, the authentication process may be terminated. This approach may help to quickly filter out false positives that may arise in the decoding process.

4.2 Differential

One of the key problems with fuzzy verification is that even if modified content is verified, "how" the content was modified is extremely important. For example, a mid-quality JPEG compression may result in a PSNR (image noise) value of 40 dB, but altering some text or swapping a face may result in a much higher PSNR (much smaller modification, in pixel terms). The verification is meaningless if the content consumer cannot distinguish between benign and malicious modifications. In this setting, transparency into changes is key.

Embodiments disclosed herein can be configured with a differential hash. These hashes are designed to describe differences between two nearly-identical content items, and is thus far more sensitive than the typical perceptive hash. However, it requires a more precise matching and aligning of content data in order to function well. These hashes are also far more robust than the typical piecewise hash, because the practical goal is not simply to detect where in a data stream a bit has been flipped, but to distinguish between complex operations such as nominal JPEG compression and meaningful user edits.

The basic differential hash operates as follows:
1. The content data is resized to a fixed 512-by-512 shape and split into 8-by-8 blocks.
2. Each block is projected onto $R^k$ by taking the dot product of the pixel values against a pseudorandom combination of diagonal Haar wavelets.
3. A nonlinear filter is applied, to make attacks more difficult, and the resulting values are quantized.
4. The resulting values are scrambled and concatenated to form the final hash.

In a preferred embodiment, the granularity of the differential hash can be toggled. The result is that, upon comparing the original differential hash with the computed differential hash, that any changes in the content data can be roughly quantified and localized. For example, a JPEG compression would result in uniform noise, whereas altering some text or swapping a face would result in a localized saliency. By communicating this information to the consumer, they can then make the according trust judgements.

In some cases, a method for authenticating digital audiovisual content may be implemented. This method may include receiving an item of digital audiovisual content along with a content identifier. One or more differential content hashes may be retrieved from a secure database using the content identifier. The differential content hashes may be designed such that moderate alterations in a subset of the content data result in changes in a corresponding subset of the differential content hash.

The method may further include recomputing the differential content hashes using the content data of the received content item. In some implementations, the differences between the pairs of differential content hashes may be analyzed. Differences in a subset of the differential content hash may imply that alterations were made in a corresponding subset of the content data.

In some aspects, the method may involve communicating the deduced alterations between the received and original content items. This communication may provide insight into how the content may have been modified since its original creation or last authentication.

The differential hash may be computed using various techniques. In some cases, the differential hash may be computed by dividing the content data into regions in a predefined manner. A locally-sensitive hash may be generated for each region. The results from these regional hashes may then be collated into a single final hash. This approach may allow for a more granular analysis of potential alterations to the content.

4.3 Secure Differential

While standard cryptographic hashes are secure, meaning that they cannot be easily compromised by adversarial attackers, the basic differential hash is not. There are two main attacks to worry about:

Given a content item A, an attacker takes a different content item B, modifies it B→B' such that $\Delta(h(A), h(B'))$~0. Then, the attacker labels B with the content ID corresponding to A. The result is that B is passed off as A.

To defend against this, it should be difficult to find a small content modification $\epsilon$ such that $\Delta(h(A), h(B+\epsilon))$lt; $\Delta(h(A), h(B))$ whenever $\Delta(h(A), h(B))$ is not too large. For example, if any modification $\epsilon$ affects at least 100 bits of h in a pseudorandom manner, then if $\Delta(h(A), h(B))$lt; 0.25 (i.e. 25% of the bits are do not match), then it would take about 3 million attempts to find an e that reduces $\Delta$.

Given a content item A, an attacker modifies it A→A' such that $\Delta(h(A), h(A'))$~0 but $\Delta(A, A')$gt; δ. The result is that A' is validated as being pristine.

To defend against this, it should be difficult to find a small collection of small content modifications e such that $\Delta(h(A), h(A+\Sigma_i \epsilon_i))$~0. In the case where the hash function is approximately linear, this boils down to the (loose) linear independence of the $h(A+\epsilon_i)-h(A)$ vectors.

To achieve this, one method disclosed herein employs is to add an intertwining step, where the local descriptions, consisting of the locally-sensitive hashes computed on the pre-defined regions, are composed in a specific manner, before being collated into a final hash. This composition should have the following characteristics: high-degree, low-diameter, non-linear.

In some cases, a method for computing a secure differential hash may be implemented. This method may include receiving an item of digital audiovisual content. The content item may be partitioned into a number of regions $\{B_i\}$. A local description may be computed for each region $B_i$*$b_i \in \mathbb{R}$. local descriptions may be intertwined with an intertwining matrix $\{v_j\} \leftarrow M \cdot \{b_i\}$. In some implementations, the intertwining matrix may roughly represent a graph with high-degree (10 or more) and low-diameter (10 or less). The method may further include quantizing the intertwined representation and arranging accordingly to procure the final secure differential hash.

In some aspects, one or more of the hashes used in the method may be a secure differential content hash. The secure differential content hash may be designed such that the content data cannot be reasonably modified in a significant manner without the corresponding changes still showing up in the secure differential hash. This approach may provide a robust method for detecting and analyzing alterations to digital audiovisual content, even in the face of potential adversarial attacks.

The trade-off with the added security, however, is that with the same hash size, the granularity of the description of differences is significantly lower; in a preferred embodiment, this difference is be roughly a factor of 10.

The trade-off with the added security, however, is that with the same hash size, the granularity of the description of differences is significantly lower; in a preferred embodiment, this difference is be roughly a factor of 10.

4.4 Alteration Analysis

A preferred embodiment can be configured to provide a raw description of how the differential hash has changed, and also provide an human-intelligible description of the alterations made.

Steps in the alteration analysis process can include:

4.4.1 Orientation and Alignment

Because the differential hash is very granular, in order for it to work well, the content item must be oriented and aligned properly. This process can be done either when decoding the watermark or after retrieving the content hashes.

The most common orientations include reflections and 90-degree rotations. The most common alignments include cropping and splicing that preserve the content resolution. More complex orientations and alignments include: small rotations, screen captures, resizing plus cropping. However, the more complex ones are generally difficult to resolve, so most of the time, only the common ones are addressed.

The orientation and alignment process also depends on the content type and on the marking type. In particular:

Corner-based watermarks take care of orientation, but will need to fetch the original image size in order to resolve alignment (cropping).

Global-based watermarks take care of orientation, will need to fetch the original image size in order to resolve alignment (resizing).

Visible watermarks will need to fetch the visible pattern parameters (size and location) along with the original image size in order to resolve both orientation and alignment (cropping or resizing).

Metadata marks will need to fetch the original image size, plus also a specialized similarity hash to resolve both orientation and alignment uncertainties.

The content item is then adjusted appropriately before any differential hashes are computed. If successful, differential hashes should be effective, and cryptographic hashes may also work if only the orientation has been altered. This process does require using the content identifier to retrieve certain content information from the secure database.

In some cases, a method of orienting and aligning digital audiovisual content may be implemented. This method may include receiving an item of watermarked digital audiovisual content. The watermark may be decoded to obtain the requisite orientation and alignment information along with the content identifier. The content may then be oriented and aligned based on said orientation and alignment information. A differential hash may be computed on the now oriented and aligned content. This differential hash may be compared to the original differential hash retrieved using the content identifier. The comparison result may then be communicated.

In some implementations, the watermark may be a global-type watermark. In these cases, the aligning process may include resizing the content item to the original dimensions.

In other aspects, the watermark may be a corner-type watermark. In such cases, the aligning process may include expanding the content item to the original dimensions from the aligned corners, using nominal values where necessary.

In some cases, the watermark may be a visible-type watermark. For these implementations, the aligning process may include retrieving the original location and size parameters of the visible pattern. The content item may then be resized and/or expanded to the original dimensions from the visible pattern, using nominal values where necessary.

4.4.2 Difference Classification

Once the quantitative difference, namely the difference between the computed differential hash and the original differential hash, is obtained, the analysis of the alteration can begin. For a simple model, only the quantitative difference is needed. For example, if the quantitative difference resembles uniform noise, then the content has likely been compressed, though there is also the possibility of a filter being applied. For example, if the quantitative difference resembles a well-defined region of saliency, then that region of the content has likely been modified in a significant way.

For an improved model, however, the (observed, not original) content itself is used. Then, with a good training process, it will be able to differentiate between subtitles being added and faces being swapped, because context given by the content provides a lot of usable information. As a result, the model would be able to output a human-intelligible classification with a high confidence.

In a preferred embodiment, such a model would be trained on labeled data. The data consists of triplets: (observed content, quantitative difference, human classification). At least 10,000 data points are needed, and the human classification options should be well-defined.

In some cases, a method of classifying alterations made to digital audiovisual content may be implemented. This method may include receiving an item of watermarked digital audiovisual content. The method may further include receiving a quantitative difference that describes the difference between the received content item and the original content item.

A set of scores may be generated using a statistical model by inputting both the received content item and the received quantitative difference. These scores may represent the perceived likelihood of different human-intelligible classifications being correct. The method may then involve communicating a human-intelligible classification.

In some implementations, the model used in this method may be trained using a labeled dataset of triplets. Each triplet in this dataset may consist of observed content, quantitative difference, and human classification.

5 Cloud-Based API

Embodiments of the content authentication platform can include the cloud-based API service, along with a user-facing web portal for encoding and decoding. A number of system components and methods optimizations are disclosed herein.

5.1 Ordered Encoding

The encoding process exposed by the API to the public supports the application of a number of different watermarks. In a basic embodiment, three modes of invisible watermarks, two modes of visible watermarks, and two modes of metadata watermarks are provided as the default options to the user. These modes are not mutually exclusive, so there are a total of 35 possible watermark combinations.

The encoding API takes in the following parameters:

Identification of the source entity (e.g. username and password for accounts).

The content item file data, in raw bytes (or as a JSON-safe encoding).

The output format (e.g. JPEG vs. PNG).

Watermark settings (invisible, visible, and metadata settings).

Information associated with the content item, which may include a mix of descriptions, links, tags, licenses, and more.

The server-side encoding process has to be done carefully. In particular, the order in which watermarks are applied and hashes are computed is very important.

When there are multiple watermarks (of different types), the subsequent application of certain watermarks may compromise the readability of previous watermarks that were applied. For example, applying the checkered watermark after applying the corner-DCT watermark would erase the data stored in the lower-left and lower-right corners by the corner-DCT watermark, but applying the corner-DCT watermark after applying the checkered watermark would not affect the readability of the checkered watermark.

The timing of the computations of content hashes must be carefully planned in order for the authentication during decoding to work. Content hashes that are computed using the raw content pixel data must be computed after the visible and invisible watermarks are applied but before the content is converted into the final content file format. Content hashes that are computed on the overall content file must be computed after the metadata watermarks are applied.

In a preferred embodiment, the following order of watermark applications and content hash computations is observed (from first to last), so as to mitigate any issues arising from subsequent applications:

1. Converting the content item to raw pixel data format.
2. Applying the checkered watermark.
3. Applying the global-DFT watermark.
4. Applying the global-NCR watermark.
5. Applying the corner-DCT watermark.
6. Computing the raw (raw pixel data only) cryptographic hash.
7. Computing the similarity and alignment hashes.
8. Computing the standard and secure differential hashes.
9. Converting the content item to content file format.
10. Applying the metadata watermark.
11. Computing the full (full content file) cryptographic hash.

In some cases, a method for watermarking digital audiovisual content may be implemented. This method may include receiving an item of digital audiovisual content. A first watermark that is more robust to modifications of the content item may be applied. A second watermark that is less robust to modifications of the content item may then be applied. The second watermark may be designed such that it would be compromised by a subsequent application of the first watermark, but the first watermark would not be compromised by a subsequent application of the second watermark. The watermarked digital audiovisual content may then be communicated.

In some implementations, a method for watermarking digital audiovisual content may involve receiving an item of digital audiovisual content. One or more visible or invisible watermarks that affect the content data may be applied to the content item. One or more content hashes may then be computed on the content data. Following this, one or more metadata operations that affect the content file may be applied. One or more content hashes may then be computed on the content file. The marked digital audiovisual content may be communicated, and the one or more computed content hashes may be stored. These computed content hashes may be designed such that they can be retrieved in the future to authenticate the marked digital audiovisual content after distribution.

5.2 Ordered Decoding

The decoding process exposed by the API to the public only takes in a content item, and then returns an array of useful authentication information. In a basic embodiment, the watermarks that are supported by the encoding process are all decodable, provided that the content item has not been modified too much.

The decoding API outputs the following information:

Information associated with the content item, which may include a mix of descriptions, links, tags, licenses, and more.

Information pertaining to the source entity, which may include the type, the name, the reputation, and more.

The authenticity result of the content item from comparing the content hashes, which may include a mix of labels, scores, intelligible categorizations, and more.

The server-side decoding process should be done carefully, with extra attention paid to efficiency. Most importantly, because there are multiple watermarks in the ecosystem, the decoding process must be able to universally decode all the watermarks. Many existing content authentication platforms only support one watermark, and the decoding process can be quite expensive, taking a dozen seconds to process a single image despite using a strong CPU/GPU. Add on the fact that there are (1) many watermark providers with different watermarks, (2) many types of watermarks for different use cases, and (3) many more watermarks that will invented or modified in the future, the decoding problem explodes in computation cost and any notion of universal decoding becomes impractical.

Part of this problem should be addressed with watermark design: most watermarks should be quick to decode (say, 10-100 ms), and most of the computational bottlenecks should be shared between the watermarks, so that certain expensive operations, such as computing the 2-D DFT of a frame, only need to be done once. The watermark architecture can be configured to be aware of these design constraints.

Likewise, part of this problem should be addressed with an intelligent decoding process. There are three main considerations:

The watermarks that are cheaper to decode should be prioritized. The watermarks that are expensive to decode should only be decoded if the decoding for the earlier watermarks fail (either because the watermark was never applied or because the watermark was compromised in distribution). For example, the metadata watermark should be read first.

Each individual watermark decoding process should have a cutoff point, where the decoding process prematurely stops its attempt to decode the full content identifier if the attempt seems unlikely to succeed. For example, if no checkered pattern is detected in the bottom row of pixels, then decoding process will give up on decoding the checkered watermark.

The false positive rate in decoding watermarks can be decreased significantly by using the methods described herein: if the content identifier is missing, it can be checked with a quick API call; if the content identifier is incorrect, it can be checked with a quick similarity hash comparison. These operations should be done incrementally in the decoding process.

In a preferred embodiment, the following order of watermark decoding attempts and content hash comparisons is observed (from first to last), so as to optimize the trade-off between computation cost and decoding success.

1. Decoding the metadata watermark.
2. Comparing the full (full content file) cryptographic hash.
3. Converting the content item to raw pixel data format.
4. Comparing the raw (raw pixel data only) cryptographic hash.
5. Decoding the corner-DCT watermark.
6. Decoding the global-NCR watermark.
7. Decoding the checkered watermark.
8. Decoding the global-DFT watermark.
9. Comparing the similarity and alignment hashes.
10. Comparing the standard and secure differential hashes.
11. Returning the comparison results.

In a preferred embodiment, the exact trade-off can also be adjusted by a parameter, accessible to the user, so that high-value content items can be more thoroughly decoded and low-value content items can be quickly decoded.

In some cases, a method for authenticating digital audiovisual content may be implemented. This method may include receiving an item of watermarked digital audiovisual content. A first watermark that has a lower computational resource cost may be decoded. If the decoding of the first watermark is unsuccessful, a second watermark that has a higher computational resource cost may be decoded. The decoding result may be authenticated against data retrieved from a secure database. The authentication result may then be communicated.

In some implementations, the method for authenticating digital audiovisual content may involve receiving an item of watermarked digital audiovisual content. A watermark may be partly decoded and an inference may be made as to whether the watermark exists in the content item in a readable capacity. If the inference result is encouraging, the watermark may be fully decoded. The decoding result may be authenticated against data retrieved from a secure database. The authentication result may then be communicated.

In some aspects, the first watermark with lower computational resource cost may be a metadata watermark or a simple visible watermark. The second watermark with higher computational resource cost may be a more complex invisible watermark, such as a global-DFT watermark.

In some cases, the partial decoding of the watermark may involve detecting specific patterns or features that indicate the presence of a readable watermark. For example, in the case of a checkered watermark, the partial decoding may involve detecting the presence of a checkered pattern in a specific region of the content.

The authentication process may involve comparing the decoded watermark information with data stored in a secure database. This data may include content identifiers, source entity information, or cryptographic hashes associated with the original content.

In some implementations, the communication of the authentication result may include providing information about the authenticity of the content, details about the source entity, or descriptions of any detected alterations to the content since its original marking.

5.3 User Accounts

The public web interface can be configured to manage user accounts. In some embodiments, the authentication scheme as a public protocol can require the source (in this case the account) to create digital signatures using their private key.

For application, organization, and device source types, protocols similar to SSH and X.509 can be used for local storage.

However, for a public-facing account-based interface, this is impractical: this level of security would be far too much to expect from the average user. Instead, embodiments disclosed herein can store the private keys internally, in a secure manner.

If the user provides a username and password, the process is similar to how password managers work:

1. The user provides a unique username and a secret password.
2. A public/private key pair is generated using Ed25519. The public key is stored.
3. Two salts are generated, the password salt and the encryption salt. These are stored.
4. The password hash is generated (secret password, password salt). This is stored.
5. The encryption key is generated (secret password, encryption salt).
6. The encrypted private key is generated (encryption key, private key). This is stored.
7. Upon login, the password hash is used to verify that the secret password is correct.
8. Upon encoding, the private key is decrypted using the encryption key generated with the secret password.

In some embodiments, neither the secret passwords nor the private keys are stored in the system's databases.

However, there are certain cases where the user links their system account to a social media account (Google, Facebook, etc.), so the system can be configured to not receive a username and password. One option is to require the user to provide a username and a password regardless. In some embodiments, a secret password can be as an option. According to other embodiments:

1. The user signs in with a third-party secure login.
2. The client session receives a JWT (or similar) authentication package.
3. The client session extracts a static ID from said package; this static ID should never change, between login sessions and between account updates (e.g. changing email address).
4. The client session extracts an access token that can securely validate the login with a request to an external authentication service.
5. The client passes the static ID, as both the username and the password, and the access token, to the server.
6. The server validates the access token, then proceeds as usual.

This is not fully secure, but is tedious to hack.

In some cases, a method of watermarking digital audiovisual content may be implemented. This method may include a user logging in with a unique username and secret password. A front-end client may send the username and password to a backend server. The password may be validated against a password hash plus password salt retrieved from a secure database. The private key may be generated using the password and an encryption salt plus encryption key retrieved from a secure database. The content item may be watermarked. A digital signature may be generated on a content hash using the private key. The digital signature may be stored in a secure database. The watermarked digital audiovisual content may then be communicated.

In some implementations, a method of watermarking digital audiovisual content may involve a user logging in with a third-party secure login. An authentication package comprising a static identifier and an access token may be received. A front-end client may send the static identifier and access token to a backend server. The static identifier may be validated by submitting the access token to an external authentication service. The private key may be generated using the static identifier and an encryption salt retrieved from a secure database. The content item may be water-marked. A digital signature may be generated on a content hash using the private key. The digital signature may be stored in a secure database. The watermarked digital audio-visual content may then be communicated.

6 Further Configurations

6.1 Watermarks: Aesthetic Patterns

One class of watermark, such as in the example check-erboard-patterned visible watermark described herein, are the class of aesthetic patterns. The primary motivation here is the realization that a watermark that does not interfere with the content can be visible, provided that they do not compromise the user experience of consuming the content. There are a number of considerations here:

1. The visible region should be small compared to the overall size of the content. The main candidates are near the edges (like a border) and near the corners (like a logo).

In particular, for an edge-type region, the region can be appended onto the content, so that instead of cover-ing up an existing portion of the content, the water-mark is an addendum to the content. By doing this, the watermark shares the key advantage of metadata solutions of not compromising the content at all, but because the addendum is in image pixel data rather than in an EXIF/IPTC/XMP file, the addendum is much more likely to stick with the content.

2. The main goal of the watermark pattern is to be aesthetic. The key to doing this is to separate the pattern into two components: an aesthetic component and a data-carrying component. Because the aesthetic com-ponent is known, or at least highly predictable in style, it is very easy to separate it out from the data-carrying component. Consequently, the data-carrying compo-nent can be very small in magnitude relative to the aesthetic component. The end result is that the com-bined pattern is both aesthetic and computer-readable, which is great.

This is distinct from existing marks, which fall into one of the three categories:

Standard watermarks (i.e. in stock photos), which are designed to be disruptive and human-readable.

Low-perceptibility (a.k.a. invisible) watermarks, which lack a visible aesthetic component alto-gether.

High-visibility codes, such as bar codes and QR codes, whose data-carrying component is high magnitude.

3. Artistic designs can be added on easily, without com-promising the watermark significantly. While QR codes achieve this solely through error correction, we can bolster the freedom of designs by leveraging orthogo-nality in pattern space. As long as the artistic design does not affect either the aesthetic pattern or the data-carrying pattern, it can be added.

In particular, oftentimes the aesthetic pattern lies com-pletely within the Y-band (in YCbCr color space), and naturally so does the data-carrying pattern. Then, both the Cb-band and Cr-band can be used for the artistic design. This allows for a wide range of compatible artistic designs.

Some embodiments can be configured to perform:

Encoding a pattern in a direct addendum to the content (e.g. adding more rows at the bottom of an image), so that the pattern will not interfere with the content but will also be more durable than standard metadata.

Encoding a pattern that consists of a higher-visibility aesthetic component along with a lower-visibility data-carrying component, so that the data is not distracting because it is dominated by the aesthetics, so that the data is computer-readable because the aesthetics is known.

Encoding a pattern and adding an artistic design, wherein the artistic design is an orthogonal space with respect to the pattern and therefore does not interfere with the processing of the pattern.

6.2 Watermarks: Local Chroma Patterns

The invisible watermarks described so far fall into two main categories: corner-type, which only encode data in easy-to-locate sub-regions of the content; and global-type, which encode data in with a context that spans the entire content data. There is a third important category, which are the local-type watermarks. These watermarks have the prop-erty that the data payload is encoded into the content many times, so that even small sub-regions of the content contain a full copy of the data payload that can be read by a suitably-configured processor.

Various difficulties in the prior art are mitigated by the systems and methods described herein.

The first difficulty is data size. Local-type watermarks require encoding quite a lot more data than the previously-discussed types because a high amount of redundancy is needed.

The second difficulty is alignment. When processing small sub-regions, the context of where the sub-region lies within the entire content data is unknown, but it must still be decodable.

A naive attempt at addressing the first, for example, use the DCT space to encode 1-2 bits in every 8-by-8 block. While this addresses the data size problem, DCT methods (or DWT) are not friendly to alignment. As a result, standard DCT methods are impractical here.

Instead, the first key lies in taking advantage of how human vision works. It is well known that the human eye is has about three times less resolving power in color (Cb-band, Cr-band) than in luminosity (Y-band). Provided that variances in color are small enough, the variances will blend together, and the result is invisibility. This fact is built directly into many mundane technologies, from display screens to JPEG compression. Naturally, a local-type water-mark can take advantage of this, by embedding information in high-frequency (a.k.a. fine-grained) color patterns.

For typical displays, a grain radius of 2-4 pixels is the perfect size:

It would survive moderate down-resizing (say, 2×).

It would survive moderate JPEG compression (say, 80Q).

It would be unnoticeable by humans without zooming in (say, 150%).

This allows 4-8 bits to be stored per 8-by-8 block. Further-more, because of the resolution blending effect, the magni-tude of the grain colors can be much larger than the magnitude of the lower-frequency patterns in the global-type watermarks (say, 5-10 versus 1-2). This naturally makes computer decoding much easier, as the signal from the local chroma pattern will be quite large compared to the natural noise arising from the content data. With some error-correction thrown in (say, with a 50% message-to-codeword ratio), the data reading will be robust.

There is still one other challenge, which is alignment. Because the pattern signal is quite large relative to noise, local alignment becomes possible. The technology here is quite similar to the well-established alignment of bar codes and QR codes, but the problem is overall a bit tougher and some specific steps are required.

The decoding steps should roughly be in the order of: removing noise, estimating the size (of color grains), estimating the orientation (angle), estimating the alignment (translation), refining said estimates, extracting bits, matching said bits within a global pattern, and finally extracting the payload from said matched bits. For this to work well, the color patterns should follow a tiling pattern corresponding to a group isometry on the plane (or space, for videos), such as a simple grid, and the global pattern should include identifiable markers.

6.3 Content Hashes: Multi-Step Analysis

Three classes of hashes have been described in detail: cryptographic hashes, perceptual hashes, and differential hashes.

Described herein are methods of combining the three classes of hashes to achieve a much higher degree of reliability and scalability. This is done through a waterfall-type iterative process. The result is a much more effective authentication process: less cloud storage is required, authentication is more dynamic, and accuracy and precision rates are higher.

For each candidate content ID extracted from the observed content object (generally, out of zero or one candidates), an authentication package is retrieved, which contains cryptographic hashes, perceptual hashes, and differential hashes. The hash versions are also retrieved, so that a correct corresponding copy of the hashes can be computed as needed on the observed content object.

First, the cryptographic hashes are compared, to check for a perfect and secure match. Then, the perceptual hashes are compared, to (1) filter out false positive candidates or (2) assist in the alignment of the observed content. Finally, the differential hashes are compared, and descriptive analysis can be conducted on the result.

Note that not all of these steps are required, and in a preferred embodiment, some should actually be skipped in order to achieve the best results. For example, certain methods of marking content are naturally resistant against false positives, and certain methods of marking content naturally result in a quick and easy alignment process, so the perceptual hash step may be skipped. Note that the exact types of hashes of each class may differ. For example, a latent space embedding using modern ML could be used for the perceptual hash, but a traditional low-resolution high-compression method (such as p-hash) could be used just as well.

Some embodiments can include the usage of at least two classes of hashes, provided that they are conducted on the same observed-original content object pair, where the observed content object and the authentication package of hashes of the original content object are provided as inputs.

6.4 Cloud Storage: Provenance Chains

Some embodiments can be configured to include multiple-marking and multiple-authentication. For example, a content object can be marked, authenticated, then marked again, then authenticated again, while preserving provenance chains.

There are two main components of an effective embodiment. The first is how marking is done after authentication. The second is in the data records that are stored and retrieved.

There are four main types of marking after authentication: (1) metadata marking after metadata detection; (2) watermarking after metadata detection; (3) metadata marking after watermark detection; (4) watermarking after watermark detection.

With respect to the fourth, in order to maintain the provenance chain, the data associated with the former watermark should be stored. This is best done by storing a pointer to the data, which in a preferred embodiment is the content ID, alongside the data associated with the latter watermark. This pointer should also be cryptographically signed, especially in cases where the data associated with the former watermark (or metadata, in the corresponding case in the first main type of marking after authentication) is insecure (e.g. not managed by a secure closed server). Like with blockchain, including a digital signature of the former data is sufficient. To do so securely, this digital signature must be generated using the private key of the former marking, so must be done at the time of the former marking in anticipation of future provenance chains.

The latter watermark, on the other hand, needs to be carefully applied to minimize unwanted interactions with the former watermark, with the requirement that the latter watermark should end up taking clear decoding precedence over the former watermark.

If the latter watermark is of the same type as the former watermark, then in a preferred embodiment the watermark algorithm should be designed to automatically remove offending traces of previous watermarks. If the latter watermark is of a different type, then either the former watermark should be destroyed before applying the latter watermark, or the decoding precedence of the two types of watermarks should be made clearly understood. This understanding must be universal or be conveyed in the latter watermark and its associated data, because the former watermark and its associated data should be immutable. Lastly, as many effective watermarks consist of a combination of multiple sub-watermarks, the procedures described above should apply independently to each sub-watermark.

6.5 Watermarks: Combinations

A number of explicit watermarking methods (algorithms and classes of algorithms) were discussed in § 3. In a preferred embodiment, these watermarking methods are compounded into a more complete watermarking product. In particular, in one embodiment, the medium and heavy invisible watermark settings combine the corner DCT watermark with the global NCR and global DFT watermarks, respectively. Since the methods are largely orthogonal, the overall invisibility is not compromised too much but the overall durability increases significantly.

In addition, in a preferred embodiment, combinations of the visible (checkerboard pattern) methods, invisible (corner DCT, global NCR, global DFT, local chroma) methods, and metadata (data, encrypted and/or signed) methods are all enabled.

The claimed here is the application of multiple watermarks, which are largely orthogonal in embedding space (they do not interfere with one another), that each carry a copy of the same data payload. Then, as long as one is decodable, the data payload is recoverable. Additional data may be carried on some but not others.

This is distinct from prior art; some examples include:

Embedded patterns (i.e. watermark) can react to content alterations in different ways, and some information about how the content has been altered can be inferred from how these embedded patterns change. Combining two or more of these patterns, provided they react differently, is claimed. (U.S. Pat. No. 6,728,390B2)

The first watermark contains geometric information about the second watermark. The second watermark contains the primary data payload. The data that the two watermarks carry do not overlap. (US20050008191A1)

6.6 Platform: Points of Entry and Exit

Embodiments of the platform can include a number of points of entry (content marking) and exit (content authentication). As non-limiting examples:

Web application (website). [Enter/Exit]
API endpoint for developers. [Enter/Exit]
Phone application for photos. [Enter]
Browser plugin for automatic decoding. [Exit]
Other plugins for popular applications. [Enter/Exit]
HTML/JS code snippets for website support. [Exit]
Phone hardware integration. [Enter]
Camera hardware integration. [Enter]
Content editing software integration. [Enter/Exit]
Content generation software integration. [Enter]
Content platform software integration. [Enter/Exit]
Special access for authorities. [Enter/Exit]
Digital scanning in AR/VR environments. [Exit]

In many cases, the goal of authentication is not simply to prove ownership, but also to certify that the content is a faithful capture of reality, such as a raw camera photograph, and not something generated by an artificial intelligence model or something modified in a photo editing application. However, the time and space between the production of content and the watermarking of content is extremely vulnerable to attacks: benign actors could inadvertently edit captured content before applying the watermark; malicious actors could intercept the content as it is being transmitted and modify it freely. Here is one example:

(1) The user takes a photo on their phone, and uploads it to a cloud-based watermarking service. There are no issues.

(2) The user rotates the photo slightly before uploading it to the cloud-based service. The image has been edited, and that information is lost, but the edits are not too meaningful.

(3) The photo is taken on a social media application, and the user applies various substantial styles and effects to the image before publishing it. The application then watermarks the image, but the information that edits were made is lost.

(4) The application keeps track of the edits that were made, and records it in the watermark or metadata. However, one malicious user creates a fake image and tricks the application into believing that the fake image came directly from the phone camera. The information that edits were made is once again lost.

However, there are many reasons why it may not be practical to apply a watermark directly: (1) The computations involved in the watermarking process may be expensive or difficult. This is especially true with ML-based watermarks and with hardware integrations, respectively. (2) The content producing device may not be integrated with an appropriate watermarking apparatus. This may be especially common early on in the adoption of watermarking technology. (3) The effectiveness of the watermark decreases significantly when the content is modified. This is especially true for benign geometric edits, such as light cropping or small rotation. (4) The embedding of the watermark negatively affects the quality of the content. This is especially problematic when the user cares less about security and more about fidelity.

The systems and methods disclosed herein address these two issues by first computing and attaching a digital signature when the content is initially produced that can be used to certify that the content has not been modified, whether benign or malign, when the watermark is later applied. This is generally done in the context of the two watermark-based content authentication systems described so far.

Throughout this disclosure, various terms and phrases are used to describe features of the disclosed technology. It is to be understood that these terms and phrases may encompass a variety of meanings and definitions, as is common in the field of technology and patent law. The definitions of these terms may vary depending on the context in which they are used, the specific embodiment being described, or the interpretation of the technology by those skilled in the art.

For instance, terms such as "computing device," "processor," "memory," and "network" may refer to a wide range of devices, components, systems, and configurations known in the art, and their specific definitions may differ based on the implementation or design of the system. Similarly, phrases like "securely storing," "computing a vector," and "generating a message" may involve various methods, techniques, and processes that achieve the same or similar outcomes but may be executed in different manners.

It is also to be understood that the use of terms in the singular or plural form is not intended to limit the scope of the claims. For example, the mention of "a computing device" does not preclude the presence of multiple computing devices within a system. Likewise, references to "a network" may include various interconnected networks or a single network comprising multiple segments or layers.

Furthermore, the use of the term "may" in relation to an action or feature indicates that the action or feature is possible, but not necessarily mandatory. This term is used to describe optional or alternative aspects of the disclosed technology that provide flexibility in how the technology may be implemented or utilized.

The definitions provided herein are intended to serve as examples and are not exhaustive. Those skilled in the art may ascribe different meanings to these terms based on the context, the specific technology being described, or the advancements in the field. Therefore, the definitions of the terms and phrases used in this disclosure and the claims are to be interpreted broadly and in a manner consistent with the understanding of those skilled in the relevant art.

The use of the word "a" or "an" when used in conjunction with the claims herein is to be interpreted as including one or more than one of the element it introduces. Similarly, the use of the term "or" is intended to be inclusive, such that the phrase "A or B" is intended to include A, B, or both A and B, unless explicitly stated otherwise.

The term "comprising" is to be interpreted as inclusive or open-ended and does not exclude additional, unrecited elements or method steps. However, the term "consisting of" excludes any element, step, or ingredient not specified in the claim. The term "consisting essentially of" limits the scope of a claim to the specified materials or steps and those that do not materially affect the basic and novel characteristic(s) of the claimed disclosure.

Reference throughout the specification to "one embodiment," "another embodiment," "an embodiment," and so forth, means that a particular feature, structure, or characteristic described in connection with the embodiment is included in at least one embodiment of the present disclosure, and may not necessarily be present in all embodiments. Furthermore, the particular features, structures, or characteristics may be combined in any suitable manner in one or more embodiments without limitation.

The use of the terms "first," "second," and the like does not imply any order or sequence, but are used to distinguish one element from another, and the terms "top," "bottom," "front," "back," "leading," "trailing," and the like are used for descriptive purposes and are not necessarily to be construed as limiting.

The terms "connected," "coupled," or any variant thereof, mean any direct or indirect connection or coupling between two or more elements, and may encompass the presence of one or more intermediate elements between the two elements that are connected or coupled to each other.

As used herein, the term "processor" refers to any computing entity capable of executing instructions to perform a specific set of operations, whether implemented in hardware, firmware, software, or any combination thereof. This definition includes, but is not limited to, the following types of processors: Central Processing Unit (CPU), Graphics Processing Unit (GPU), Digital Signal Processor (DSP), Field-Programmable Gate Array (FPGA), Application-Specific Integrated Circuit (ASIC), microcontroller, System on Chip (SoC), Neural Processing Unit (NPU), quantum processor, cloud-based and distributed processors, multi-core and parallel processors, and virtual processors. The term "processor" also encompasses the associated memory hierarchies, including primary memory (such as RAM), secondary storage (such as hard drives and SSDs), and cache memory, which work in conjunction with the processor to store and retrieve data necessary for executing instructions. In this patent application, any reference to a "processor" should be interpreted broadly to include any type of processing unit capable of performing the described functions, regardless of its specific implementation, architecture, or physical form.

As used herein, the term "messages" may refer to any form of data or information that can be processed, transmitted, or stored in a digital format. Messages may include, but are not limited to, arbitrary-length plaintext messages, pre-hashed messages, concatenated messages, binary data, network protocol messages, database records, and time-stamped messages. Messages may be composed of characters, symbols, or binary data and may represent various forms of content such as text, numbers, multimedia, executable code, or any other data that can be digitally encoded. Messages may be used as input for cryptographic functions, such as keyed hash functions, where they are transformed into a fixed-size hash value influenced by a secret cryptographic key. The term "messages" encompasses a wide range of data types and structures, from simple text strings to complex structured data, and may include metadata, headers, footers, or other information that facilitates the processing, transmission, or interpretation of the content. Messages may be generated by users, systems, or processes and may be intended for various purposes, including communication, authentication, verification, logging, or any other function that involves the use of digital data.

The term "database" should be construed to mean a blockchain, distributed ledger technology, key-value store, document-oriented database, graph database, time-series database, in-memory database, columnar database, object-oriented database, hierarchical database, network database, or any other structured data storage system capable of storing and retrieving information. This may include traditional relational database management systems (RDBMS), NoSQL databases, NewSQL databases, or hybrid database systems that combine multiple database paradigms. The database may be centralized, distributed, or decentralized, and may employ various data models, indexing strategies, and query languages to organize and access the stored information. It may also incorporate features such as ACID (Atomicity, Consistency, Isolation, Durability) compliance, eventual consistency, sharding, replication, or partitioning to ensure data integrity, availability, and scalability. The database may be hosted on-premises, in the cloud, or in a hybrid environment, and may support various access methods including direct queries, API calls, or event-driven architectures.

The description of the embodiments of the present disclosure is intended to be illustrative, and not to limit the scope of the claims. Many alternatives, modifications, and variations will be apparent to those skilled in the art. A number of implementations have been described. Nevertheless, it will be understood that various modifications may be made without departing from the spirit and scope of the disclosure. Accordingly, other implementations are within the scope of the following claims.

The invention claimed is:

1. A computer-implemented method of authenticating digital content, comprising:
   (a) receiving, by one or more processors, data representing an observed item of digital content;
   (b) receiving, by the one or more processors, information comprising a differential hash associated with an original version of said observed item of digital content;
   (c) computing, by the one or more processors, a differential hash of said observed item of digital content, wherein the method of computation comprises:
      (i) determining a plurality of spatial regions of said observed item of digital content,
      (ii) applying a numerical function to each spatial region of the plurality of spatial regions, wherein the numerical function is a computational operation that takes content data from a spatial region as input and produces a numerical output that characterizes or represents that region in a way suitable for subsequent comparison and analysis;
      (iii) quantizing respective outputs of the numerical functions to generate quantized outputs, and
      (iv) concatenating the quantized outputs into a final hash;
   (d) comparing, by the one or more processors, said received differential hash and said computed differential hash by identifying locations at which they differ;
   (e) identifying, by the one or more processors, spatial regions of the observed item of digital content that exhibit differences exceeding a predetermined threshold or spatial regions that exhibit differences below said predetermined threshold versus the original version by analyzing a result of said comparing;
   (f) generating, by the one or more processors, information comprising said identification of spatial regions; and
   (g) storing, in a non-transitory computer-readable medium, the information comprising said identification of spatial regions.

2. The method of claim 1, wherein:

(a) the received information further comprises a digital signature that identifies a producer of the information as a trustworthy entity registered with a public key infrastructure, and (b) the method further comprises validating legitimacy of the received differential hash by verifying said digital signature using a public key associated with the trustworthy entity.

3. The method of claim 1, wherein:

(a) the computation of the differential hash is designed so that an accurate reconstruction of the digital content on which the computation is performed cannot be easily recovered from the differential hash, thereby ensuring a degree of privacy; and (b) the computation of the differential hash is designed so that a length of the final hash is significantly shorter than a result of a typical content compression algorithm applied to the observed item of digital content.

4. The method of claim 1, further comprising:

(a) prior to the computing of the differential hash, aligning the observed item of digital content to correct for geometric modifications, so that the determined spatial regions of said observed item of digital content are consistent with corresponding spatial regions of the original version, wherein:

(b) the observed item of digital content contains an embedded watermark;

(c) the received information further comprises one or more alignment hashes; and (d) the aligning comprises:

(i) extracting geometric information from said embedded watermark, and (ii) comparing the one or more received alignment hashes with one or more corresponding computed alignment hashes.

5. The method of claim 1, wherein:

(a) the plurality of spatial regions are determined so that a geometric diameter of each spatial region of the plurality of spatial regions is no more than a specified small fraction of dimensions of the digital content;

(b) the plurality of spatial regions are determined so that each spatial region overlaps with a number of other spatial regions, such that an adjacency graph defined by overlaps has a low diameter and a consistent degree per vertex; and (c) the numerical function applied to each spatial region is a pseudorandom function generated with a seed that differs between regions.

6. The method of claim 1, wherein:

(a) the numerical function applied to each spatial region is a perceptive hash designed so that a corresponding quantized output is likely to change if the spatial region is materially changed and not likely to change if the spatial region is materially unchanged; and (b) said numerical function belongs to a plurality of function classes that each distinguish a different set of material changes.

7. The method of claim 1, further comprising:

(a) prior to the quantizing and the concatenating, transforming a first vector consisting of the respective outputs of the numerical functions into a second vector of numerical outputs through a pre-defined sequence of matrix operations.

8. The method of claim 1, wherein:

(a) the received information further comprises a differential hash parameter; and (b) the computing of the differential hash utilizes said differential hash parameter to ensure that the method of computation deterministically matches a method of computation with which the received differential hash was computed on the original version of said observed item of digital content.

9. The method of claim 1, wherein:

(a) the identifying of spatial regions comprises generating one or more numerical values for each spatial region, wherein each numerical value quantifies an aspect of material change in the respective spatial region.

10. The method of claim 1, wherein:

(a) the identifying of spatial regions comprises generating a human-interpretable classification of a type of material change in each spatial region;

(b) the analyzing of the result of said comparing further comprises inputting the observed item of digital content alongside the result of said comparing; and (c) the analyzing utilizes a pre-trained neural network with at least one convolution or attention layer.

11. A system for authenticating digital content, comprising:

(a) one or more processors; and (b) a non-transitory computer-readable medium storing instructions that, when executed by the one or more processors, cause the system to perform operations comprising:

(i) receiving data representing an observed item of digital content;

(ii) receiving information comprising a differential hash associated with an original version of said observed item of digital content;

(iii) computing a differential hash of said observed item of digital content, wherein the method of computation comprises:

(i) determining a plurality of spatial regions of said observed item of digital content, (ii) applying a numerical function to each spatial region of the plurality of spatial regions, wherein the numerical function is a computational operation that takes content data from a spatial region as input and produces a numerical output that characterizes or represents that region in a way suitable for subsequent comparison and analysis;

(iii) quantizing respective outputs of the numerical functions to generate quantized outputs, and (iv) concatenating the quantized outputs into a final hash;

(iv) comparing said received differential hash and said computed differential hash by identifying locations at which they differ;

(v) identifying spatial regions of the observed item of digital content that exhibit differences exceeding a predetermined threshold or spatial regions that exhibit differences below said predetermined threshold versus the original version by analyzing a result of said comparing;

(vi) generating information comprising said identification of spatial regions; and (vii) storing the information comprising said identification of spatial regions.

12. The system of claim 11, wherein:

(a) the received information further comprises a digital signature that identifies a producer of the information as a trustworthy entity registered with a public key infrastructure, and (b) the operations further comprise validating legitimacy of the received differential hash by verifying said digital signature using a public key associated with the trustworthy entity.

13. The system of claim 11, wherein:

(a) the computation of the differential hash is designed so that an accurate reconstruction of the digital content on which the computation is performed cannot be easily recovered from the differential hash, thereby ensuring a degree of privacy; and (b) the computation of the differential hash is designed so that a length of the final hash is significantly shorter than a result of a typical content compression algorithm applied to the observed item of digital content.

14. The system of claim 11, wherein the operations further comprise:

(a) prior to the computing of the differential hash, aligning the observed item of digital content to correct for geometric modifications, so that the determined spatial regions of said observed item of digital content are consistent with corresponding spatial regions of the original version, wherein:

(b) the observed item of digital content contains an embedded watermark;

(c) the received information further comprises one or more alignment hashes; and (d) the aligning comprises:

(i) extracting geometric information from said embedded watermark, and (ii) comparing the one or more received alignment hashes with one or more corresponding computed alignment hashes.

15. The system of claim 11, wherein:

(a) the plurality of spatial regions are determined so that a geometric diameter of each spatial region of the plurality of spatial regions is no more than a specified small fraction of dimensions of the digital content;

(b) the plurality of spatial regions are determined so that each spatial region overlaps with a number of other spatial regions, such that an adjacency graph defined by overlaps has a low diameter and a consistent degree per vertex; and (c) the numerical function applied to each spatial region is a pseudorandom function generated with a seed that differs between regions.

16. The system of claim 11, wherein:

(a) the numerical function applied to each spatial region is a perceptive hash designed so that a corresponding quantized output is likely to change if the spatial region is materially changed and not likely to change if the spatial region is materially unchanged; and (b) said numerical function belongs to a plurality of function classes that each distinguish a different set of material changes.

17. The system of claim 11, wherein the operations further comprise:

(a) prior to the quantizing and the concatenating, transforming a first vector consisting of the respective outputs of the numerical functions into a second vector of numerical outputs through a pre-defined sequence of matrix operations.

18. The system of claim 11, wherein:

(a) the received information further comprises a differential hash parameter; and (b) the computing of the differential hash utilizes said differential hash parameter to ensure that the method of computation deterministically matches a method of computation with which the received differential hash was computed on the original version of said observed item of digital content.

19. The system of claim 11, wherein:

(a) the identifying of spatial regions comprises generating one or more numerical values for each spatial region, wherein each numerical value quantifies an aspect of material change in the respective spatial region.

20. The system of claim 11, wherein:

(a) the identifying of spatial regions comprises generating a human-interpretable classification of a type of material change in each spatial region;

(b) the analyzing of the result of said comparing further comprises inputting the observed item of digital content alongside the result of said comparing; and (c) the analyzing utilizes a pre-trained neural network with at least one convolution or attention layer.

21. A non-transitory computer-readable medium storing instructions that, when executed by one or more processors, cause the one or more processors to perform operations for authenticating digital content, the operations comprising:

(a) receiving data representing an observed item of digital content;

(b) receiving information comprising a differential hash associated with an original version of said observed item of digital content;

(c) computing a differential hash of said observed item of digital content, wherein the method of computation comprises:

(i) determining a plurality of spatial regions of said observed item of digital content, (ii) applying a numerical function to each spatial region of the plurality of spatial regions, wherein the numerical function is a computational operation that takes content data from a spatial region as input and produces a numerical output that characterizes or represents that region in a way suitable for subsequent comparison and analysis;

(iii) quantizing respective outputs of the numerical functions to generate quantized outputs, and (iv) concatenating the quantized outputs into a final hash;

(d) comparing said received differential hash and said computed differential hash by identifying locations at which they differ;

(e) identifying spatial regions of the observed item of digital content that exhibit differences exceeding a predetermined threshold or spatial regions that exhibit differences below said predetermined threshold versus the original version by analyzing a result of said comparing;

(f) generating information comprising said identification of spatial regions; and (g) storing the information comprising said identification of spatial regions.

22. The non-transitory computer-readable medium of claim 21, wherein:

(a) the received information further comprises a digital signature that identifies a producer of the information as a trustworthy entity registered with a public key infrastructure, and (b) the operations further comprise validating legitimacy of the received differential hash by verifying said digital signature using a public key associated with the trustworthy entity.

23. The non-transitory computer-readable medium of claim 21, wherein:

(a) the computation of the differential hash is designed so that an accurate reconstruction of the digital content on which the computation is performed cannot be easily recovered from the differential hash, thereby ensuring a degree of privacy; and (b) the computation of the differential hash is designed so that a length of the final hash is significantly shorter than a result of a typical content compression algorithm applied to the observed item of digital content.

24. The non-transitory computer-readable medium of claim 21, wherein the operations further comprise:

(a) prior to the computing of the differential hash, aligning the observed item of digital content to correct for geometric modifications, so that the determined spatial regions of said observed item of digital content are consistent with corresponding spatial regions of the original version, wherein:

(b) the observed item of digital content contains an embedded watermark;

(c) the received information further comprises one or more alignment hashes; and (d) the aligning comprises:

(i) extracting geometric information from said embedded watermark, and (ii) comparing the one or more received alignment hashes with one or more corresponding computed alignment hashes.

25. The non-transitory computer-readable medium of claim 21, wherein:

(a) the plurality of spatial regions are determined so that a geometric diameter of each spatial region of the plurality of spatial regions is no more than a specified small fraction of dimensions of the digital content;

(b) the plurality of spatial regions are determined so that each spatial region overlaps with a number of other spatial regions, such that an adjacency graph defined by overlaps has a low diameter and a consistent degree per vertex; and (c) the numerical function applied to each spatial region is a pseudorandom function generated with a seed that differs between regions.

26. The non-transitory computer-readable medium of claim 21, wherein:

(a) the numerical function applied to each spatial region is a perceptive hash designed so that a corresponding quantized output is likely to change if the spatial region is materially changed and not likely to change if the spatial region is materially unchanged; and (b) said numerical function belongs to a plurality of function classes that each distinguish a different set of material changes.

27. The non-transitory computer-readable medium of claim 21, wherein the operations further comprise:

(a) prior to the quantizing and the concatenating, transforming a first vector consisting of the respective outputs of the numerical functions into a second vector of numerical outputs through a pre-defined sequence of matrix operations.

28. The non-transitory computer-readable medium of claim 21, wherein:

(a) the received information further comprises a differential hash parameter; and (b) the computing of the differential hash utilizes said differential hash parameter to ensure that the method of computation deterministically matches a method of computation with which the received differential hash was computed on the original version of said observed item of digital content.

29. The non-transitory computer-readable medium of claim 21, wherein:

(a) the identifying of spatial regions comprises generating one or more numerical values for each spatial region, wherein each numerical value quantifies an aspect of material change in the respective spatial region.

30. The non-transitory computer-readable medium of claim 21, wherein:

(a) the identifying of spatial regions comprises generating a human-interpretable classification of a type of material change in each spatial region;

(b) the analyzing of the result of said comparing further comprises inputting the observed item of digital content alongside the result of said comparing; and (c) the analyzing utilizes a pre-trained neural network with at least one convolution or attention layer.

\* \* \* \* \*